(12) United States Patent
Ikedo et al.

(10) Patent No.: US 10,676,024 B2
(45) Date of Patent: Jun. 9, 2020

(54) DRIVING ASSIST APPARATUS OF VEHICLE

(71) Applicant: TOYOTA JIDOSHA KABUSHIKI KAISHA, Toyota-shi, Aichi (JP)

(72) Inventors: Yuji Ikedo, Sunto-gun (JP); Tomonori Akiyama, Susono (JP); Ryo Morishita, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/848,208

(22) Filed: Dec. 20, 2017

(65) Prior Publication Data

US 2018/0178721 A1 Jun. 28, 2018

(51) Int. Cl.
| | |
|---|---|
| *B60Q 1/00* | (2006.01) |
| *B60Q 9/00* | (2006.01) |
| *B60W 50/14* | (2020.01) |
| *B60W 30/095* | (2012.01) |
| *B60Q 1/34* | (2006.01) |
| *B60R 16/023* | (2006.01) |

(52) U.S. Cl.
CPC ............ *B60Q 9/008* (2013.01); *B60Q 1/346* (2013.01); *B60R 16/0231* (2013.01); *B60W 30/095* (2013.01); *B60W 50/14* (2013.01)

(58) Field of Classification Search
CPC .... B60Q 9/008; B60Q 1/346; B60R 16/0231; B60W 30/095; B60W 50/14
See application file for complete search history.

(56) References Cited

U.S. PATENT DOCUMENTS

| 5,959,569 A | 9/1999 | Khodabhai | |
|---|---|---|---|
| 6,459,991 B1* | 10/2002 | Takiguchi | G08G 1/164 340/435 |
| 6,749,270 B1* | 6/2004 | Lutz | B60T 8/4881 303/113.2 |
| 9,205,864 B2 | 12/2015 | Matsubara | |
| 10,065,589 B2* | 9/2018 | Sun | G05D 1/021 |

(Continued)

FOREIGN PATENT DOCUMENTS

| JP | 2004-066912 A | 3/2004 | |
|---|---|---|---|
| JP | 2005025458 A * | 1/2005 | G01S 17/023 |

(Continued)

OTHER PUBLICATIONS

Mar. 8, 2019 Office Action issued in U.S. Appl. No. 15/794,398.

(Continued)

*Primary Examiner* — Quang Pham
(74) *Attorney, Agent, or Firm* — Oliff PLC

(57) ABSTRACT

A driving assist apparatus of a vehicle of the invention predicts, as a predicted minimum left turn radius, a curvature radius of a moving route of the vehicle at a point where a curvature radius of the moving route is predicted to become smallest when the vehicle turns left, and sets a route curved along an arc having the predicted minimum left turn radius as a predicted moving route predicted for the vehicle to move. The apparatus predicts, as a predetermined minimum right turn radius, the curvature radius of the moving route of the vehicle at the point where the curvature radius is predicted to become smallest when the vehicle turns right, and sets the route curved along the arc having the predicted minimum right turn radius as the predicted moving route.

5 Claims, 17 Drawing Sheets

(56) References Cited

U.S. PATENT DOCUMENTS

| | | | | |
|---|---|---|---|---|
| 2003/0139883 A1* | 7/2003 | Takafuji | B60W 30/08 | 701/301 |
| 2004/0153243 A1* | 8/2004 | Shimazaki | B62D 15/0275 | 701/300 |
| 2004/0163856 A1* | 8/2004 | Kroppe | B60K 17/16 | 180/6.2 |
| 2005/0248449 A1* | 11/2005 | Ponziani | B60Q 1/346 | 340/475 |
| 2006/0173611 A1* | 8/2006 | Takagi | G01C 21/3407 | 701/538 |
| 2006/0197377 A1* | 9/2006 | Takahashi | B60T 8/1755 | 303/146 |
| 2007/0127254 A1* | 6/2007 | Chen | B60Q 1/0683 | 362/512 |
| 2008/0027646 A1* | 1/2008 | Kawabata | G01C 21/28 | 701/530 |
| 2009/0048737 A1* | 2/2009 | Nakagoshi | B60W 40/08 | 701/43 |
| 2009/0178876 A1* | 7/2009 | Miki | B62D 7/142 | 180/411 |
| 2009/0187322 A1* | 7/2009 | Yasui | B60W 40/076 | 701/70 |
| 2010/0049428 A1 | 2/2010 | Murata et al. | | |
| 2010/0076640 A1* | 3/2010 | Maekawa | G05D 1/0217 | 701/26 |
| 2010/0082212 A1* | 4/2010 | Miyajima | B60K 31/0066 | 701/70 |
| 2010/0082215 A1* | 4/2010 | Miyajima | B60W 30/18009 | 701/93 |
| 2010/0082216 A1* | 4/2010 | Yasui | B60K 31/0066 | 701/93 |
| 2010/0217483 A1 | 8/2010 | Matsuno | | |
| 2010/0235035 A1* | 9/2010 | Nishira | B62D 15/0265 | 701/31.4 |
| 2011/0025848 A1* | 2/2011 | Yumiba | B60R 1/00 | 348/148 |
| 2011/0148143 A1* | 6/2011 | Ondracek | B62D 35/008 | 296/180.5 |
| 2011/0246071 A1 | 10/2011 | Tsunekawa | | |
| 2012/0035846 A1* | 2/2012 | Sakamoto | G01S 13/931 | 701/301 |
| 2012/0101701 A1* | 4/2012 | Moshchuk | B60W 10/184 | 701/70 |
| 2014/0028451 A1* | 1/2014 | Takahashi | G08G 1/168 | 340/463 |
| 2014/0058579 A1 | 2/2014 | Ono | | |
| 2015/0057914 A1 | 2/2015 | Hiramatsu et al. | | |
| 2015/0066241 A1 | 3/2015 | Akiyama | | |
| 2015/0100217 A1* | 4/2015 | Sudou | B60W 30/165 | 701/96 |
| 2015/0336574 A1* | 11/2015 | Akiyama | G08G 1/16 | 701/301 |
| 2016/0021813 A1* | 1/2016 | Matthews | A01B 79/005 | 701/26 |
| 2016/0185388 A1* | 6/2016 | Sim | B60R 11/04 | 701/41 |
| 2016/0272244 A1* | 9/2016 | Imai | G08G 1/166 | |
| 2016/0313737 A1* | 10/2016 | Berkemeier | G05D 1/0212 | |
| 2017/0015312 A1* | 1/2017 | Latotzki | B60W 30/06 | |
| 2017/0113683 A1* | 4/2017 | Mudalige | B60W 30/0953 | |
| 2017/0120926 A1* | 5/2017 | Yoon | B60W 40/10 | |
| 2017/0129434 A1* | 5/2017 | Sun | B60R 21/013 | |
| 2017/0158199 A1* | 6/2017 | Pallett | B60W 40/107 | |
| 2017/0158225 A1* | 6/2017 | Brown | B62D 15/021 | |
| 2017/0274856 A1* | 9/2017 | Konet | H04W 4/027 | |
| 2017/0278401 A1* | 9/2017 | Probert | G08G 1/167 | |
| 2018/0144637 A1* | 5/2018 | Ikedo | B60Q 9/008 | |
| 2018/0174465 A1* | 6/2018 | Ikedo | G08G 1/166 | |
| 2018/0178788 A1* | 6/2018 | Ikedo | B60W 50/14 | |
| 2018/0178841 A1* | 6/2018 | Ikedo | B60Q 9/008 | |
| 2018/0312169 A1* | 11/2018 | Harai | B60W 40/10 | |
| 2018/0362037 A1* | 12/2018 | Ishiwatari | G06K 9/00805 | |

FOREIGN PATENT DOCUMENTS

| | | |
|---|---|---|
| JP | 2009-009209 A | 1/2009 |
| JP | 2010-188981 A | 9/2010 |
| JP | 2013-054701 A | 3/2013 |
| JP | 5435172 B2 | 3/2014 |
| JP | 2015-072604 | 4/2015 |
| JP | 2017-054441 A | 3/2017 |

OTHER PUBLICATIONS

Jan. 21, 2020 Corrected Notice of Allowability issued in U.S. Appl. No. 15/794,398.

Oct. 22, 2019 Notice of Allowance issued in U.S. Appl. No. 15/794,398.

* cited by examiner

DRIVING ASSIST APPARATUS OF VEHICLE

BACKGROUND

Field

The invention relates to a driving assist apparatus of a vehicle for performing an attention operation to a driver of the vehicle as an own vehicle when moving objects such as walking persons and other vehicles existing around the own vehicle may cross a moving route of the own vehicle.

Description of the Related Art

There is known a driving assist apparatus of a vehicle for performing an attention operation to a driver of the vehicle as an own vehicle when another vehicle moves into a predetermined range defined around the own vehicle (see JP 5435172 B). Hereinafter, this driving assist apparatus will be referred to as "the conventional apparatus".

The conventional apparatus is configured to set the predetermined range, assuming that that the own vehicle moves straight backward. With this configuration, the other vehicle may cross a moving route of the own vehicle when the own vehicle turns left or right even though the other vehicle does not enter into the predetermined range.

In this case, the attention operation to the driver should be performed. However, the conventional apparatus does not perform the attention operation to the driver since the other vehicle does not enter into the predetermined range.

The invention has been made for solving a problem described above. An object of the invention is to provide a driving assist apparatus of a vehicle for appropriately perform the attention operation to the driver when the moving objects such as the walking persons and the other vehicles may cross the moving route of the own vehicle while the own vehicle turns left or right.

SUMMARY

The driving assist apparatus of the vehicle (V) according to the invention comprises at least one sensor (16L, 16R) and an electronic control unit (10, 20, 30). The sensor (16L, 16R) detects a moving object (A to J) existing around the vehicle (V). The electronic control unit (10, 20, 30) performs an attention operation to a driver of the vehicle (V). Hereinafter, the driving assist apparatus according to the invention will be referred to as "the invention apparatus".

The electronic control unit (10, 20, 30) is configured to set a predicted moving route (fL, fR) corresponding to a route predicted for the vehicle (V) to move (see a process of a step 1120 of FIG. 11). The electronic control unit (10, 20, 30) is configured to perform the attention operation (see processes of a step 1235 of FIG. 12 and a step 1750 of FIG. 17) when a time (t1, t2) predicted for the vehicle (V) to reach a point where the moving object (A to J) crosses the predicted moving route (fL, fR) is smaller than or equal to a threshold time (t1th, t2th) (see determinations "Yes" at a step 1230 of FIG. 12 and a step 1740 of FIG. 17), When the vehicle (V) turns left, the electronic control unit (10, 20, 30) is configured to predict, as a predicted minimum left turn radius (R), a curvature radius (Rest1) of a moving route of the vehicle (V) at a point where the curvature radius (Rest1) of the moving route is predicted to become smallest after the vehicle (V) starts to turn left (see a process of a step 1435 of FIG. 14) and to set a route curved along an arc having the predicted minimum left turn radius (R) as the predicted moving route (fL, fR) (see the process of the step 1120 of FIG. 11).

When the vehicle (V) turns right, the electronic control unit (10, 20, 30) is configured to predict, as a predetermined minimum right turn radius (R), the curvature radius (Rest1) of the moving route of the vehicle (V) at the point where the curvature radius (Rest1) is predicted to become smallest after the vehicle (V) starts to turn right (see the process of the step 1435 of FIG. 14) and to set the route curved along the arc having the predicted minimum right turn radius (R) as the predicted moving route (fL, fR) (see the process of the step 1120 of FIG. 11).

Generally, when the driver turns the vehicle left or right, the driver first rotates a steering wheel of the vehicle to increase a steering angle gradually. After the steering angle reaches a certain large steering angle, the driver maintains the steering angle at the certain large steering angle. Thereafter, the driver rotates the steering wheel to decrease the steering angle gradually to zero and then, the driver ends a left or right turning of the vehicle.

Therefore, the curvature radius of the moving route of the vehicle decreases gradually until the steering angle reaches the certain large steering angle. When the steering angle reaches the certain large steering angle, the curvature radius of the moving route of the vehicle becomes smallest. Thus, immediately after the vehicle starts to turn left or right, the curvature radius of the moving route of the vehicle is large. Thereafter, the curvature radius of the moving route of the vehicle decreases gradually. According to a study by the inventors of this application, the inventors have realized that the moving route of the vehicle predicted, using the curvature radius of the moving route of the vehicle (i.e., the smallest curvature radius) at a time of the steering angle reaching the certain large steering angle is approximate to an actual moving route of the vehicle, compared with the moving route of the vehicle predicted, using the curvature radius larger than the smallest curvature radius.

The invention apparatus sets the predicted moving route, using the curvature radius of the moving route of the vehicle at the point where the curvature radius of the moving route is predicted to become smallest after the vehicle starts to turn left or right. Therefore, the predicted moving route is approximate to the actual moving route of the vehicle. Thus, the attention operation to the driver can be appropriately performed.

According to an aspect of the invention, when the vehicle (V) turns left, the electronic control unit (10, 20, 30) may be configured to presume that a yaw rate (Y) of the vehicle (V) increases by a change rate (ΔYsc) of the yaw rate (Y) of the vehicle (V) on a moment-to-moment basis while the vehicle (V) turns left for predicting the predicted minimum left turn radius (R) (see processes of steps 1405, 1410, 1420 and 1425 and the process of the step 1435 of FIG. 14). Further, when the vehicle (V) turns right, the electronic control unit (10, 20, 30) may be configured to presume that the yaw rate (Y) of the vehicle (V) increases by the change rate (ΔYsc) of the yaw rate (Y) of the vehicle (V) on a moment-to-moment basis while the vehicle (V) turns right for predicting the predicted minimum right turn radius (R) (see the processes of the steps 1405, 1410, 1420, 1425 and 1435 of FIG. 14).

The change rate of the yaw rate of the vehicle correlates with a change rate of the curvature radius of the moving route of the vehicle. Therefore, the curvature radius of the moving route of the vehicle at the point where the curvature radius is predicted to become smallest, can be accurately predicted by using the change rate of the yaw rate of the vehicle. The invention apparatus uses the change rate of the yaw rate of the vehicle for predicting the point where the curvature radius of the moving route of the vehicle is predicted to become smallest. As a result, the moving route of the vehicle can be accurately predicted. Thus, the attention operation to the driver can be appropriately performed.

According to another aspect of the invention, after the curvature radius becomes smallest while the vehicle (V) turns left (see a determination "No" at a step 1345 of FIG. 13), the electronic control unit (10, 20, 30) may be configured to set, as the predicted minimum left turn radius (R), the curvature radius at a point where the curvature radius becomes smallest (see processes of steps 1515, 1520, 1540 and 1545 of FIG. 15). Further, after the curvature radius becomes smallest while the vehicle (V) turns right (see a determination "No" at the step 1345 of FIG. 13), the electronic control unit (10, 20, 30) may be configured to set, as the predicted minimum right turn radius (R), the curvature radius at the point where the curvature radius becomes smallest (see the processes of the steps 1515, 1520, 1540 and 1545 of FIG. 15).

As described above, generally, when the driver turns the vehicle left or right, the driver maintains the steering angle of the steering wheel of the vehicle at the certain large steering angle for a while after the steering angle reaches the certain large steering angle. Thereafter, the driver decreases the steering angle gradually to zero and as a result, the driver ends the left or right turning of the vehicle.

Therefore, after the steering angle reaches the certain large steering angle and thus, the curvature radius of the moving route of the vehicle becomes smallest, the curvature radius of the moving route of the vehicle increases gradually. As described above, according to the study of the inventors of this application, it has been realized that the moving route of the vehicle predicted, using the minimum left or right turn curvature radius corresponding to the curvature radius of the moving route of the vehicle at the time of the steering angle reaching the certain large steering angle, is approximate to the actual moving route of the vehicle, compared with the moving route predicted, using the curvature radius larger than the minimum curvature radius.

After the curvature radius of the moving route of the vehicle reaches the minimum curvature radius, the invention apparatus sets, as the minimum left or right turn radius, the minimum curvature radius vehicle and sets the predicted moving route, using the thus-set minimum left or right radius. Therefore, the thus-set predicted moving route is approximate to the actual moving route of the vehicle. Thus, the attention operation to the driver can be appropriately performed.

According to further another aspect of the invention, the vehicle (V) may comprise at least one left direction blinker activated for indicating that the vehicle (V) is to turn left and at least one right direction blinker activated for indicating that the vehicle (V) is to turn right.

The electronic control unit (10, 20, 30) may be configured to predict that the vehicle (V) turns left when a speed (SPD) of the vehicle (V) is within a predetermined speed range (Rspd1) and the left direction blinker is activated (see a determination "Yes" at a step 610 of FIG. 16).

Further, the electronic control unit (10, 20, 30) may be configured to predict that the vehicle (V) turns right when the speed (SPD) of the vehicle (V) is within the predetermined speed range (Rspd1) and the right direction blinker is activated (see a determination "Yes" at a step 655 of FIG. 6).

When the driver starts to turn the vehicle left or right, the driver generally activates the left or right direction blinker after the driver decelerates the vehicle to decrease the speed of the vehicle to a speed suitable to start to turn the vehicle left or right. Otherwise, the driver generally decelerates the vehicle to decrease the speed of the vehicle to the speed suitable to start to turn the vehicle left or right after the driver activates the left or right direction blinker. Otherwise, the driver generally activates the left or right direction blinker and decelerates the vehicle to decrease the speed of the vehicle to the speed suitable to start to turn the vehicle left or right. The invention apparatus determines whether the vehicle is to turn left or right on the basis of the speed of the vehicle and the activated state of the left or right direction blinker. Therefore, the invention apparatus can determine accurately whether the vehicle is to turn left or right.

According to further another aspect of the invention, when the vehicle (V) comprises the left and right direction blinkers, the electronic control unit (10, 20, 30) may be configured to determine whether the vehicle (V) turns left or right on the basis of a vehicle information including activation states of the left and right direction blinkers (see processes of steps 635 and 680 of FIG. 6).

The driver generally activates the left direction blinker when the driver turns the vehicle left. Similarly, when the driver turns the vehicle right, the driver generally activates the right direction blinker. The invention apparatus determines whether the vehicle turns left or right on the basis of the activated state of the left or right direction blinker. Therefore, the invention apparatus can determine accurately whether the vehicle turns left or right.

According to further another aspect of the invention, the vehicle information may include at least one of a yaw rate (Y, Ys) of the vehicle (V), a speed (SPD) of the vehicle (V), a longitudinal acceleration (Gx) of the vehicle (V), an operation amount (AP) of an acceleration pedal (11a) of the vehicle (V), a lateral acceleration (Gy) of the vehicle (V) and a steering angle (θsw) of a steering wheel (14a) of the vehicle (V).

Values of parameters such as the yaw rate, the speed, the longitudinal acceleration, the operation amount of the acceleration pedal, the lateral acceleration and the steering angle of the steering wheel of the vehicle acquired when the vehicle turns left, are different from those acquired when the vehicle turns right. In addition, the values of the parameters acquired when the vehicle turns left or right, are different from those acquired when the vehicle moves straight.

The invention apparatus according to this aspect employs, as the vehicle information used for determining whether the vehicle turns left or right, at least one of the yaw rate, the speed, the longitudinal acceleration, the operation amount of the acceleration pedal, the lateral acceleration and the steering angle of the steering wheel of the vehicle. Therefore, the invention apparatus can determine appropriately whether the vehicle turns left or right.

In the above description, for facilitating understanding of the present invention, elements of the present invention corresponding to elements of an embodiment described later are denoted by reference symbols used in the description of the embodiment accompanied with parentheses. However, the elements of the present invention are not limited to the elements of the embodiment defined by the reference symbols. The other objects, features and accompanied advantages of the present invention can be easily understood from the description of the embodiment of the present invention along with the drawings.

DESCRIPTION OF THE PREFERRED EMBODIMENTS

First Embodiment

Figure 1:
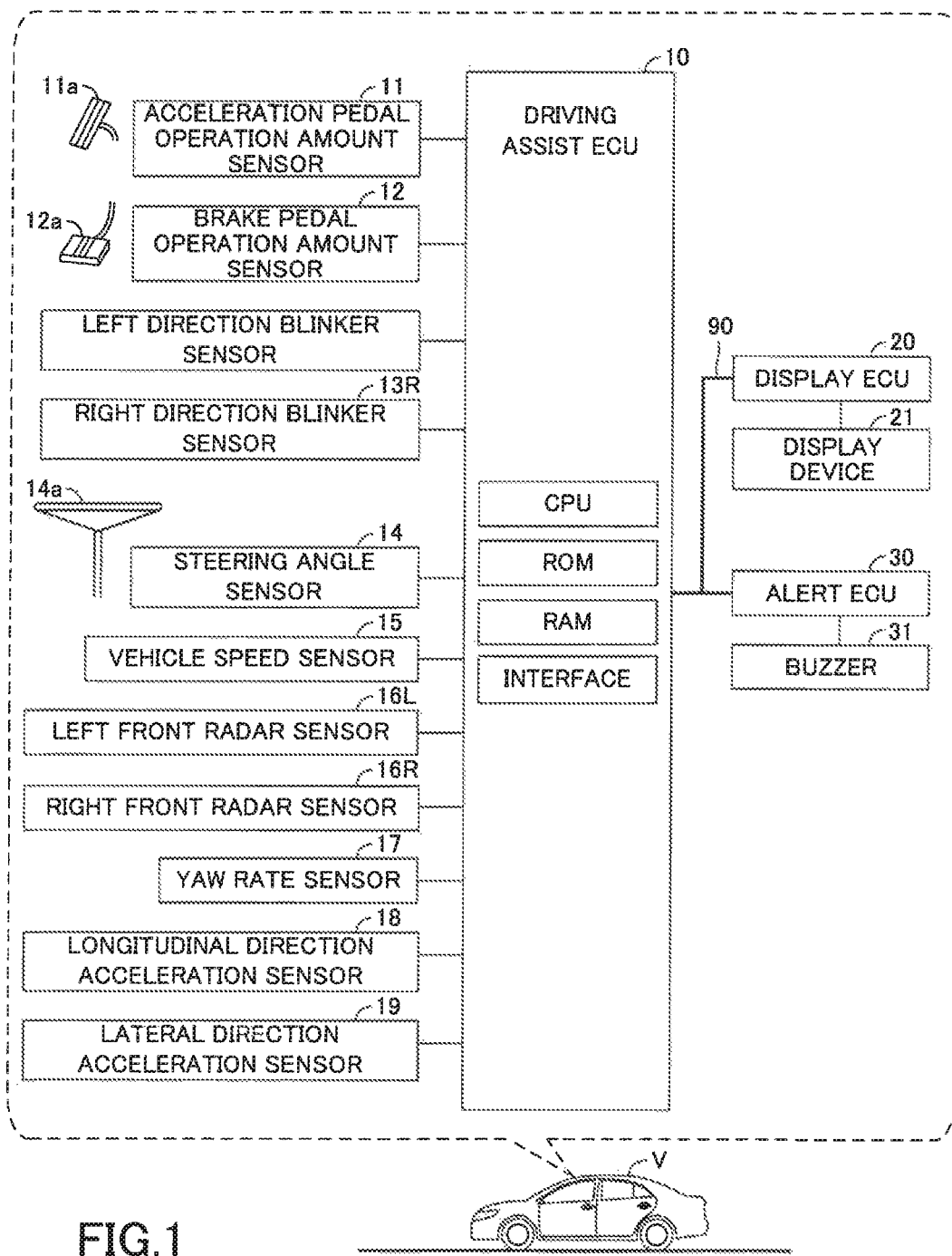
FIG. 1 is a view for showing a first embodiment apparatus corresponding to a driving assist apparatus of a vehicle according to a first embodiment of the invention and the vehicle to which the first embodiment apparatus is applied.

Below, a driving assist apparatus of a vehicle according to a first embodiment of the invention will be described with reference to the drawings. The driving assist apparatus according to the first embodiment is applied to a vehicle V shown in FIG. 1. The driving assist apparatus according to the first embodiment includes a driving assist ECU 10, a display ECU 20 and an alert ECU 30. Hereinafter, the driving assist apparatus according to the first embodiment will be referred to as "the first embodiment apparatus" and the vehicle V to which the first embodiment apparatus is applied, will be referred to as "the own vehicle V".

Each of the ECUs 10, 20 and 30 is an electronic control unit including as a main component, a micro-computer including a CPU, a ROM, a RAM, an interface and the like. The CPU of each of the ECUs 10, 20 and 30 accomplishes various functions described later by executing instructions or routines stored in a memory such as the ROM thereof. In this regard, two or all of the ECUs 10, 20 and 30 may be integrated into one ECU.

The driving assist ECU 10, the display ECU 20 and the alert ECU 30 are electrically connected to each other so as to communicate with, i.e., receive data from and send data to each other via a communication/sensor system CAN (i.e., Controller Area Network) 90.

The own vehicle V includes a blinker lever (not shown). The blinker lever is provided on a steering column and is operated by a driver of the own vehicle V. Each of states of blinkers (not shown) provided on a left-front end portion and a left-rear end portion of the own vehicle V, respectively changes from a non-blinking state (i.e., a non-activated state) to a blinking state (i.e., an activated state) by the driver operating the blinker lever from a neutral position to one side position. Hereinafter, the blinkers provided on the left-front and left-rear end portions of the own vehicle V will be referred to as "the left direction blinkers". The state of each of the left direction blinkers changes from the blinking state to the non-blinking state by the driver returning the blinker lever to the neutral position.

On the other hand, each of states of blinkers (not shown) provided on a right-front end portion and a right-rear end portion of the own vehicle V, respectively changes from the non-blinking state (i.e., the non-activated state) to the blinking state (i.e., the activated state) by the driver operating the blinker lever from the neutral position to the other side position. Hereinafter, the blinkers provided on the right-front and right-rear end portions of the own vehicle V will be referred to as "the right direction blinkers". The state of each of the right direction blinkers changes from the blinking state to the non-blinking state by the driver returning the blinker lever to the neutral position.

The own vehicle V includes an accelerator pedal operation amount sensor 11, a brake pedal operation amount sensor 12, a left direction blinker sensor 13L, a right direction blinker sensor 13R, a steering angle sensor 14, a vehicle speed sensor 15, a left-front radar sensor 16L, a right-front radar sensor 16R, a yaw rate sensor 17, a longitudinal direction acceleration sensor 18 and a lateral direction acceleration sensor 19. These sensors 11, 12, 13L, 13R, 14, 15, 16L, 16R, 17, 18 and 19 are electrically connected to the driving assist ECU 10.

The acceleration pedal operation amount sensor 11 detects an acceleration pedal operation amount corresponding to an operation amount AP [%] of an acceleration pedal 11a and outputs a signal indicating the acceleration pedal operation amount AP to the driving assist ECU 10 as own vehicle information. The driving assist ECU 10 acquires the acceleration pedal operation amount AP on the basis of the signal received from the acceleration pedal operation amount sensor 11 each time a predetermined calculation time Tcal elapses.

The brake pedal operation amount sensor 12 detects a brake pedal operation amount corresponding to an operation amount BP [%] of a brake pedal 12a and outputs a signal indicating the brake pedal operation amount BP to the driving assist ECU 10 as the own vehicle information. The driving assist ECU 10 acquires the brake pedal operation amount BP on the basis of the signal received from the brake pedal operation amount sensor 12 each time the predetermined calculation time Tcal elapses.

The left direction blinker sensor 13L outputs a left-turn signal indicating that the state of each of the left direction blinkers is the blinking state to the driving assist ECU 10 as the own vehicle information when the state of each of the left direction blinkers changes from the non-blinking state to the blinking state. On the other hand, when the state of each of the left direction blinkers changes from the blinking state to the non-blinking state, the left direction blinker sensor 13L outputs a non-left-turn signal indicating that the state of each of the left direction blinkers is the non-blinking state to the driving assist ECU 10 as the own vehicle information. The driving assist ECU 10 acquires the states of the left direction blinkers on the basis of the left-turn and non-left-turn signals received from the left direction blinker sensor 13L each time the predetermined calculation time Tcal elapses.

The right direction blinker sensor 13R outputs a right-turn signal indicating that the state of each of the right direction blinkers is the blinking state to the driving assist ECU 10 as the own vehicle information when the state of each of the right direction blinkers changes from the non-blinking state to the blinking state. On the other hand, when the state of each of the right direction blinkers changes from the blinking state to the non-blinking state, the right direction blinker sensor 13R outputs a non-right-turn signal indicating that the state of each of the right direction blinkers is the non-blinking state to the driving assist ECU 10 as the own vehicle information. The driving assist ECU 10 acquires the states of the right blinkers on the basis of the right-turn and non-right-turn signals received from the right direction blinker sensor 13R each time the predetermined calculation time Tcal elapses.

The steering angle sensor 14 detects a steering angle corresponding a rotation angle θsw [°] of a steering wheel 14a with respect to a base position corresponding to a rotation position of the steering wheel 14a located for causing the own vehicle V to move straight and outputs a signal indicating the steering angle θsw to the driving assist ECU 10 as the own vehicle information. The driving assist ECU 10 acquires the steering angle θsw on the basis of the signal received from the steering angle sensor 14 each time the predetermined calculation time Tcal elapses. In this case, the steering angle θsw is larger than zero when the steering wheel 14a is rotated to cause the own vehicle V to turn left. On the other hand, the steering angle θsw is smaller than zero when the steering wheel 14a is rotated to cause the own vehicle V to turn right.

The vehicle speed sensor 15 detects a vehicle speed corresponding to a speed SPD [km/h] of the own vehicle V and outputs a signal indicating the speed SPD to the driving assist ECU 10 as the own vehicle information. The driving assist ECU 10 acquires the speed SPD on the basis of the signal received from the vehicle speed sensor 15 each time the predetermined calculation time Tcal elapses. Hereinafter, the speed SPD will be referred to as "the vehicle speed SPD".

Figure 2:
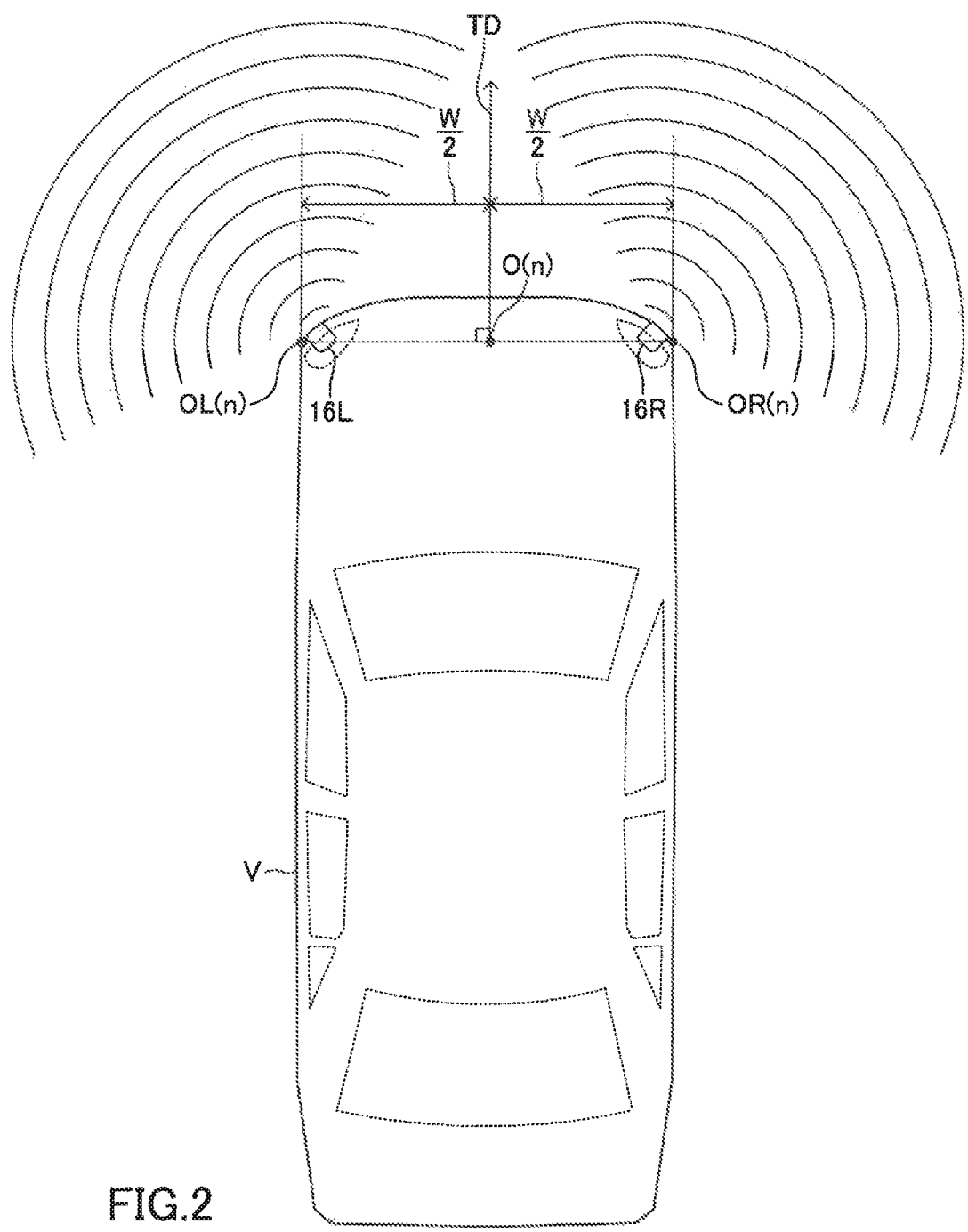
FIG. 2 is a view for showing the vehicle shown in FIG. 1.

As shown in FIG. 2, the left front radar sensor 16L is provided on a left end of a front end portion of the own vehicle V. The left front radar sensor 16L transmits a radio wave ahead of the own vehicle V diagonally left. When an object such as a walking person and a vehicle other than the own vehicle V exists within a reachable range of the radio wave transmitted from the left front radar sensor 16L, the transmitted radio wave is reflected by the object. The left front radar sensor 16L receives the reflected radio wave. The left front radar sensor 16L outputs signals indicating the transmitted radio wave and the reflected radio wave, respectively to the driving assist ECU 10. Hereinafter, the vehicle other than the own vehicle will be referred to as "the other vehicle".

The driving assist ECU 10 determines whether the object exists around the own vehicle V on the basis of the signals received from the left front radar sensor 16L each time the predetermined calculation time Tcal elapses. When the object exists, the driving assist ECU 10 calculates a distance between the own vehicle V and the object and an orientation of the object with respect to the own vehicle V. The driving assist ECU 10 acquires information on a position of the object with respect to the own vehicle V, a moving direction of the object, a moving speed of the object and the like as object information.

Also, as shown in FIG. 2, the right front radar sensor 16R is provided on a right end of a front end portion of the own vehicle V. The right front radar sensor 16R transmits a radio wave ahead of the own vehicle V diagonally right. When the object such as the walking person and the other vehicle exists within the reachable range of the radio wave transmitted from the right front radar sensor 16R, the transmitted radio wave is reflected by the object. The right front radar sensor 16R receives the reflected radio wave. The right front radar sensor 16R outputs signals indicating the transmitted radio wave and the reflected radio wave, respectively to the driving assist ECU 10.

The driving assist ECU 10 determines whether the object exists around the own vehicle V on the basis of the signals received from the right front radar sensor 16R each time the predetermined calculation time Tcal elapses. When the object exists, the driving assist ECU 10 calculates the distance between the own vehicle V and the object and the orientation of the object with respect to the own vehicle V. The driving assist ECU 10 acquires the information on the position of the object with respect to the own vehicle V, the moving direction of the object, the moving speed of the object and the like as the object information.

It should be noted that when the left and right front radar sensors 16L and 16R output the signals indicating the radio waves reflected by the same object, respectively, the driving assist ECU 10 acquires the object information on the same object on the basis of the signals received from the left and right front radar sensors 16L and 16R, respectively.

With reference to FIG. 1, the yaw rate sensor 17 detects a yaw rate corresponding to an angle speed Y [°/sec] of the own vehicle V and outputs a signal indicating the yaw rate Y to the driving assist ECU 10 as the own vehicle information. The driving assist ECU 10 acquires the yaw rate Yon the basis of the signal received from the yaw rate sensor 17 each time the predetermined calculation time Tcal elapses. When the own vehicle V turns left, the acquired yaw rate Y is larger than zero. On the other hand, when the own vehicle V turns right, the acquired yaw rate Y is smaller than zero. When the own vehicle V moves straight, the acquired yaw rate Y is zero.

The longitudinal direction acceleration sensor 18 detects a longitudinal acceleration Gx [m/s$^2$] of the own vehicle V and outputs a signal indicating the longitudinal acceleration Gx to the driving assist ECU 10 as the own vehicle information. The driving assist ECU 10 acquires the longitudinal acceleration Gx on the basis of the signal received from the longitudinal direction acceleration sensor 18 each time the predetermined calculation time Tcal elapses. When the own vehicle V is accelerated, the acquired longitudinal acceleration Gx is larger than zero. On the other hand, when the own vehicle V is decelerated, the acquired longitudinal acceleration Gx is smaller than zero. When the own vehicle V is not accelerated nor decelerated, the acquired longitudinal acceleration Gx is zero.

The lateral direction acceleration sensor 19 detects a lateral acceleration Gy [m/s$^2$] of the own vehicle V and outputs a signal indicating the lateral acceleration Gy to the driving assist ECU 10 as the own vehicle information. The driving assist ECU 10 acquires the lateral acceleration Gy on the basis of the signal received from the lateral direction acceleration sensor 19 each time the predetermined calculation time Tcal elapses. When the own vehicle V turns left, the acquired lateral acceleration Gy is larger than zero. On the other hand, when the own vehicle V turns right, the acquired lateral acceleration Gy is smaller than zero. When the own vehicle V moves straight, the acquired lateral acceleration Gy is zero.

The own vehicle information indicates a driving state of the own vehicle V acquired by the aforementioned various sensors mounted on the own vehicle V. The driving assist ECU 10 stores the acquired own vehicle information and object information in the RAM.

When the object may cross a predicted vehicle moving route corresponding to a route along which the own vehicle V is predicted to move as described later, the driving assist ECU 10 sends a request signal for requesting to perform an attention operation for drawing an attention of the driver of the own vehicle V, to the display ECU 20 and the alert ECU 30.

A display device 21 shown in FIG. 1 is a display device provided at a position which the driver of the own vehicle V can see, for example, at a meter cluster panel. The display device 21 is electrically connected to the display ECU 20. The display ECU 20 sends a command signal to the display device 21 when the display ECU 20 receives the request signal from the driving assist ECU 10. The display device 21 performs the attention operation for drawing the driver's attention when the display device 21 receives the command signal from the display ECU 20. The display device 21 may be a head-up display or a center display or the like.

A buzzer 31 shown in FIG. 1 is electrically connected to the alert ECU 30. The alert ECU 30 sends a command signal to the buzzer 31 when the alert ECU 30 receives the request signal from the driving assist ECU 10. The buzzer 31 generates an alert sound for drawing the driver's attention as the attention operation. The attention operation to the driver may be performed by one of the display device 21 and the buzzer 31.

<Summary of Operation of First Embodiment Apparatus>

Below, a summary of an operation of the first embodiment apparatus will be described. In particular, the operation of the first embodiment apparatus performed when the own vehicle V turns left or right at a turning position. It should be noted that the turning position is an intersection or a parking area of a building or a road next to an entrance of the parking area or the like. Below, the operation of the first embodiment apparatus will be described when the turning position is the intersection.

When the driver turns the own vehicle V left or right at the intersection, the driver causes the own vehicle V to move into the intersection while the driver decreases the vehicle speed SPD of the own vehicle V. Thereafter, the driver rotates the steering wheel 14a to turn the own vehicle V left or right. Finally, the driver returns the rotation position of the steering wheel 14a to the base position and terminates a left or right turning of the own vehicle V.

In this regard, the object such as the walking person and the other vehicle may cross the predicted vehicle moving route of the own vehicle V. When the own vehicle V turns left or right in the intersection, the first embodiment apparatus acquires the predicted vehicle moving route of the own vehicle V as described later assuming that the predicted vehicle moving route has an arc shape.

Further, the first embodiment apparatus calculates a total turn angle corresponding to a total angle θtotal of the turning of the own vehicle V in the intersection. Then, the first embodiment apparatus calculates, on the basis of the total turn angle θtotal, a turn remaining angle corresponding to an angle that the own vehicle V should turn until the own vehicle V completes the left or right turning. Then, the first embodiment apparatus calculates an effective length of the predicted vehicle moving route on the basis of the turn remaining angle. When the object may cross a portion of the predicted vehicle moving route corresponding to the calculated effective length, the first embodiment apparatus performs the attention operation to the driver, using the display device 21 and the buzzer 31.

In particular, the first embodiment apparatus determines whether the driver has an attempt to turn the own vehicle V left or right, in other words, whether the own vehicle V is not substantially turning left or right, but the own vehicle V is set to turn left or right each time the predetermined calculation time Tcal elapses.

<Left Turn Waiting Condition>

When a left turn waiting condition is satisfied, the first embodiment apparatus determines that the own vehicle V is set to turn left. The left turn waiting condition is satisfied when at least one of conditions LW1 to LW3 described below is satisfied.

A waiting vehicle speed range Rspd1 described below is a range of the general vehicle speed of the own vehicle V when the own vehicle V is set to turn left. In the first embodiment, a first vehicle speed SPD1 corresponding to a lower limit of the range Rspd1 is 0 km/h. A second vehicle speed SPD2 corresponding to an upper limit of the range Rspd1 is 20 km/h. The same is applied to the right turning of the own vehicle V.

Condition LW1: The state of each of the left direction blinkers changes from the non-blinking state to the blinking state while the vehicle speed SPD of the own vehicle V is within the waiting vehicle speed range Rspd1.

Condition LW2: The vehicle speed SPD changes from the vehicle speed SPD out of the waiting vehicle speed range Rspd1 to the vehicle speed SPD within the waiting vehicle speed range Rspd1 while each of the left direction blinkers is in the blinking state.

Condition LW3: The vehicle speed SPD changes from the vehicle speed SPD out of the waiting vehicle speed range Rspd1 to the vehicle speed SPD within the waiting vehicle speed range Rspd1 and the state of each of the left direction blinkers changes from the non-blinking state to the blinking state.

<Right Turn Waiting Condition>

When a right turn waiting condition is satisfied, the first embodiment apparatus determines that the own vehicle V is set to turn right. The right turn waiting condition is satisfied when at least one of conditions RW1 to RW3 described below is satisfied.

Condition RW1: The state of each of the right direction blinkers changes from the non-blinking state to the blinking state while the vehicle speed SPD of the own vehicle V is within the waiting vehicle speed range Rspd1.

Condition RW2: The vehicle speed SPD changes from the vehicle speed SPD out of the waiting vehicle speed range Rspd1 to the vehicle speed SPD within the waiting vehicle speed range Rspd1 while each of the right direction blinkers is in the blinking state.

Condition RW3: The vehicle speed SPD changes from the vehicle speed SPD out of the waiting vehicle speed range Rspd1 to the vehicle speed SPD within the waiting vehicle speed range Rspd1 and the state of each of the right direction blinkers changes from the non-blinking state to the blinking state.

In the following description, when a symbol "e" is a parameter and a symbol "n" is a calculation cycle, a term "e(n)" means the parameter acquired or predicted at the calculation cycle "n". When the left or right turn waiting condition is satisfied, that is, when the own vehicle V is determined to be set to turn left or right, the calculation cycle "n" is zero.

A vehicle base point corresponding to a point O(n) shown in FIG. 2 is a center point in a width of the own vehicle V adjacent to the front end portion of the own vehicle V.

In addition, the first embodiment apparatus calculates the total turn angle θtotal(n) which the own vehicle V has turned from the vehicle base point O(0) to the vehicle base point O(n). The vehicle base point O(0) is the vehicle base point at the calculation cycle "0" as shown by a dashed line in FIG. 4. The vehicle base point O(n) is the vehicle base point for the calculation cycle "n" as shown by a solid line in FIG. 4. The first embodiment apparatus previously sets a turn end angle θend which the own vehicle V generally needs to turn until the own vehicle V completes the left or right turning after the own vehicle V starts to turn left or right. In the first embodiment, the turn end angle θend is set to 90°. When the total turn angle θtotal(n) becomes larger than the turn end angle θend or when the state of each of the left direction blinkers or the state of each of the right direction blinkers changes from the blinking state to the non-blinking state before the total turn angle θtotal(n) becomes larger than the turn end angle θend, the first embodiment apparatus determines that the own vehicle V completes the left or right turning.

Generally, while the own vehicle V is set to turn left or right, the vehicle speed SPD of the own vehicle V continues to be within the waiting vehicle speed range Rspd1 and the left or right direction blinkers continue to blink. Therefore, the conditions LW1 to LW3 or the conditions RW1 to RW3 are not satisfied until the own vehicle V completes the left or right turning after the left or right turn waiting condition is once satisfied. Thus, the left or right turn waiting condition is not satisfied after the left or right turn waiting condition is once satisfied.

The first embodiment apparatus determines that the own vehicle V is set to turn left or right until a left or right turn start condition described later is satisfied after the left or right turn waiting condition is once satisfied as far as the left direction blinkers or the right direction blinkers blink.

Except for an exceptional case that the driver performs an operation for returning the state of each of the left or right direction blinkers to the non-blinking state while the own vehicle V turns left or right, the left or right turn waiting condition is satisfied once at one intersection.

<Left Turn Start Determination>

While the left direction blinkers are blinking, that is, the driver shows an intention to cause the own vehicle V to turn left after the first embodiment apparatus determines that the own vehicle V is set to turn left, that is, the left turn waiting condition is satisfied, the first embodiment apparatus determines whether the own vehicle V is actually turning left, that is, the own vehicle V is in a left turn state each time the predetermined calculation time Tcal elapses.

The first embodiment apparatus determines that the own vehicle V starts to turn left when the left turn start condition described below is first satisfied while the left direction blinkers are blinking after the left turn waiting condition is satisfied. The left turn start condition is satisfied when conditions LS1 to LS6 described below are all satisfied.

Turning vehicle speed range Rspd2 described below is a general vehicle speed range of the own vehicle V turning left. A lower limit vehicle speed SPDL of the range Rspd2 is larger than the first vehicle speed SPD1 and in the first embodiment, is 5 km/h. An upper limit vehicle speed SPDU of the range Rspd2 is smaller than or equal to the second vehicle speed SPD2 and in the first embodiment, is 20 km/h.

Condition LS1: The vehicle speed SPD is within the turning vehicle speed range Rspd2.

Condition LS2: The longitudinal acceleration Gx is smaller than an acceleration threshold Gxa when the longitudinal acceleration Gx is larger than or equal to zero or an absolute value of the longitudinal acceleration Gx is smaller than a deceleration threshold Gxd when the longitudinal acceleration Gx is smaller than zero. In the first embodiment, the threshold Gxa is 4 m/s$^2$ and the threshold Gxd is 4 m/s$^2$.

Condition LS3: The acceleration pedal operation amount AP is smaller than an operation amount threshold APth. In the first embodiment, the threshold APth is 2%.

Condition LS4: The yaw rate Y is larger than a left-or-right turn determination threshold Yth when the yaw rate Y is larger than zero. The threshold Yth is a turn start index threshold and in the first embodiment, 8°/sec.

Condition LS5: The lateral acceleration Gy is larger than a left-or-right turn determination threshold Gyth when the lateral acceleration Gy is larger than zero. In the first embodiment, the threshold Gyth is 3 m/s$^2$.

Condition LS6: The steering angle θsw is larger than a left-or-right turn determination threshold θswth when the steering angle θsw is larger than zero. In this embodiment, the threshold θswth is 45°.

When the left turn start condition continues to be satisfied after the left turn start condition is first satisfied, the first embodiment apparatus determines that the own vehicle V is in the left turn state, that is, the own vehicle V is actually turning left.

For example, when the own vehicle V stops temporarily around a center area of the intersection to wait for the oncoming vehicle, the walking person and the like to pass the intersection after the own vehicle V starts to turn left, the left turn start condition becomes unsatisfied. In this regard, the driver continues to cause the left direction blinkers to blink when the own vehicle V stops temporarily in the middle of the left turning.

Accordingly, the first embodiment apparatus determines that the own vehicle V is in the left turn state when the left direction blinkers are blinking even though the left turn start condition becomes unsatisfied after the left turn start condition is satisfied.

When the state of each of the left direction blinkers becomes the non-blinking state after the left turn start condition is satisfied or when the total turn angle θtotal becomes larger than the turn end angle θend after the left turn start condition is satisfied, the first embodiment apparatus determines that the own vehicle V completes the left turning.

Hereinafter, a state that the own vehicle V is determined to be set to turn left, will be referred to as "the left turn waiting state L1". A state that the own vehicle V is determined to be turning left at the intersection, will be referred to as "the left turn state L2".

<Right Turn Start Determination>

While the right turn blinkers are blinking, that is, the driver shows an intention to cause the own vehicle V to turn right after the first embodiment apparatus determines that the own vehicle V is set to turn right, that is, the right turn waiting condition is satisfied, the first embodiment apparatus determines whether the own vehicle V is actually turning right, that is, the own vehicle V is in a right turn state each time the predetermined calculation time Tcal elapses.

The first embodiment apparatus determines that the own vehicle V starts to turn right when the right turn start condition described below is first satisfied while the right direction blinkers are blinking after the right turn waiting condition is satisfied. The right turn start condition is satisfied when conditions RS1 to RS6 described below are all satisfied.

Condition RS1: The vehicle speed SPD is within the turning vehicle speed range Rspd2.

Condition RS2: The longitudinal acceleration Gx is smaller than the acceleration threshold Gxa when the longitudinal acceleration Gx is larger than or equal to zero or the absolute value of the longitudinal acceleration Gx is smaller than the deceleration threshold Gxd when the longitudinal acceleration Gx is smaller than zero.

Condition RS3: The acceleration pedal operation amount AP is smaller than the operation amount threshold APth.

Condition RS4: An absolute value of the yaw rate Y is larger than the left-or-right turn determination threshold Yth when the yaw rate Y is smaller than zero.

Condition RS5: An absolute value of the lateral acceleration Gy is larger than the left-or-right turn determination threshold Gyth when the lateral acceleration Gy is smaller than zero.

Condition RS6: An absolute value of the steering angle θ is larger than the left-or-right turn determination threshold θswth when the steering angle θsw is smaller than zero.

When the right turn start condition continues to be satisfied after the right turn start condition is first satisfied, the first embodiment apparatus determines that the own vehicle V is in the right turn state.

Similar to a case that the own vehicle V turns left, when the own vehicle V stops temporarily around the center area of the intersection to wait for the oncoming vehicle, the walking person and the like to pass the intersection after the own vehicle V starts to turn right, the right turn start condition becomes unsatisfied. In this regard, the driver continues to cause the right direction blinkers to blink when the own vehicle V stops temporarily in the middle of the right turning.

Accordingly, the first embodiment apparatus determines that the own vehicle V is in the right turn state when the right turn blinkers are blinking even though the right turn start condition becomes unsatisfied after the right turn start condition is satisfied.

When the state of each of the right direction blinkers becomes the non-blinking state after the right turn start condition is satisfied or when the total turn angle θtotal becomes larger than the turn end angle θend after the right turn start condition is satisfied, the first embodiment apparatus determines that the own vehicle V completes the right turning.

Hereinafter, a state that the own vehicle V is determined to be set to turn right, will be referred to as "the right turn waiting state R1". A state that the own vehicle V is determined to be turning right at the intersection, will be referred to as "the right turn state R2."

<Calculation of Smoothed Yaw Rate Ys>

The first embodiment apparatus uses the yaw rate Y of the own vehicle V for acquiring the predicted vehicle moving route as described later. In this regard, the yaw rate Y detected by the yaw rate sensor 17 is unstable. Accordingly, the first embodiment apparatus calculates a smoothed yaw rate Ys by smoothing the yaw rate Y each time the predetermined calculation time Tcal elapses until the first embodiment apparatus makes a determination that the own vehicle V completes the left turning after the left turn waiting condition is satisfied. Hereinafter, the determination that the own vehicle V completes the left turning, will be referred to as "the left turn end determination" and a period until the first embodiment apparatus makes the left turn end determination, will be referred to as "the left turn period of the own vehicle V. Also, the first embodiment apparatus calculates the smoothed yaw rate Ys by smoothing the yaw rate Y each time the predetermined calculation time Tcal elapses until the first embodiment apparatus makes a determination that the own vehicle V completes the right turning after the right turn waiting condition is satisfied. Hereinafter, the determination that the own vehicle V completes the right turning, will be referred to as "the right turn end determination" and a period until the first embodiment apparatus makes the right turn end determination, will be referred to as "the right turn period of the own vehicle V.

In this regard, the yaw rate Y of the own vehicle V turning left is positive and the yaw rate Y of the own vehicle V turning right is negative. Therefore, a sign of the yaw rate Y of the own vehicle V turning left is different from the sign of the yaw rate Y of the own vehicle V turning right. Accordingly, the first embodiment apparatus calculates the smoothed yaw rate Ys as described below. In the following description, a symbol "M" is a predetermined positive integer.

The first embodiment apparatus calculates an average of the yaw rates Y(0) to Y(n) as the smoothed yaw rate Ys(n) as shown by an expression (1L) described below until the calculation cycle "n" reaches a predetermined calculation cycle "M" (n<M) after the left turn waiting condition is satisfied.

$$Ys(n)=\{Y(0)+ \ldots +Y(n-1)+Y(n)\}/(n+1) \qquad (1L)$$

After the calculation cycle "n" reaches the predetermined calculation cycle "M" (n≤M), the first embodiment apparatus calculates an average of the consecutive yaw rates Y(n−(M−1)) to Y(n) as the smoothed yaw rate Ys(n) as shown by an expression (2L) described below.

$$Ys(n)=\{Y(n-(M-1))+ \ldots +Y(n-1)+Y(n)\}/M \qquad (2L)$$

On the other hand, after the right turn waiting condition is satisfied, the first embodiment apparatus calculates an average of the yaw rates Y(0) to Y(n) multiplied by "−1" as the smoothed yaw rate Ys(n) as shown by an expression (1R) described below until the calculation cycle "n" reaches the predetermined calculation cycle "M" (n<M).

$$Ys(n)=\{(-Y(0))+ \ldots +(-Y(n-1))+(-Y(n))\}/(n+1) \qquad (1R)$$

After the calculation cycle "n" reaches the predetermined calculation cycle "M" (n≤M), the first embodiment apparatus multiplies the consecutive yaw rates Y(n−(M−1)) to Y(n) by "−1", i.e., changes the sign of the consecutive yaw rates Y(n−(M−1)) to Y(n), respectively. Then, the first embodiment apparatus calculates an average of the consecutive yaw rates Y(n−(M−1)) to Y(n) each having the changed sign as the smoothed yaw rate Ys(n) as shown by an expression (2R) described below.

$$Ys(n)=\{(-Y(n-(M-1)))+ \ldots +(-Y(n-1))+(-Y(n))\}/M \qquad (2R)$$

As described above, the yaw rate of the own vehicle V is negative when the own vehicle V turns right. In the first embodiment, when the right turn waiting condition is satisfied, the yaw rate Y is multiplied by "−1" such that the sign of the yaw rate Y is reversed. Then, the values of the yaw rates Y each having a reversed sign are smoothed, Thus, the smoothed yaw rate Ys of the own vehicle V turning right can be equated with the smoothed yaw rate Ys of the own vehicle V turning left.

It should be noted that the smoothed yaw rate Ys of the own vehicle V turning left may not be positive. Similarly, the smoothed yaw rate Ys of the own vehicle V turning right may not be positive. For example, when the own vehicle V turns right temporarily in the middle of the left turning, i.e., the steering wheel 14a is temporarily rotated to turn the own vehicle V right in the middle of the left turning, the negative yaw rate Y is detected at the calculation cycles during the temporary right turning of the own vehicle V. In this case, the smoothed yaw rate Ys calculated by the expression (1L) or (2L) may be negative.

Similarly, when the own vehicle V turns left temporarily in the middle of the right turning, i.e., the steering wheel 14a is temporarily rotated to turn the own vehicle V left in the middle of the right turning, the positive yaw rate Y is detected at the calculation cycles during the temporary left turning of the own vehicle V. When the detected positive yaw rate Y is multiplied by "−1", the negative yaw rate Y is obtained. In this case, the smoothed yaw rate Ys calculated by the expression (1R) or (2R) may be negative.

Further, the own vehicle V may stop temporarily after the own vehicle V is determined to start to turn left or right. In this case, the yaw rate Y changes from a non-zero value to a zero value. In this case, the smoothed yaw rate Ys calculated by any of the expressions (1L) to (2R) may be calculated as non-zero value departing from the zero value even though the actual yaw rate Y is the zero value. In this case, an inaccurate value is calculated.

Accordingly, when the yaw rate Y changes from the non-zero value to the zero value after the own vehicle V is determined to start to turn left or right, the first embodiment apparatus sets the smoothed yaw rate Ys is to zero as shown by an expression (3) or (4) described below in place of using any of the expressions (1L) to (2R).

In other words, when the own vehicle V is determined to start to turn left or right at the calculation cycle "a" (1≤a) and then, the own vehicle V stops temporarily at the calculation cycle "b" (a<b<n) and the yaw rate Y(b) for the calculation cycle "b" becomes zero first, the first embodiment apparatus sets the yaw rate Ys(b) to zero as shown by an expression (3) described below. As can be understood from the condition LS4 or RS4, the yaw rate Y(a) for the calculation cycle "a" is not zero.

$$Ys(b)=0 \tag{3}$$

(In the expression (3), the yaw rate Y(i) (i="a" to "b−1") is not zero and the yaw rate Y(b) is zero.)

Thereafter, the first embodiment apparatus sets the smoothed yaw rate Ys for each of the calculation cycle "b+1" to "d" (b<d<n) to zero as shown by an expression (4) described below while the own vehicle V continues to stop from the calculation cycle "b+1" to "d", that is, while the yaw rate Y continues to be zero.

$$Ys(j)=0 \tag{4}$$

(In the expression (4), the yaw rate Y(j)=(j="b+1" to "d") is zero.)

When the own vehicle V starts to turn after the own vehicle V stops temporarily, the yaw rate Y changes from the zero value to the non-zero value. In this case, the smoothed yaw rate Ys calculated by any of the expressions (1L) to (2R) may be calculated as a generally zero value even though the actual yaw rate Y is the non-zero value. In this case, the inaccurate value is calculated.

Accordingly, when the yaw rate Y changes from the zero value to the non-zero value after the left turn start condition is satisfied, the first embodiment apparatus calculates the smoothed yaw rate Ys of the own vehicle V turning left as described below.

When a first situation described below occurs and the number of the consecutive yaw rates Y(d+1) to Y(n) becomes larger than or equal to the number "M", the first embodiment apparatus calculates the average of the consecutive yaw rates Y(n−(M−1)) to Y(n) as the smoothed yaw rate Ys(n) as shown by an expression (5L) described below. The first situation is a situation that the left turn waiting condition is satisfied, the own vehicle V continues to stop until the calculation cycle "d", the own vehicle V starts to turn left at the calculation cycle "d+1" and the own vehicle V continues to turn left without stopping until the calculation cycle "n", that is, the yaw rate Y continues not to be zero from the calculation cycle "d+1" to the calculation cycle "n".

$$Ys(n)=\{Y(n-(M-1))+\ldots+Y(n-1)+Y(n)\}/M \tag{5L}$$

(In the expression (5L), the yaw rate Y(k) (k="d+1" to "n") is the non-zero value and the number "n−d" is larger than or equal to the number "M".)

On the other hand, when the first situation occurs and the number of the consecutive yaw rates Y(d+1) to Y(n) is smaller than the number "M", the first embodiment apparatus calculates the average of the yaw rates Y(d+1) to Y(n) as the smoothed yaw rate Ys(n) as shown by an expression (6L) described below.

$$Ys(n)=\{Y(d+1)+\ldots+Y(n-1)+Y(n)\}/(n-d) \tag{6L}$$

(In the expression (6L), the yaw rate Y(k) (k="d+1" to "n") is the non-zero value and the number "n−d" is smaller than the number "M".)

Accordingly, when the yaw rate Y changes from the zero value to the non-zero value after the right turn start condition is satisfied, the first embodiment apparatus calculates the smoothed yaw rate Ys of the own vehicle V turning right as described below.

When a second situation described below occurs and the number of the consecutive yaw rates Y(d+1) to Y(n) becomes larger than or equal to the number "M", the first embodiment apparatus calculates the average of the consecutive yaw rates Y(n−(M−1)) to Y(n) multiplied by "−1", respectively as the smoothed yaw rate Ys(n) as shown by an expression (5R) described below. The second situation is a situation that the right turn waiting condition is satisfied, the own vehicle V continues to stop until the calculation cycle "d", the own vehicle V starts to turn right at the calculation cycle "d+1" and the own vehicle V continues to turn right without stopping until the calculation cycle "n", that is, the yaw rate Y continues not to be zero from the calculation cycle "d+1" to the calculation cycle "n".

$$Ys(n)=\{(-Y(n-(M-1)))+\ldots+(-Y(n-1))+(-Y(n))\}/M \tag{5R}$$

(In the expression (5R), the yaw rate Y(k) (k="d+1" to "n") is the non-zero value and the number "n−d" is larger than or equal to the number "M".)

On the other hand, when the second situation occurs and the number of the consecutive yaw rates Y(d+1) to Y(n) is smaller than the number "M", the first embodiment apparatus calculates the average of the yaw rates Y(d+1) to Y(n) multiplied by "−1", respectively as the smoothed yaw rate Ys(n) as shown by an expression (6R) described below.

$$Ys(n)=\{(-Y(d+1))+\ldots+(-Y(n-1))+(-Y(n))\}/(n-d) \tag{6R}$$

(In the expression (6R), the yaw rate Y(k) (k="d+1" to "n") is the non-zero value and the number "n−d" is smaller than the number "M".)

<Calculation of Turning Angle>

The first embodiment apparatus uses the total turn angle θtotal(n) corresponding to the angle of the turning of the own vehicle V from the calculation cycle "0" to the calculation cycle "n" for calculating effective lengths of predicted routes as described later. The first embodiment apparatus calculates an instantaneous turning angle θ corresponding to an angle of the turning of the own vehicle V for the predetermined calculation time Tcal for calculating the total turn angle θtotal(n).

The first embodiment apparatus sets the instantaneous turn angle θ(0) to zero as shown by an expression (7) described below when the left or right turn waiting condition is satisfied, that is, when the calculation cycle "n" is the calculation cycle "0".

$$\theta(0)=0° \tag{7}$$

After the calculation cycle "n" is the calculation cycle "0", that is, while the calculation cycle "n" is larger than or equal to the calculation cycle "1", the first embodiment apparatus calculates the instantaneous turn angle θ(n) by multiplying the smoothed yaw rate Ys(n) by the predetermined calculation time Tcal as shown by an expression (8) described below until the first embodiment apparatus makes the left or right turn end determination.

$$\theta(n)=Ys(n)\cdot Tcal \tag{8}$$

When the left or right turn waiting condition is satisfied, that is, the calculation cycle "n" is set to the calculation cycle "0", the first embodiment apparatus sets the total turn angle θtotal(0) to "0°", that is, initializes the total turn angle θtotal(0) as shown by an expression (9) described below.

$$\theta total(0)=0° \tag{9}$$

After the calculation cycle "n" is set to the cycle "0", that is, while the calculation cycle "n" is larger than or equal to the calculation cycle "1", the first embodiment apparatus calculates the total turn angle θtotal(n) by adding the instantaneous turn angle θ(n) to the lastly-calculated turn angle θtotal(n−1) as shown by an expression (10) described below. Thereby, the first embodiment apparatus can appropriately calculate the total turn angle of the own vehicle V when the own vehicle V turns left or right in the intersection.

$$\theta total(n)=\theta total(n-1)+\theta(n) \tag{10}$$

<Calculation of Turn Radius>

The first embodiment apparatus acquires two predicted vehicle moving routes as described below. Each of the predicted vehicle moving routes is expressed by a circle. A radius of one of the predicted vehicle moving routes is different from a radius of the other predicted vehicle moving route. Each of the radii of the circles expressing the predicted vehicle moving routes, respectively is calculated on the basis of a radius R of a circle which the vehicle base point O (see FIG. 2) is predicted to pass. Hereinafter, the radius R will be referred to as "the turn radius R". The first embodiment apparatus calculates the turn radius R each time the predetermined calculation time Tcal elapses as described below while the own vehicle V is turning left or right.

When the smoothed yaw rate Ys(n) is larger than a predetermined threshold Y0, the first embodiment apparatus calculates the turn radius R(n) by dividing the vehicle speed SPD(n) by the smoothed yaw rate Ys(n) as shown by an expression (11) described below, independently of whether the own vehicle V is in any of the left turn waiting state L1, the right turn waiting state R1, the left turn state L2 and the right turn state R2. In other words, when the smoothed yaw rate Ys(n) is larger than the predetermined threshold Y0, the turn radius R(n) corresponds to a curvature radius at the vehicle base point O(n) (see FIG. 4). In this embodiment, the predetermined threshold Y0 is $10^{-6}$ and hereinafter, will be referred to as "the straight moving threshold Y0".

$$R(n)=SPD(n)/Ys(n) \tag{11}$$

The straight moving threshold Y0 is a threshold for avoiding the turn radius R(n) calculated by dividing the vehicle speed SPD(n) by the smoothed yaw rate Ys(n) close to zero, from being excessively large.

The smoothed yaw rate Ys(n) is larger than the straight moving threshold Y0 when the own vehicle V is turning in the same direction as the direction of the left or right turning of the own vehicle V. On the other hand, the smoothed yaw rate Ys(n) is smaller than or equal to the straight moving threshold Y0 when the negative smoothed yaw rate Ys is calculated, for example, since the own vehicle V stops temporarily or the own vehicle V moves straight or the own vehicle V turns at least temporarily in a direction different from the direction of the left or right turning of the own vehicle V.

When the smoothed yaw rate Ys(n) is smaller than or equal to the straight moving threshold Y0 and the own vehicle V is in the left or right turn waiting state L1 or R1, the first embodiment apparatus calculates the turn radius R(n) by using a first method as described later. When the smoothed yaw rate Ys(n) is smaller than or equal to the straight moving threshold Y0 and the own vehicle V is in the left or right turn state L2 or R2, the first embodiment apparatus calculates the turn radius R(n) by using a second method different from the first method as described later.

In particular, when the own vehicle V is in the left or right turn waiting state L1 or R1, the own vehicle V does not turn left or right and is set to turn left or right. In this case, the own vehicle V is likely to be near an entrance of the intersection. The inventors of this application have realized that usage of a generally straight line as the predicted vehicle moving route in the intersection can cause the first embodiment apparatus to appropriately draw the driver's attention when the smoothed yaw rate Ys(n) is smaller than or equal to the straight moving threshold Y0.

According to the first method, when the own vehicle V is in the left or right turn waiting state L1 or R1 and the smoothed yaw rate Ys(n) is smaller than or equal to the straight moving threshold Y0, the first embodiment apparatus sets the turn radius R(n) to a predetermined value corresponding to a value considerably larger than the turn radius of the own vehicle V turning left or right in the typical intersection as shown by an expression (12) described below. Thereby, as described later, the predicted vehicle moving route for the intersection is set to the generally straight line. In the first embodiment, the predetermined value is 12700 m and hereinafter, will be referred to as "the straight equivalent value Rc".

$$R(n)=Rc=12700 \text{ m} \tag{12}$$

On the other hand, according to the second method, when the own vehicle V is in the left or right turn state L2 or R2, the own vehicle V has started to turn left or right. When the own vehicle V has started to turn left or right and the smoothed yaw rate Ys(n) is smaller than or equal to the straight moving threshold Y0, the own vehicle V is likely to stop temporarily or the own vehicle V is likely to turn temporarily in the direction opposite to the turning direction of the own vehicle V turning left or right.

Accordingly, when the own vehicle V is in the left or right turn state L2 or R2 and the smoothed yaw rate Ys(n) is smaller than or equal to the straight moving threshold Y0, the first embodiment apparatus sets the turn radius R(n) to the turn radius R(c) acquired at the last calculation cycle "c" of the past calculation cycles, at which the acquired smoothed yaw rate Ys is larger than the straight moving threshold Y0, as shown by an expression (13) described below. The past calculation cycles are the calculation cycles before the present time.

$$R(n)=R(c) \tag{13}$$

It should be noted that the turn radius R(n) is not limited to 12700 m when the own vehicle V is in the left or right turn waiting state L1 and R1 and the smoothed yaw rate Ys(n) is smaller than or equal to the straight moving threshold Y0. When the own vehicle V is in the left or right turn waiting state L1 or R1 and the smoothed yaw rate Ys(n) is smaller than or equal to the straight moving threshold Y0, the turn radius R(n) may be set to an optional value considerably larger than the turn radius of the own vehicle V in the typical intersection.

<Calculation of Turning Center>

The first embodiment apparatus calculates coordinates (Cx(n), Cy(n)) of a center of the turning of the own vehicle V at the calculation cycle "n" in the left turn waiting state L1 or the left turn state L2 and coordinates (Cx(n), Cy(n)) of a center of the turning of the own vehicle V at the calculation cycle "n" in the right turn waiting state R1 or the right turn state R2 on the basis of the turn radius R(n) as described below. Hereinafter, the coordinates (Cx(n), Cy(n)) will be referred to as "the turn center coordinates (Cx(n), Cy(n))".

When the own vehicle V is in the left turn waiting state L1 or the left turn state L2, the first embodiment apparatus calculates, as the turn center coordinates (Cx(n), Cy(n)), a position which is located on a line extending in a direction perpendicular to the moving direction of the own vehicle V at the calculation cycle "n" and passing through the vehicle base point O(n), is away from the vehicle base point O(n) by the turn radius R(n) and is located at the left side of a line extending in the moving direction of the own vehicle V at the calculation cycle "n" and passing through the vehicle base point O(n). The moving direction of the own vehicle V at the calculation cycle "n" can be calculated, using the smoothed yaw rate Ys(n) and hereinafter, will be referred to as "the vehicle moving direction TD".

Figure 4:
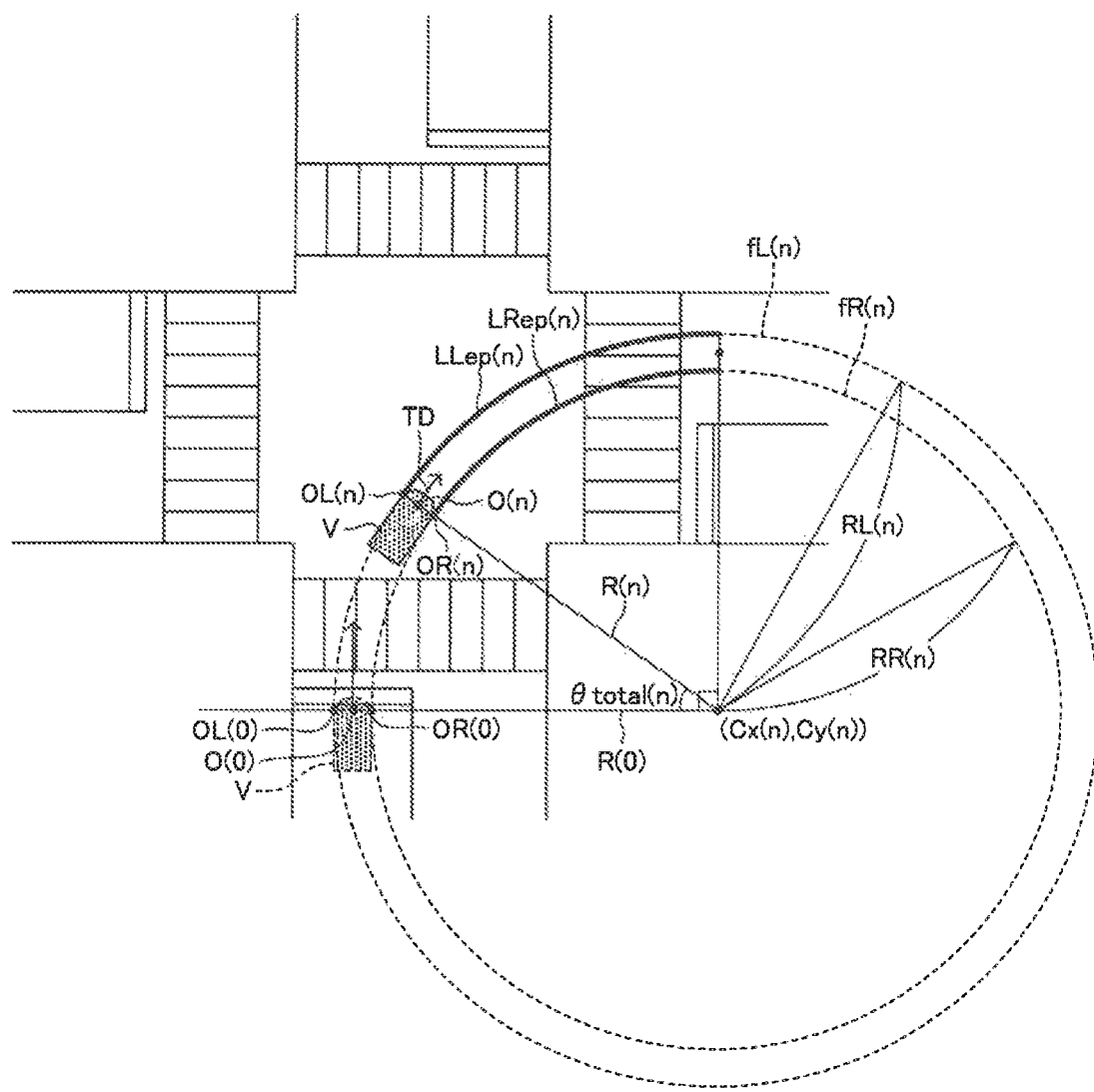
FIG. 4 is a view for showing the vehicle which turns right at the intersection.

When the own vehicle V is in the right turn waiting state R1 or the right turn state R2, the first embodiment apparatus calculates, as the turn center coordinates (Cx(n), Cy(n)), a position which is located on the line extending in the direction perpendicular to the vehicle moving direction TD at the calculation cycle "n" and passing through the vehicle base point O(n), is away from the vehicle base point O(n) by the turn radius R(n) and is located at the right side of the line extending in the vehicle moving direction TD at the calculation cycle "n" and passing through the vehicle base point O(n) (see FIG. 4).

In an example shown in FIG. 4, the own vehicle V is turning right at the constant vehicle speed SPD and the constant smoothed yaw rate Ys. Thus, while the own vehicle V is turning right, the turn radius R(n) is constant and the turn center coordinates (Cx(n), Cy(n)) are constant. However, when the vehicle speed SPD and the smoothed yaw rate Ys change while the own vehicle V is turning right, the turn radius R(n) changes, depending on the calculation cycle and as a result, the turn center coordinates (Cx(n), Cy(n)) are not constant. Also, in this case, the first embodiment apparatus can appropriately calculate the effective length LLe of a predicted left end route described later and the effective length LRe of a predicted right end route by calculating the total turn angle θtotal(n) as described above.

<Calculation of Left and Right End Turn Radii>

The first embodiment apparatus calculates a left end turn radius RL(n) and a right end turn radius RR(n) on the basis of the turn radius R(n) as described below.

When the own vehicle V turns left, that is, when the own vehicle V is in the left turn waiting state L1 or the left turn state L2, the first embodiment apparatus calculates the left end turn radius RL(n) by subtracting a half W/2 of a width W of the own vehicle V from the turn radius R(n) as shown by an expression (15) described below and calculates the right end turn radius RR(n) by adding the half W/2 to the turn radius R(n) as shown by an expression (16) described below.

$$RL(n)=R(n)-W/2 \tag{15}$$

$$RR(n)=R(n)+W/2 \tag{16}$$

When the own vehicle V turns right, that is, when the own vehicle V is in the right turn waiting state R1 or the right turn state R2, the first embodiment apparatus calculates the left end turn radius RL(n) by adding the half W/2 to the turn radius R(n) as shown by an expression (17) described below and calculates the right end turn radius RR(n) by subtracting the half W/2 from the turn radius R(n) as shown by an expression (18) described below.

$$RL(n)=R(n)+W/2 \tag{17}$$

$$RR(n)=R(n)-W/2 \tag{18}$$

As shown in FIG. 2, a left end OL(n) of the front end portion of the own vehicle V at the calculation cycle "n" corresponds to a position which is located on the line extending in the direction perpendicular to the vehicle moving direction TD and passing through the vehicle base point O(n), is away from the vehicle base point O(n) by the half W/2 and is located at the left side of the line extending in the vehicle moving direction TD and passing through the vehicle base point O(n). A right end OR(n) of the front end portion of the own vehicle V at the calculation cycle "n" corresponds to a position which is located on the line extending in the direction perpendicular to the vehicle moving direction TD and passing through the vehicle base point O(n), is away from the vehicle base point O(n) by the half W/2 and is located at the right side of the line extending in the vehicle moving direction TD and passing through the vehicle base point O(n). Hereinafter, the left end OL(n) of the front end portion of the own vehicle V at the calculation cycle "n" will be referred to as "the vehicle left end OL(n)" and the right end OR(n) of the front end portion of the own vehicle V at the calculation cycle "n" will be referred to as "the vehicle right end OL(n)".

Thus, the left end turn radius RL(n) corresponds to a radius of a circle expressing a route that the vehicle left end OL(n) is predicted to pass and the right end turn radius RR(n) corresponds to a radius of a circle expressing a route that the vehicle right end OR(n) is predicted to pass.

The width W of the own vehicle V is previously set for each vehicle, to which the first embodiment apparatus is to be applied. The width W may be larger than the actual width of the vehicle and may be smaller than the actual width of the vehicle.

<Estimation of Predicted Left and Right End Routes>

When the own vehicle V is turning left or right, the first embodiment apparatus estimates a route which the vehicle left end OL is predicted to pass and a route which the vehicle right end OR is predicted to pass each time the predetermined calculation time Tcal elapses as described below. Hereinafter, the route which the vehicle left end OL is predicted to pass, will be referred to as "the predicted left end route" and the route which the vehicle right end OR is predicted to pass, will be referred to as "the predicted right end route".

First, the first embodiment apparatus calculates a predicted left end route expression fL(n) expressing the predicted left end route at the calculation cycle "n" and a predicted right end route expression fR(n) expressing the predicted right end route at the calculation cycle "n" (see FIG. 4).

In particular, the first embodiment apparatus calculates, as the predicted left end route expression fL(n), an expression of a circle having a center defined by the turn center coordinates (Cx(n), Cy(n)) and the left end turn radius RL(n) as shown by an expression (19) described below. Further, the first embodiment apparatus calculates, as the predicted right end route expression fR(n), an expression of a circle having a center defined by the turn center coordinates (Cx(n), Cy(n)) and the right end turn radius RR(n) as shown by an expression (20) described below.

$$(x-Cx(n))^2+(y-Cy(n))^2=RL(n)^2 \qquad (19)$$

$$(x-Cx(n))^2+(y-Cy(n))^2=RR(n)^2 \qquad (19)$$

Figure 3:
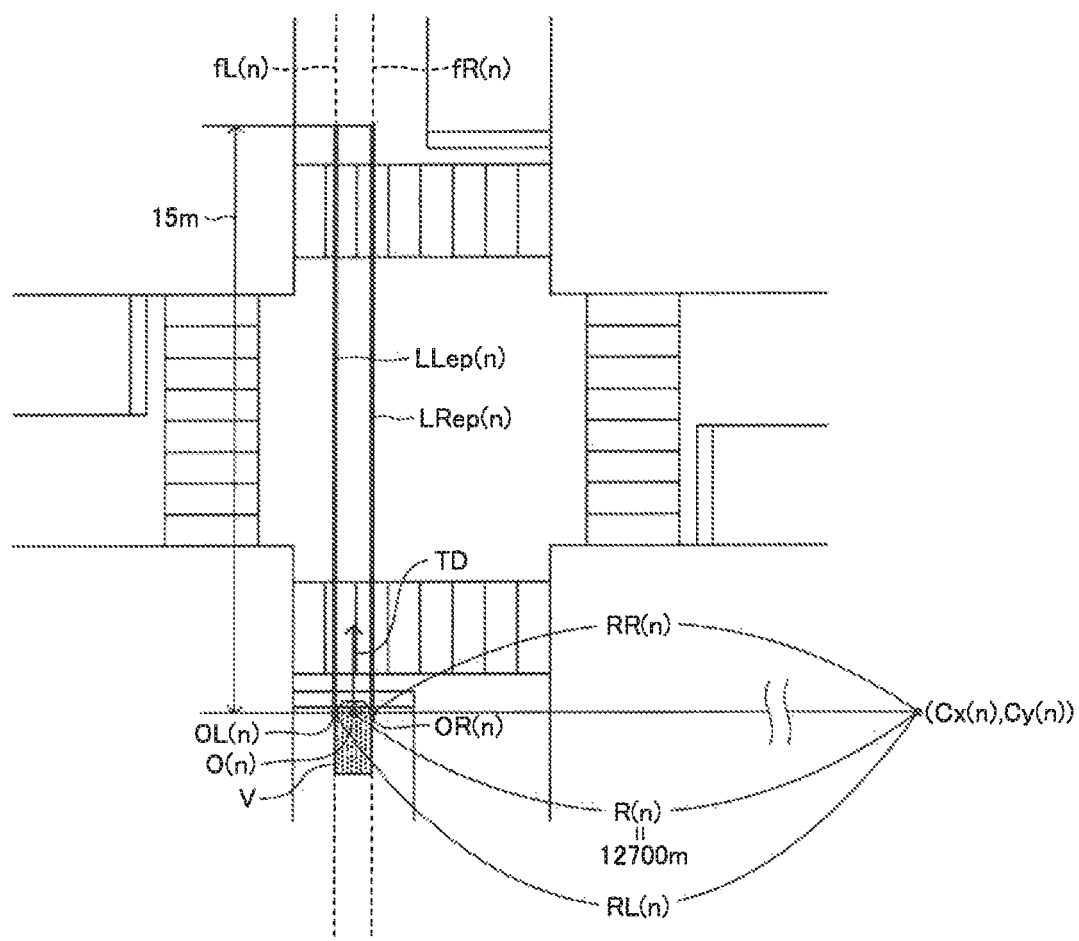
FIG. 3 is a view for showing the vehicle which is to start to turn left or right at an intersection.

As described above, when the own vehicle V is in the left or right turn waiting state L1 or R1 and the smoothed yaw rate Ys(n) is smaller than or equal to the straight moving threshold Y0 ($=10^{-6}$), the turn radius R(n) is set to the straight equivalent value Rc (=12700 m) (see the expression (12)). In this case, each of the predicted left and right end route expressions fL(n) and fR(n) is approximated by an expression of a straight line extending in the vehicle moving direction TD at the calculation cycle "n", respectively as shown in FIG. 3.

<Calculation of Effective Lengths of Predicted Left and Right End Routes>

When the own vehicle V is turning left or right, the first embodiment apparatus calculates the effective length LLe of the predicted left end route and the effective length LRe of the predicted right end route each time the predetermined calculation time Tcal elapses as described later. When there is an object which crosses at least one of portions of the predicted left and right end routes corresponding to the effective lengths LLe and LRe, respectively within a predetermined time, the first embodiment apparatus performs the attention operation to the driver. Hereinafter, the effective length LLe of the predicted left end route will be referred to as "the effective left end length LLe" and the effective length LRe of the predicted right end route will be referred to as "the effective right end length LRe".

As described above, when the own vehicle V is in the left or right turn waiting state L1 or R1 and the smoothed yaw rate Ys(n) is smaller than or equal to the straight moving threshold Y0, each of the predicted left and right end route expressions fL(n) and fR(n) is approximated by the expression of the straight line extending in the vehicle moving direction TD at the calculation cycle "n", respectively. In this case, the first embodiment apparatus sets the effective left and right end lengths LLe(n) and LRe(n), using a length of a width of a road, into which the own vehicle V is to enter after the own vehicle V completes the left or right turning in the typical intersection as bases, respectively as shown by an expression (21) described below (see a thick line in FIG. 3). For example, the length of the road, into which the own vehicle V is to enter after the own vehicle V completes the left or right turning in the typical intersection, may be set to an optional value between 15 m to 20 m and in the first embodiment, is set to 15 m.

$$LLe(n)=LRe(n)=15 \text{ m} \qquad (21)$$

When the own vehicle V is in the left or right turn waiting state L1 or R1 and the smoothed yaw rate Ys(n) is larger than the straight moving threshold Y0 or when the own vehicle V is in the left or right turn state L2 or R2, the first embodiment apparatus calculates, as the effective left and right end lengths LLe and LRe, lengths of the predicted left and right end routes, which the own vehicle V is predicted to turn or move or travel while the total turn angle θtotal of the own vehicle V changes from the present total turn angle θtotal to the turn end angle θend, respectively.

In particular, the first embodiment apparatus calculates the effective left and right end lengths LLe(n) and LRe(n) by expressions (22) and (23) described below, respectively. The first embodiment apparatus calculates an angle θre which the own vehicle V turns until the total turn angle θtotal reaches the turn end angle θend (=90°) by subtracting the total turn angle θtotal from the turn end angle θend. The first embodiment apparatus converts the unit of the angle θre to the radian. Further, the first embodiment apparatus calculates the effective left end length LLe(n) by multiplying the angle θre having the converted unit by the left end turn radius RL(n) (see the thick line in FIG. 4) and calculates the effective right end length LRe(n) by multiplying the angle θre having the converted unit by the right end turn radius RR(n) (see the thick line in FIG. 4). Hereinafter, the angle θre which the own vehicle V turns until the total turn angle θtotal reaches the turn end angle θend, will be referred to as "the remaining turn angle θre".

$$LLe(n)=RL(n)\cdot(90°-\theta total(n))\cdot\pi/180° \qquad (22)$$

$$LRe(n)=RR(n)\cdot(90°-\theta total(n))\cdot\pi/180° \qquad (23)$$

<Attention Operation to Driver>

When the own vehicle V is turning left or right, the first embodiment apparatus determines whether there is an object which crosses at least one of the portions of the predicted left and right end routes corresponding to the effective left and right end lengths LLe and LRe, respectively within the predetermined time each time the predetermined calculation time Tcal elapses. Hereinafter, the portion of the predicted left end route corresponding to the effective left end length LLe will be referred to as "the effective portion LLep of the predicted left end route" or "the effective portion of the predicted route". Further, the portion of the predicted right end route corresponding to the effective right end length LRe will be referred to as "the effective portion LRep of the predicted right end route" or "the effective portion of the predicted route". Furthermore, the object which crosses at least one of the effective portions LLep and LRep of the predicted left and right end routes within the predetermined time, is a moving object and hereinafter, will be referred to as "the target object".

When the first embodiment apparatus determines that there is the target object, the first embodiment apparatus determines that the object may cross the effective portion of the predicted route. In this case, the first embodiment apparatus performs the attention operation for drawing the driver's attention. The first embodiment apparatus performs processes described below for determining whether there is the target object.

<Acquisition of Object Information>

When the own vehicle V is turning left or right, the first embodiment apparatus acquires information on the object existing around the own vehicle V such as a position of the object with respect to the own vehicle V, a moving direction of the object and a moving speed of the object as object information each time the predetermined calculation time Tcal elapses. In an example shown in FIG. 5, the first embodiment apparatus acquires the object information on the objects A to D existing around the own vehicle V at the calculation cycle "n".

<Calculation of Predicted Route of Object>

The first embodiment apparatus calculates a predicted route expression g of a half line extending from the position of the object in the moving direction of the object on the basis of the object information. In the example shown in FIG. 5, the first embodiment apparatus calculates predicted route expressions ga(n), gb(n), gc(n) and gd(n) extending from the positions of the objects A to D in the moving directions of the objects A to D (see arrows in FIG. 5) on the basis of the object information on the objects A to D acquired at the calculation cycle "n", respectively. Hereinafter, the predicted route expression g(n) will be simply referred to as "the expression g(n)". In this case, the expression g(n) is any of the expressions ga(n), gb(n), gc(n) and gd(n).

<First Crossing Condition>

The first embodiment apparatus determines whether a first crossing condition that the straight line expressed by the expression g(n) crosses at least one of the effective portions LLep and LRep of the predicted left and right end routes, is satisfied. It should be noted that in this description, when the predicted moving route of the object is tangent to the effective portion LLep or LRep of the predicted left or right end route, the predicted moving route of the object does not cross the effective portion LLep or LRep of the predicted left or right end route. Hereinafter, the straight line expressed by the expression g(n) will be referred to as "the straight line g(n)".

Figure 5:
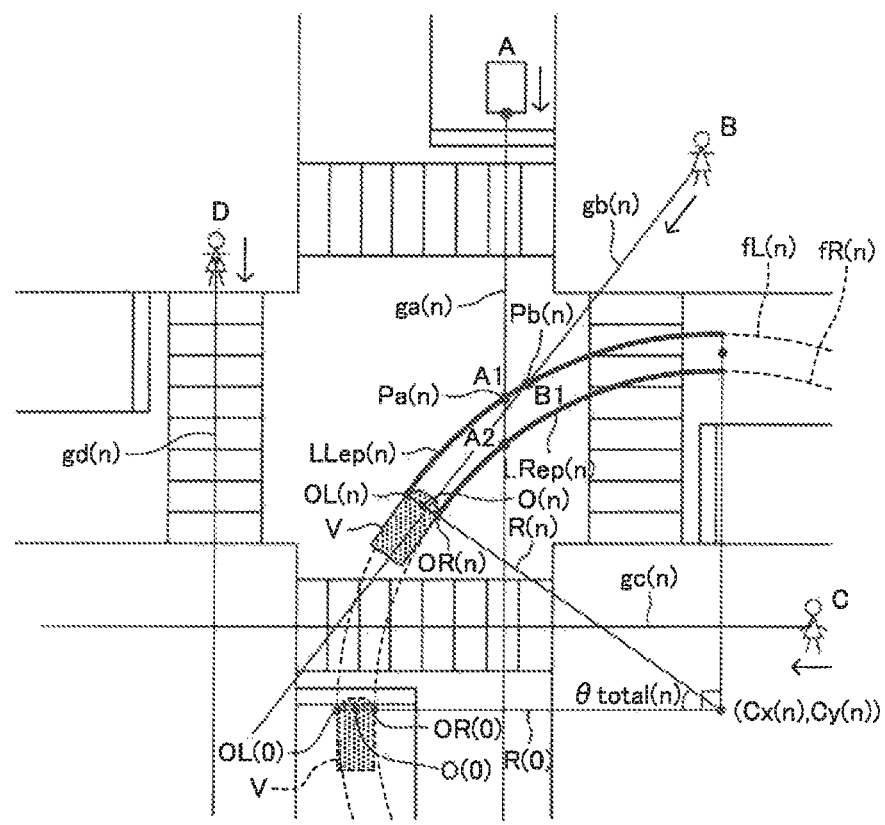
FIG. 5 is a view used for describing an attention operation to a driver of the vehicle performed by the first embodiment apparatus.

In the example shown in FIG. 5, the straight line expressed by the expression ga(n) crosses the effective portion LLep(n) of the predicted left end route shown by the thick solid line at a point A1 and the effective portion LRep(n) of the predicted right end route shown by the thick solid line at a point A2. Thus, the expression ga(n) satisfies the first crossing condition. The straight line expressed by the expression gb(n) crosses the effective portion LLep(n) of the predicted left end route at a point B1. Thus, the expression gb(n) satisfies the first crossing condition.

On the other hand, the straight lines expressed by the expressions gc(n) and gd(n), respectively do not cross the effective portions LLep(n) and LRep(n) of the predicted left and right end routes. Thus, the expressions gc(n) and gd(n) do not satisfy the first crossing condition.

<Calculation of Coordinates of Crossing Point P>

When the expression g(n) satisfies the first crossing condition, the first embodiment apparatus calculates the number of points which the straight line g(n) crosses the effective portion LLep(n) of the predicted left end route and/or the effective portion LRep(n) of the predicted right end route. Hereinafter, the point which the straight line g(n) crosses any of the effective portions LLep(n) and LRep(n) of the predicted left and right end routes, will be referred to as "the first crossing point".

When the number of the first crossing points is two, the first embodiment apparatus calculates coordinates of a point which the straight line g(n) first crosses the effective portion of the predicted route in the moving direction of the object, as coordinates of a crossing point P(n). On the other hand, when the number of the first crossing point is one, the first embodiment apparatus calculates coordinates of the first crossing point as the coordinates of the crossing point P(n).

In the example shown in FIG. 5, regarding the expression ga(n), the first crossing points are points A1 and A2 and thus, the number of the first crossing points is two. Thus, the first embodiment apparatus calculates the coordinates of the point A1 which the straight line expressed by the expression ga(n) crosses the effective portion LLep(n) of the predicted left end route in the moving direction of the object A (i.e., a downward direction in a paper of FIG. 5), as the coordinates of the crossing point Pa(n). On the other hand, regarding the expression gb(n), the first crossing point is a point B1 and thus, the number of the first crossing point is one. Thus, the first embodiment apparatus calculates the coordinates of the point B1 as the coordinates of the crossing point Pb(n).

<Calculation of Time t1>

The first embodiment apparatus calculates a time t1 predictively required for the object to reach the predicted route for determining whether a time condition described later is satisfied. In particular, the first embodiment apparatus calculates the time predictively required for the object corresponding to the straight line g(n) which crosses the effective portion of the predicted route at the point P(n), to reach the point P(n), as a first time t1(n). The first time t1(n) is calculated by dividing a length of the straight line from the position of the object at the calculation cycle "n" to the point P(n) by the moving speed SPDs(n) of the object.

In the example shown in FIG. 5, the first embodiment apparatus calculates the first time t1a(n) predictively required for the object A to reach the point Pa(n) and the first time t1b(n) predictively required for the object B to reach the point Pb(n).

<Time Condition>

The first embodiment apparatus determines whether a time condition that the first time t1(n) is smaller than or equal to a first predetermine time t1th (in this embodiment, four seconds), is satisfied. When the time condition is satisfied for any of the expressions g(n), the first embodiment apparatus determines that there is/are the target object(s). On the other hand, when the time condition is not satisfied for the expressions g(n), the first embodiment apparatus determines that there is no target object.

In the example shown in FIG. 5, when the first time t1a(n) is three seconds and the first time t1b(n) is ten seconds, the first time t1a(n) is smaller than or equal to the first predetermined time t1th and thus, the time condition is satisfied for the expression ga(n). In this case, the first embodiment apparatus determines that there is the target object (i.e. the object A).

On the other hand, when the first time t1a(n) is five seconds and the first time b(n) is ten seconds, the first times t1a(n) and t1b(n) are larger than the first predetermine time t1th and thus, the time condition is not satisfied for the expressions ga(n) and gb(n). In this case, the first embodiment apparatus determines that there is no target object.

When the first embodiment apparatus determines that there is/are the target object(s), the first embodiment apparatus performs the attention operation for drawing the attention of the driver of the own vehicle V. On the other hand, when the first embodiment apparatus determines that there is no target object, the first embodiment apparatus does not perform the attention operation.

<Concrete Operation of First Embodiment Apparatus>

Below, a concrete operation of the first embodiment apparatus will be described. The CPU of the driving assist ECU 10 of the first embodiment apparatus is configured or programmed to execute a routine shown by a flowchart in FIG. 6 each time the predetermined calculation time Tcal elapses.

Figure 6:
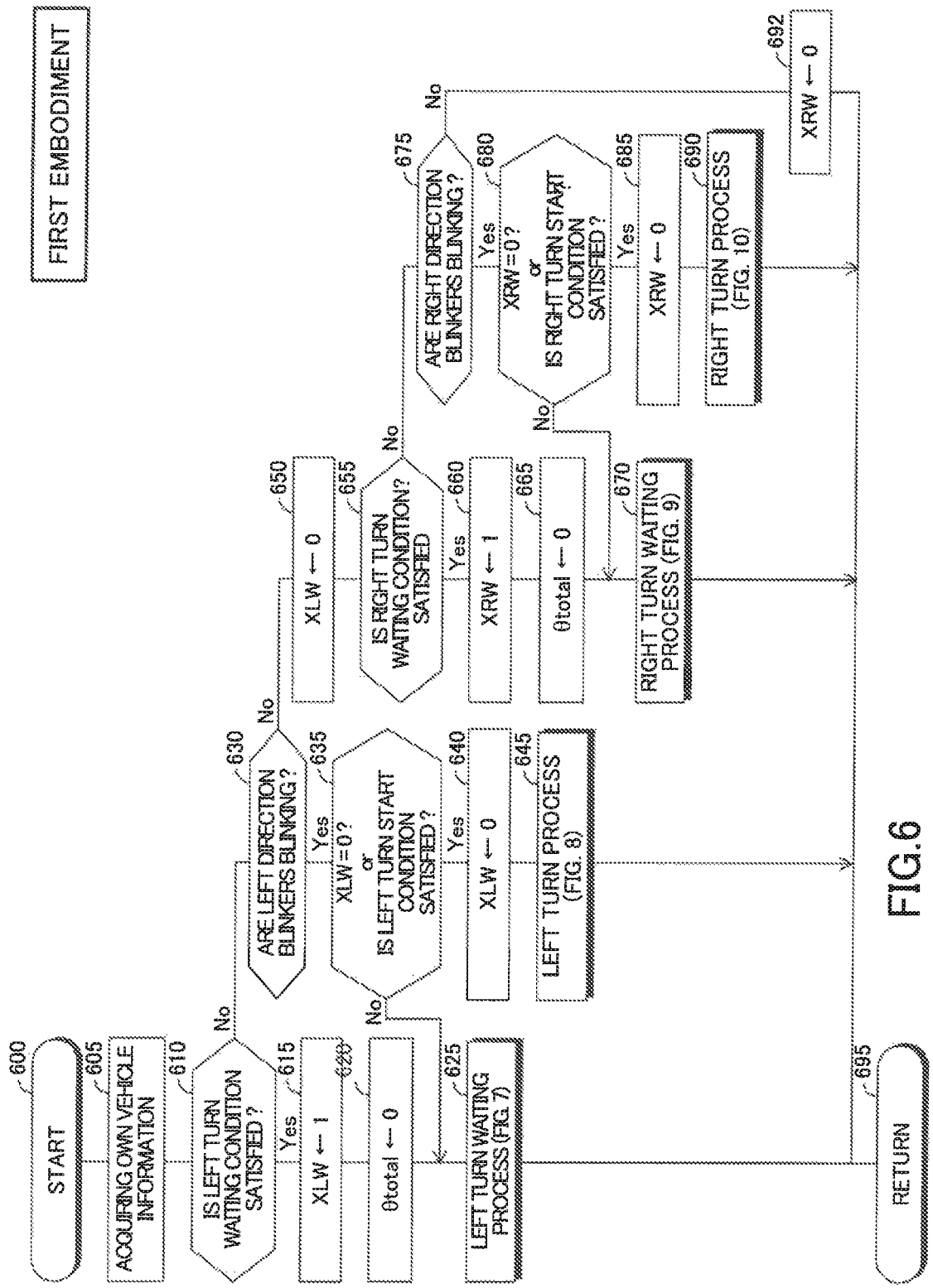
FIG. 6 is a view for showing a flowchart of a routine executed by a CPU of a driving assist ECU of the first embodiment apparatus.

At a predetermined timing, the CPU starts a process from a step 600 of FIG. 6 and then, proceeds with the process to a step 605 to acquire the own vehicle information and store the thus-acquired own vehicle information in the RAM of the driving assist ECU 10. Thereafter, the CPU proceeds with the process to a step 610 to determine whether the left turn waiting condition is satisfied on the basis of the own vehicle information.

When the left turn waiting condition is satisfied, the CPU determines "Yes" at the step 610 and then, sequentially executes processes of steps 615 and 620 described below. Thereafter, the CPU proceeds with the process to a step 625. As described above, the left turn waiting condition is satisfied only once for one intersection. Therefore, the CPU determines "Yes" at the step 610 only once for one intersection.

Step 615: The CPU sets a value of a left turn waiting flag XLW to "1". The value of the left turn waiting flag XLW has been set to "1" until the left turn start condition is satisfied after the left turn waiting condition is satisfied. Further, the value of the left turn waiting flag XLW is set to "0" when the left turn start condition is satisfied (see a step 640 described later).

Step 620: The CPU sets the total turn angle θtotal to 0°, that is, initializes the total turn angle θtotal. A process of the step 620 is executed when the CPU determines "Yes" at the step 610. Therefore, an initializing process of the total turn angle θtotal is executed only once when the left turn waiting condition is satisfied and the initializing process is not executed until the own vehicle V completes the left turning.

Figure 7:
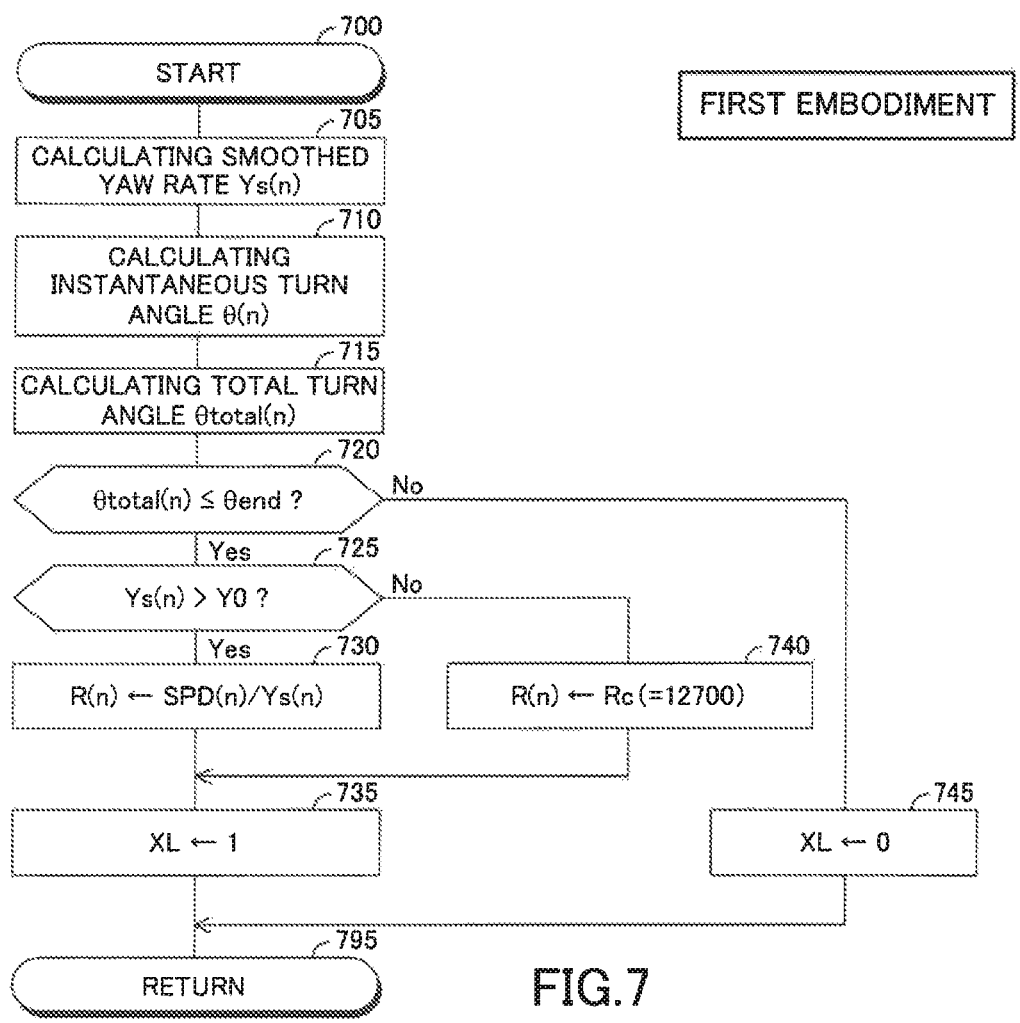
FIG. 7 is a view for showing a flowchart of a routine executed by the CPU.

When the CPU proceeds with the process to the step 625, the CPU executes a routine shown by a flowchart in FIG. 7. Therefore, when the CPU proceeds with the process to the step 625, the CPU starts a process from a step 700 of FIG. 7 and then, sequentially executes processes of steps 705 to 715 described below. Thereafter, the CPU proceeds with the process to a step 720.

Step 705: The CPU calculates the smoothed yaw rate Ys(n) in accordance with any of the expressions (1L), (2L), (3), (4), (5L) and (6L) and stores the thus-calculated smoothed yaw rate Ys(n) in the RAM.

Step 710: The CPU calculates the instantaneous turn angle θ(n) in accordance with any of the expressions (7) and (8) and stores the thus-calculated instantaneous turn angle θ(n) in the RAM.

Step 715: The CPU calculates the total turn angle θtotal(n) in accordance with any of the expressions (9) and (10) and stores the thus-calculated total turn angle θtotal(n) in the RAM.

When the CPU proceeds with the process to the step 720, the CPU determines whether the total turn angle θtotal(n) is smaller than or equal to the turn end angle θend (=90°), that is, whether the own vehicle V turns left. When the total turn angle θtotal(n) is smaller than or equal to the turn end angle θend, the CPU determines "Yes" at the step 720 and then, proceeds with the process to a step 725 to determine whether the smoothed yaw rate Ys(n) is larger than the straight moving threshold Y0 (=$10^{-6}$).

When the smoothed yaw rate Ys(n) is larger than the straight moving threshold Y0, the CPU determines "Yes" at the step 725 and then, executes a process of a step 730 described below. Thereafter, the CPU proceeds with the process to a step 735. It should be noted that it is determined "Yes" at the step 725 typically when the own vehicle V turns left temporarily while the own vehicle V moves straight to a point where the own vehicle V can turn left.

Step 730: The CPU sets the turn radius R(n) to a value obtained by dividing the vehicle speed SPD(n) by the smoothed yaw rate Ys(n) as shown the expression (11) and stores the thus-set turn radius R(n) in the RAM.

When the smoothed yaw rate Ys(n) is smaller than or equal to the straight moving threshold Y0 at a time of the CPU executing a process of the step 725, the CPU determines "No" at the step 725 and then, executes a process of a step 740 described below. Thereafter, the CPU proceeds with the process to the step 735. It should be noted that it is determined "No" at the step 725 typically when the own vehicle V stops at a red light in an attempt to turn left or when the own vehicle V moves straight to the point where the own vehicle V can turn left after the left turn waiting condition is satisfied or when the negative smoothed yaw rate Ys is calculated due to a temporary right turning of the own vehicle V while the own vehicle V moves straight to the point where the own vehicle V can turn left after the left turn waiting condition is satisfied.

Step 740: The CPU sets the turn radius R(n) to the straight line equivalent value Rc (=12700 m) as shown by the expression (12) and stores the thus-set turn radius R(n) in the RAM.

When the CPU proceeds with the process to the step 735, the CPU sets a value of a left turn flag XL to "1" and then, proceeds with the process to a step 695 of FIG. 6 via a step 795 to terminate this routine once.

When the total turn angle θtotal(n) is larger than the turn end angle fiend at a time of the CPU executing a process of the step 720, the CPU determines "No" at the step 720, that is, the CPU determines that the own vehicle V completes the left turning and then, proceeds with the process to a step 745 to set the value of the left turn flag XL to "0". Thereafter, the CPU proceeds with the process to the step 695 of FIG. 6 via the step 795 to terminate this routine once.

When the left turn waiting condition is not satisfied at a time of the CPU executing a process of the step 610 of FIG. 6, the CPU determines "No" at the step 610 and then, proceeds with the process to a step 630 to determine whether the left direction blinkers are blinking.

It should be noted that it is determined "No" at the step 610 when the determination process of the step 610 is executed after it is determined that the left turn waiting condition is first satisfied after it is determined last time that the left or right turning of the own vehicle V is completed or when the left turn waiting condition has not been satisfied after it is determined last time that the left or right turning of the own vehicle V is completed.

When the CPU executes the determination process of the step 610 after the CPU determines that the left turn waiting condition is first satisfied after the CPU determines last time that the left or right turning of the own vehicle V is completed, the CPU determines "No" at the step 610. When the CPU determines "No" at the step 610 as described above and the driver continues to cause the left direction blinkers to blink in an attempt to turn the own vehicle V left, the CPU determines "Yes" at the step 630 and then, proceeds with the process to a step 635.

When the CPU proceeds with the process to the step 635, the CPU determines whether the value of the left turn waiting flag XLW is "0" and the left turn start condition is satisfied. The CPU determines whether the left turn start condition is satisfied on the basis of the own vehicle information.

When the value of the left turn waiting flag XLW is "0" or the left turn start condition is satisfied, the CPU determines "Yes" at the step 635 and then, proceeds with the process to a step 640.

When the left turn waiting condition is once satisfied while the CPU determines last time that the left or right turning of the own vehicle V is completed, the value of the left turn waiting flag XLW is set to "1" at the step 615. Therefore, as far as the left turn start condition is satisfied, the CPU determines "Yes" at the step 635, that is, the CPU determines that the own vehicle V turns left.

On the other hand, when the value of the left turn waiting flag XLW is "1" or the left turn start condition is not satisfied at a time of the CPU executing a process of the step 635, the CPU determines "No" at the step 635 and then, proceeds with the process to the step 625 to execute the routine shown in FIG. 7 described above. It should be noted that the CPU determines "No" at the step 635 typically when the own vehicle V does not start to turn left after the left turn waiting condition is satisfied.

When the CPU proceeds with the process to the step 640, the CPU sets the value of the left turn waiting flag XLW to "0" and then, proceeds with the process to a step 645. Thereby, the value of the left turn waiting flag XLW is "0" from when the own vehicle V starts to turn left, that is, the left turn start condition is satisfied to when the left turn waiting condition is satisfied at the next intersection. Further, the value of the left turn waiting flag XLW is set to "1" when the own vehicle V is set to turn left at the next intersection, that is, the left turn waiting condition is satisfied at the next intersection (see the steps 610 and 615).

Therefore, the value of the left turn waiting flag XLW is "0" until the left turn waiting condition is satisfied at the next intersection even though the left turn start condition becomes unsatisfied after the left turn start condition is first satisfied (see a determination "Yes" at the step 635). Thus, the CPU determines "Yes" at the step 635, that is, the CPU determines that the own vehicle V is turning left.

Figure 8:
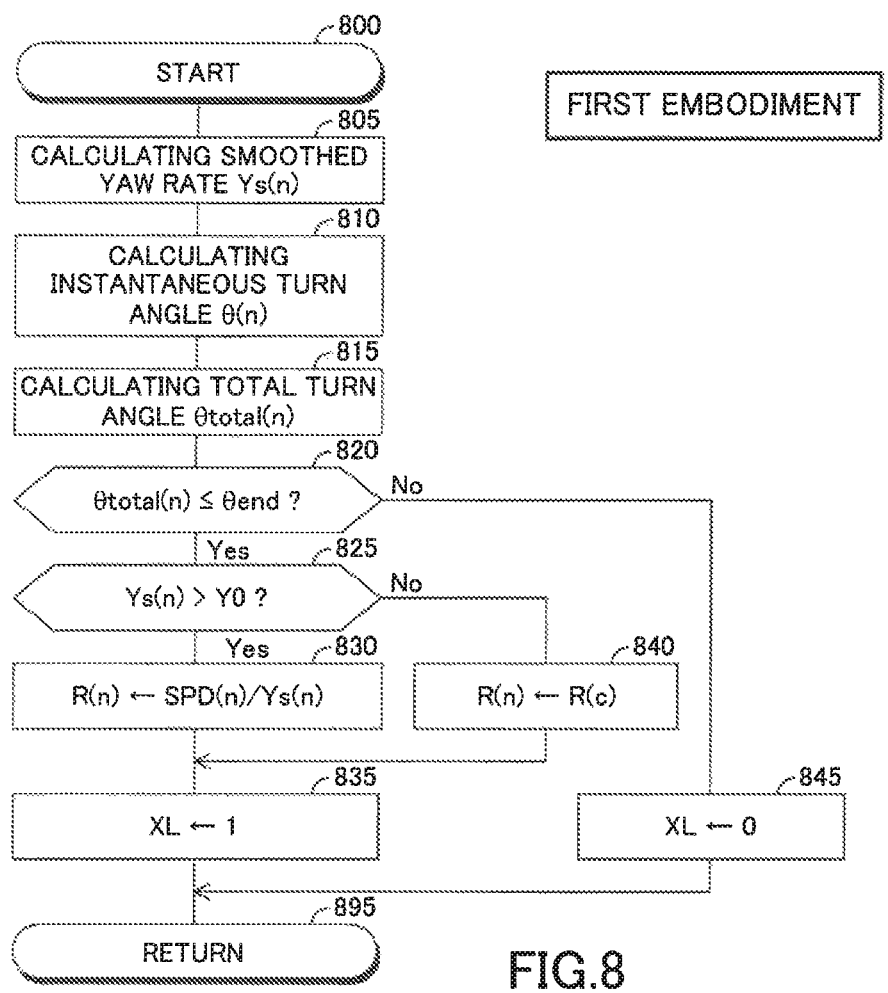
FIG. 8 is a view for showing a flowchart of a routine executed by the CPU.

When the CPU proceeds with the process to the step 645, the CPU executes a routine shown by a flowchart in FIG. 8. Therefore, when the CPU proceeds with the process to the step 645, the CPU starts a process from a step 800 of FIG. 8 and then, sequentially executes processes of steps 805 to 815 described below. Thereafter, the CPU proceeds with the process to a step 820.

Step 805: The CPU calculates the smoothed yaw rate Ys(n) in accordance with any of the expressions (1L), (2L), (3), (4), (5L) and (6L).

Step 810: The CPU calculates the instantaneous turn angle θ(n) in accordance with the expression (8).

Step 815: The CPU calculates the total turn angle θtotal(n) in accordance with the expression (10).

When the CPU proceeds with the process to the step 820, the CPU determines whether the total turn angle θtotal(n) is smaller than or equal to the turn end angle θend (=90°). When the total turn angle θtotal(n) is smaller than or equal to the turn end angle θend, the CPU determines "Yes" at the step 820 and then, proceeds with the process to a step 825 to determine whether the smoothed yaw rate Ys(n) is larger than the straight moving threshold Y0.

When the smoothed yaw rate Ys(n) is larger than the straight moving threshold Y0, the CPU determines "Yes" at the step 825 and then, executes a process of a step 830 described below. Thereafter, the CPU proceeds with the process to a step 835. It should be noted that it is determined "Yes" at the step 825 typically when the own vehicle V is turning left after the own vehicle V starts to turn left.

Step 830: The CPU sets the turn radius R(n) to a value obtained by dividing the vehicle speed SPD(n) by the smoothed yaw rate Ys(n) as shown by the expression (11) and stores the thus-set turn radius R(n) in the RAM.

On the other hand, when the smoothed yaw rate Ys(n) is smaller than or equal to the straight moving threshold Y0, the CPU determines "No" at the step 825 and then, executes a process of a step 840 described below. Thereafter, the CPU proceeds with the process to the step 835. It should be noted that it is determined "No" at the step 825 typically when the own vehicle V stops temporarily at the center area of the intersection to wait for the oncoming vehicle, the walking person and the like to pass the intersection after the left turn start condition is satisfied or when the negative smoothed yaw rate Ys is calculated due to a temporary right turning of the own vehicle V after the left turn start condition is satisfied.

Step 840: The CPU sets the turn radius R(c) acquired at the calculation cycle "c" as the turn radius R(n) as shown by the expression (13) and stores the thus-set turn radius R(n) in the RAM.

When the CPU proceeds with the process to the step 835, the CPU sets the value of the left turn flag XL to "1" and then, proceeds with the process to the step 695 of FIG. 6 via a step 895 to terminate this routine once.

When the total turn angle θtotal(n) is larger than the turn end angle θend at a time of the CPU executing a process of the step 820, the CPU determines "No" at the step 820 and then, proceeds with the process to a step 845 to set the value of the left turn flag XL to "0". Thereafter, the CPU proceeds with the process to the step 695 of FIG. 6 via the step 895 to terminate this routine once.

When the left direction blinkers do not blink at a time of the CPU executing a process of the step 630 of FIG. 6, the CPU determines "No" at the step 630 and then, executes a process of a step 650 described below. Thereafter, the CPU proceeds with the process to a step 655.

Step 650: The CPU sets the value of the left turn waiting flag XLW to "0". Thereby, the value of the left turn waiting flag XLW is "0" while the CPU executes processes of the step 655 and steps following the step 655.

When the CPU proceeds with the process to the step 655, the CPU determines whether the right turn waiting condition is satisfied on the basis of the own vehicle information. When the right turn waiting condition is satisfied, the CPU determines "Yes" at the step 655 and then, sequentially executes processes of steps 660 and 665 described below. Thereafter, the CPU proceeds with the process to a step 670. As described above, the right turn waiting condition is satisfied only once for one intersection. Therefore, the CPU determines "Yes" at the step 655 only once for one intersection.

Step 660: The CPU sets a value of a right turn waiting flag XRW to "1". The value of the right turn waiting flag XRW has been set to "1" until the right turn start condition is satisfied after the right turn waiting condition is satisfied. Further, the value of the right turn waiting flag XRW is set to "0" when the right turn start condition is satisfied (see a step 660 described later).

Step 665: The CPU sets the total turn angle θtotal to 0°, that is, initializes the total turn angle θtotal. The initializing process of the total turn angle θtotal is executed only once when the right turn waiting condition is satisfied and the initializing process is not executed until the own vehicle V completes the right turning.

Figure 9:
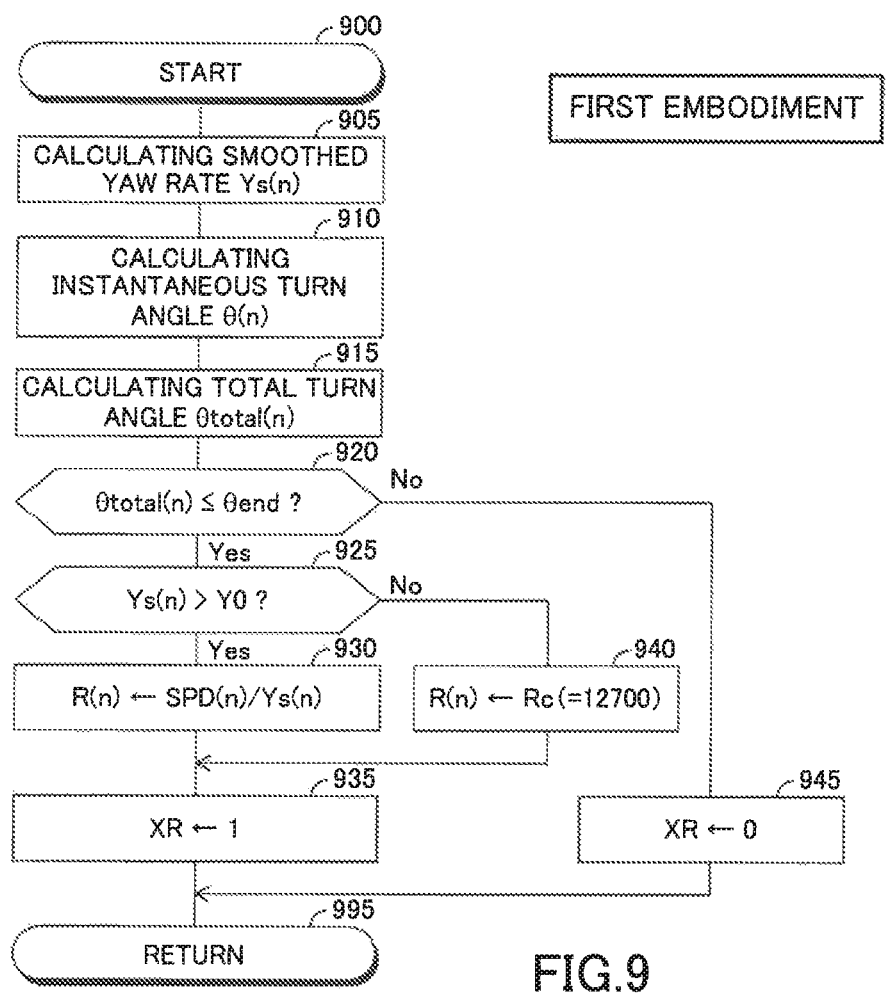
FIG. 9 is a view for showing a flowchart of a routine executed by the CPU.

When the CPU proceeds with the process to the step 670, the CPU executes a routine shown by a flowchart in FIG. 9. Therefore, when the CPU proceeds with the process to the step 670, the CPU starts a process from a step 900 of FIG. 9 and then, sequentially executes processes of steps 905 to 915 described below. Thereafter, the CPU proceeds with the process to a step 920.

Step 905: The CPU calculates the smoothed yaw rate Ys(n) in accordance with any of the expressions (1R), (2R), (3), (4), (5R) and (6R) and stores the thus-calculated smoothed yaw rate Ys(n) in the RAM.

Step 910: The CPU calculates the instantaneous turn angle θ(n) in accordance with any of the expressions (7) and (8) and stores the thus-calculated instantaneous turn angle θ(n) in the RAM.

Step 915: The CPU calculates the total turn angle θtotal(n) in accordance with any of the expressions (9) and (10) and stores the thus-calculated turn angle θtotal(n) in the RAM.

When the CPU proceeds with the process to the step 920, the CPU determines whether the total turn angle θtotal(n) is smaller than or equal to the turn end angle θend, that is, whether the own vehicle V turns right. When the total turn angle θtotal(n) is smaller than or equal to the turn end angle θend, the CPU determines "Yes" at the step 920 and then, proceeds with the process to a step 925 to determine whether the smoothed yaw rate Ys(n) is larger than the straight moving threshold Y0.

When the smoothed yaw rate Ys(n) is larger than the straight moving threshold Y0, the CPU determines "Yes" at the step 925 and then, executes a process of a step 930 described below. Thereafter, the CPU proceeds with the process to a step 935. It should be noted that it is determined "Yes" at the step 925 typically when the own vehicle V turns right temporarily while the own vehicle V moves straight to a point where the own vehicle V can turn right after the right turn waiting condition is satisfied.

Step 930: The CPU sets the turn radius R(n) to a value obtained by dividing the vehicle speed SPD(n) by the smoothed yaw rate Ys(n) as shown the expression (11) and stores the thus-set turn radius R(n) in the RAM.

When the smoothed yaw rate Ys(n) is smaller than or equal to the straight moving threshold Y0 at a time of the CPU executing a process of the step 925, the CPU determines "No" at the step 925 and then, executes a process of a step 940 described below. Thereafter, the CPU proceeds with the process to the step 935. It should be noted that it is determined "No" at the step 925 typically when the own vehicle V stops at the red light in an attempt to turn right or when the own vehicle V moves straight to the point where the own vehicle V can turn right after the right turn waiting condition is satisfied or when the negative smoothed yaw rate Ys is calculated due to a temporary left turning of the own vehicle V while the own vehicle V moves straight to the point where the own vehicle V can turn left after the right turn waiting condition is satisfied.

Step 940: The CPU sets the turn radius R(n) to the straight line equivalent value Rc as shown by the expression (12) and stores the thus-set turn radius R(n) in the RAM.

When the CPU proceeds with the process to the step 935, the CPU sets a value of a right turn flag XR to "1" and then, proceeds with the process to the step 695 of FIG. 6 via a step 995 to terminate this routine once.

When the total turn angle θtotal(n) is larger than the turn end angle θend at a time of the CPU executing a process of the step 920, the CPU determines "No" at the step 920, that is, the CPU determines that the own vehicle V completes the right turning and then, proceeds with the process to a step 945 to set the value of the right turn flag XR to "0". Thereafter, the CPU proceeds with the process to the step 695 of FIG. 6 via the step 995 to terminate this routine once.

When the right turn waiting condition is not satisfied at a time of the CPU executing a process of the step 655 of FIG. 6, the CPU determines "No" at the step 655 and then, proceeds with the process to a step 675 to determine whether the right direction blinkers are blinking.

It should be noted that it is determined "No" at the step 655 when a determination process of the step 655 is executed after it is determined that the right turn waiting condition is first satisfied after it is determined last time that the left or right turning of the own vehicle V is completed or when the right turn waiting condition has not been satisfied after it is determined last time that the left or right turning of the own vehicle V is completed.

When the CPU executes the determination process of the step 655 after the CPU determines that the right turn waiting condition is first satisfied after the CPU determines last time that the left or right turning of the own vehicle V is completed, the CPU determines "No" at the step 655. When the CPU determines "No" at the step 655 as described above and the driver continues to cause the right direction blinkers to blink in an attempt to turn the own vehicle V right, the CPU determines "Yes" at the step 675 and then, proceeds with the process to a step 680.

When the CPU proceeds with the process to the step 680, the CPU determines whether the value of the right turn waiting flag XRW is "0" and the right turn start condition is satisfied. The CPU determines whether the right turn start condition is satisfied on the basis of the own vehicle information.

When the value of the right turn waiting flag XRW is "0" or the right turn start condition is satisfied, the CPU determines "Yes" at the step 680 and then, proceeds with the process to a step 685.

When the right turn waiting condition is once satisfied after the CPU determines last time that the left or right turning of the own vehicle V is completed, the value of the right turn waiting flag XRW is set to "1" at the step 660. Therefore, as far as the right turn start condition has been satisfied, the CPU determines "Yes" at the step 680, that is, the CPU determines that the own vehicle V is turning right.

On the other hand, when the value of the right turn waiting flag XRW is "1" or the right turn start condition is not satisfied at a time of the CPU executing a process of the step 680, the CPU determines "No" at the step 680 and then, proceeds with the process to the step 670 to execute the routine shown in FIG. 9 described above. It should be noted that the CPU determines "No" at the step 680 typically when the own vehicle V does not start to turn right after the right turn waiting condition is satisfied.

When the CPU proceeds with the process to the step 685, the CPU sets the value of the right turn waiting flag XRW to "0" and then, proceeds with the process to a step 690. Thereby, the value of the right turn waiting flag XRW is "0" from when the own vehicle V starts to turn right, that is, the right turn start condition is satisfied to when the right turn waiting condition is satisfied at the next intersection. Further, the value of the right turn waiting flag XRW is set to "1" when the own vehicle V is set to turn right at the next intersection, that is, the right turn waiting condition is satisfied at the next intersection (see the processes of the steps 655 and 660).

Therefore, the value of the right turn waiting flag XRW is "0" until the right turn waiting condition is satisfied at the next intersection even though the right turn start condition becomes unsatisfied after the right turn start condition is first satisfied (see a determination "Yes" at the step 680). Thus, the CPU determines "Yes" at the step 680, that is, the CPU determines that the own vehicle V turns right.

Figure 10:
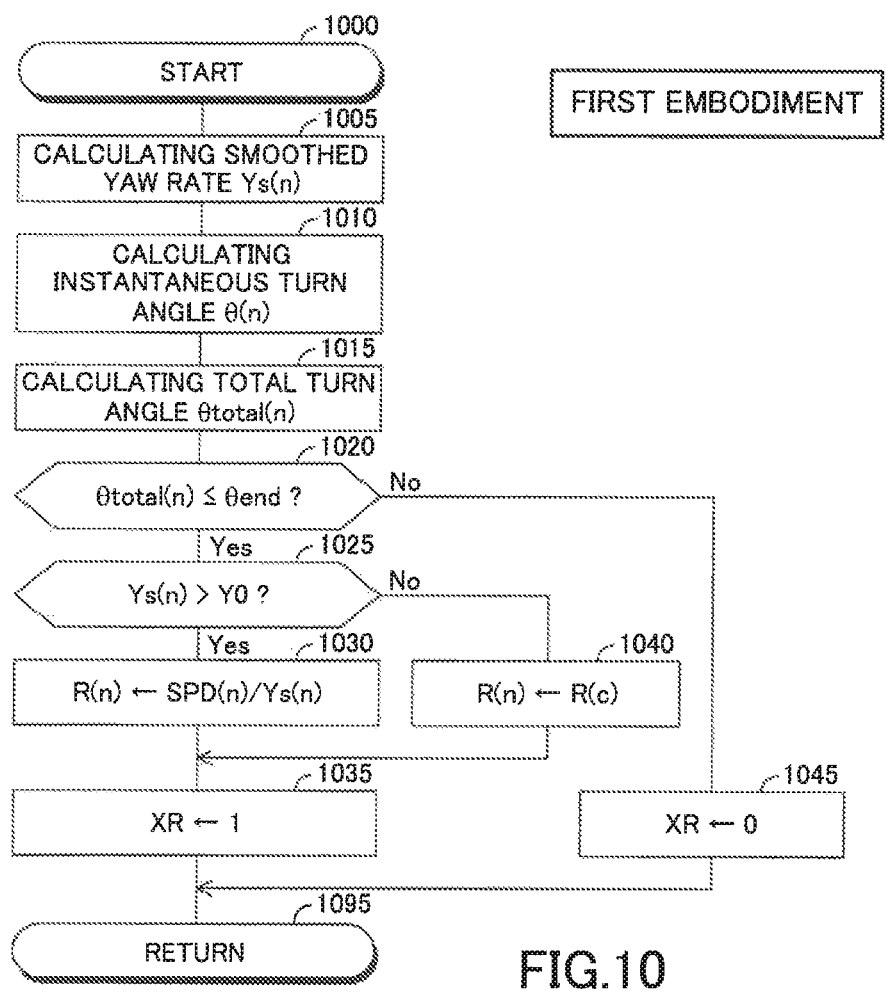
FIG. 10 is a view for showing a flowchart of a routine executed by the CPU.

When the CPU proceeds with the process to the step 690, the CPU executes a routine shown by a flowchart in FIG. 10. Therefore, when the CPU proceeds with the process to the step 690, the CPU starts a process from a step 1000 of FIG. 10 and then, sequentially executes processes of steps 1005 to 1015 described below. Thereafter, the CPU proceeds with the process to a step 1020.

Step 1005: The CPU calculates the smoothed yaw rate Ys(n) in accordance with any of the expressions (1R), (2R), (3), (4), (5R) and (6R).

Step 1010: The CPU calculates the instantaneous turn angle θ(n) in accordance with the expression (8).

Step 1015: The CPU calculates the total turn angle θtotal(n) in accordance with the expression (10).

When the CPU proceeds with the process to the step 1020, the CPU determines whether the total turn angle θtotal(n) is smaller than or equal to the turn end angle θend (=90°). When the total turn angle θtotal(n) is smaller than or equal to the turn end angle θend, the CPU determines "Yes" at the step 1020 and then, proceeds with the process to a step 1025 to determine whether the smoothed yaw rate Ys(n) is larger than the straight moving threshold Y0.

When the smoothed yaw rate Ys(n) is larger than the straight moving threshold Y0, the CPU determines "Yes" at the step 1025 and then, executes a process of a step 1030 described below. Thereafter, the CPU proceeds with the process to a step 1035. It should be noted that it is determined "Yes" at the step 1025 typically when the own vehicle V turns right after the own vehicle V starts to turn right.

Step 1030: The CPU sets the turn radius R(n) to a value obtained by dividing the vehicle speed SPD(n) by the smoothed yaw rate Ys(n) as shown by the expression (11) and stores the thus-set turn radius R(n) in the RAM.

On the other hand, when the smoothed yaw rate Ys(n) is smaller than or equal to the straight moving threshold Y0, the CPU determines "No" at the step 1025 and then, executes a process of a step 1040 described below. Thereafter, the CPU proceeds with the process to the step 1035. It should be noted that it is determined "No" at the step 1025 typically when the own vehicle V stops temporarily at the center area of the intersection to wait for the oncoming vehicle, the walking person and the like to pass the intersection after the right turn start condition is satisfied or when the negative smoothed yaw rate Ys is calculated due to a temporary left turning of the own vehicle V after the right turn start condition is satisfied.

Step 1040: The CPU sets the turn radius R(n) to the turn radius R(c) acquired at the calculation cycle "c" as shown by the expression (13) and stores the thus-set turn radius R(n) in the RAM.

When the CPU proceeds with the process to the step 1035, the CPU sets the value of the right turn flag XR to "1" and then, proceeds with the process to the step 695 of FIG. 6 via a step 1095 to terminate this routine once.

When the total turn angle θtotal(n) is larger than the turn end angle θend at a time of the CPU executing a process of the step 1020, the CPU determines "No" at the step 1020 and then, proceeds with the process to a step 1045 to set the value of the right turn flag XR to "0". Thereafter, the CPU proceeds with the process to the step 695 of FIG. 6 via step 1095 to terminate this routine once.

When the right direction blinkers do not blink at a time of the CPU executing a process of the step 675 of FIG. 6, the CPU determines "No" at the step 675 and then, executes a process of a step 692 described below. Thereafter, the CPU proceeds with the process to the step 695 to terminate this routine once.

Step 692: The CPU sets the value of the right turn waiting flag XRW to "0".

Figure 11:
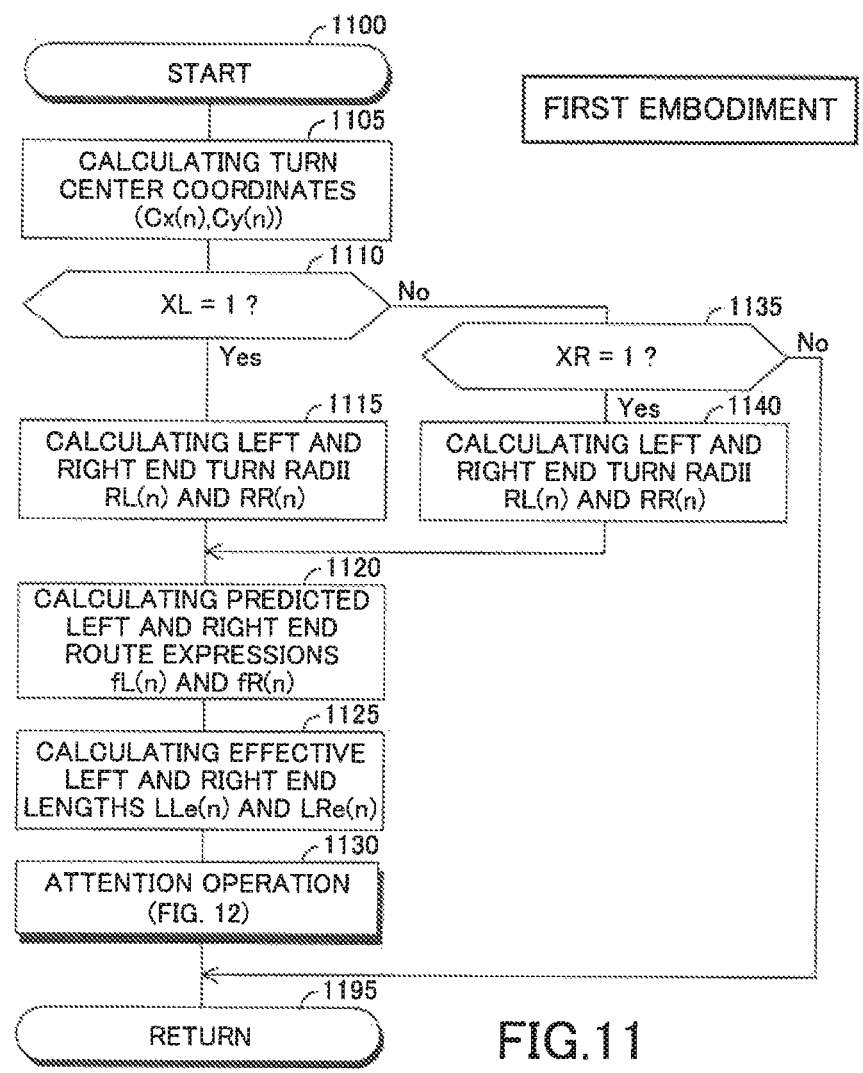
FIG. 11 is a view for showing a flowchart of a routine executed by the CPU.

Further, the CPU is configured or programmed to execute a routine shown by a flowchart in FIG. 11 each time the predetermined calculation time Tcal elapses. Therefore, at a predetermined timing, the CPU starts a process from a step 1100 of FIG. 11 and then, executes a process of a step 1105 described below. Thereafter, the CPU proceeds with the process to a step 1110.

Step 1105: The CPU calculates the turn center coordinates (Cx(n), Cy(n)) on the basis of the turn radius R(n) as described above and stores the thus-calculated turn center coordinates (Cx(n), Cy(n)) in the RAM.

When the CPU proceeds with the process to the step 1110, the CPU determines whether the value of the left turn flag XL is "1". When the value of the left turn flag XL is "1", the CPU determines "Yes" at the step 1110 and then, sequentially executes processes of steps 1115 to 1125 described below. Thereafter, the CPU proceeds with the process to a step 1130.

Step 1115: The CPU calculates the left end turn radius RL(n) in accordance with the expression (15) and the right end turn radius RR(n) in accordance with the expression (16) and stores the thus-calculated left and right end turning radii RL(n) and RR(n) in the RAM.

Step 1120: The CPU calculates the predicted left end route expression fL(n) in accordance with the expression (19) and the predicted right end route expression fR(n) in accordance with the expression (20) and stores the thus-calculated predicted left and right end route expressions fL(n) and fR(n) in the RAM.

Step 1125: The CPU calculates the effective left end length LLe(n) in accordance with the expression (22) and the effective right end length LRe(n) in accordance with the expression (23) and stores the thus-calculated effective left and right end lengths LLe(n) and LRe(n) in the RAM. In this regard, when the own vehicle V is in the left or right turn waiting state L1 or R1 and the smoothed yaw rate Ys(n) is smaller than or equal to the straight moving threshold Y0, the CPU sets the effective left end length LLe(n) to a length up to 15 m from the vehicle left end OL(n) along the vehicle moving direction TD and sets the effective right end length LRe(n) to a length up to 15 m from the vehicle right end OR(n) along the vehicle moving direction TD and stores the thus-set effective left and right end lengths LLe(n) and LRe(n) in the RAM.

On the other hand, when the value of the left turn flag XL is "0" at a time of the CPU executing a process of the step 1110, the CPU determines "No" at the step 1110 and then, proceeds with the process to a step 1135 to determine whether the value of the right turn flag XR is "1". When the value of the right turn flag XR is "1", the CPU determines "Yes" at the step 1135 and then, sequentially executes a process of a step 1140 described below and the processes of the steps 1120 and 1125. Thereafter, the CPU proceeds with the process to the step 1130.

Step 1140: The CPU calculates the left end turn radius RL(n) in accordance with the expression (17) and the right end turn radius RR(n) in accordance with the expression (18) and stores the thus-calculated left and right end turning radii RL(n) and RR(n) in the RAM.

Figure 12:
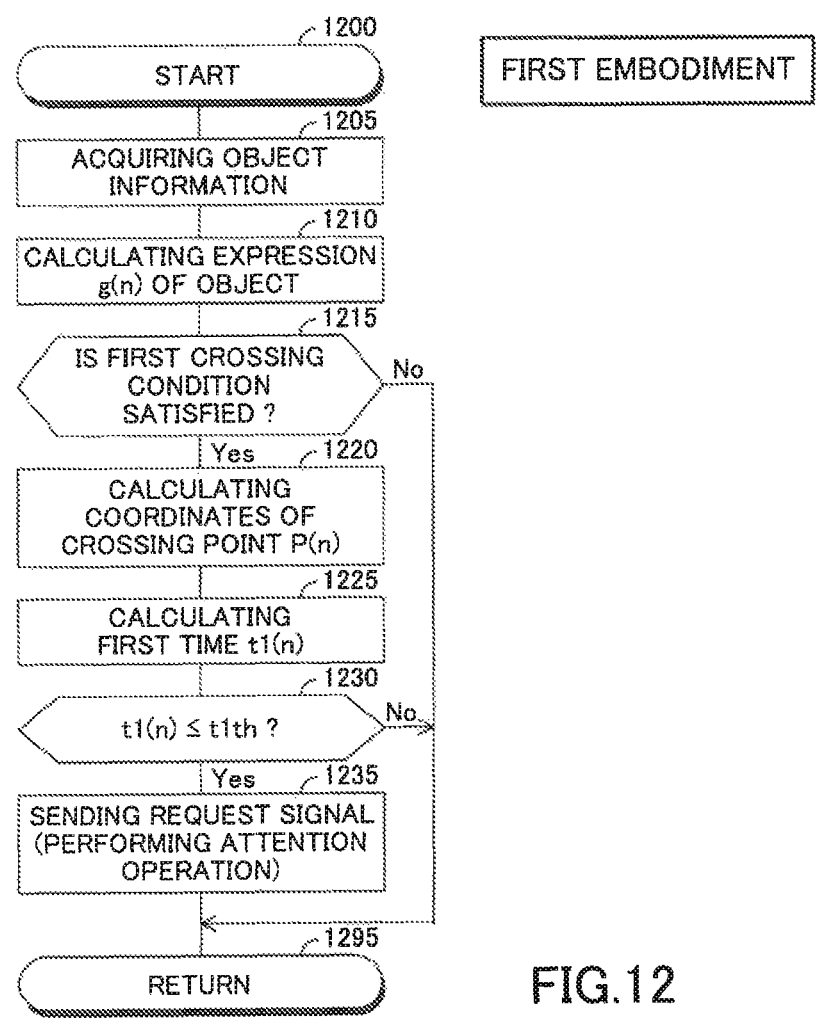
FIG. 12 is a view for showing a flowchart of a routine executed by the CPU.

When the CPU proceeds with the process to the step 1130, the CPU is configured or programmed to execute a routine shown by a flowchart in FIG. 12. Therefore, when the CPU proceeds with the process to the step 1130, the CPU starts a process from a step 1200 of FIG. 12 and then, sequentially executes processes of steps 1205 and 1210 described below. Thereafter, the CPU proceeds with the process to a step 1215. This routine will be described in case that the object information on one object is acquired. In this regard, in case that the object information on the objects is acquired, this routine is executed for the object information on each of the objects.

Step 1205: The CPU acquires the object information on the object existing around the own vehicle V as the object information at the calculation cycle "n" as described above and stores the thus-acquired object information in the RAM.

Step 1210: The CPU calculates the predicted route expression g(n) of the object on the basis of the object information as described above and stores the thus-calculated predicted route expression g(n) in the RAM.

When the CPU proceeds with the process to the step 1215, the CPU determines whether the predicted route expression g(n) of the object satisfies the first crossing condition. When the predicted route expression g(n) of the object satisfies the first crossing condition, the CPU determines "Yes" at the step 1215 and then, sequentially executes processes of steps 1220 and 1225 described below. Thereafter, the CPU proceeds with the process to a step 1230.

Step 1220: The CPU calculates the coordinates of the point P(n) where the straight line expressed by the expression g(n) crosses the effective portion LRep(n) or LRep(n) of the predicted left or right end route as described above and stores the thus-calculated coordinates in the RAM.

Step 1225: The CPU calculates a time predictively required for the object to reach the point P(n) as the first time t1(n) as described above and stores the thus-calculated first time t1(n) in the RAM.

When the CPU proceeds with the process to the step 1230, the CPU determines whether the first time t1(n) is smaller than or equal to 4 seconds, that is, whether the first time t1(n) satisfies the time condition. When the first time t1(n) satisfies the time condition, the CPU determines "Yes" at the step 1230, that is, determines that there is the target object and then, executes a process of a step 1235 described below. Thereafter, the CPU proceeds with the process to a step 1195 of FIG. 11 via a step 1295 to terminate this routine once.

Step 1235: The CPU sends a signal for performing the attention operation to the driver of the own vehicle V to the CPUs of the display ECU 20 and the alert ECU 30. Thereby, the display device 21 and the buzzer 31 perform the attention operation.

On the other hand, when the predicted route expression g(n) of the object does not satisfy the first crossing condition, the CPU determines "No" at the step 1215, that is, determines that there is no target object and then, proceeds with the process to the step 1195 of FIG. 11 via the step 1295 to terminate this routine once.

When the first time t1(n) does not satisfy the time condition, the CPU determines "No" at the step 1230, that is, determines that there is no target object and then, proceeds with the process to the step 1195 of FIG. 11 via the step 1295 to terminate this routine once.

The concrete operation of the first embodiment apparatus has been described. The first embodiment apparatus determines whether each of the left and right turn waiting conditions and the left and right turn start conditions is satisfied on the basis of the own vehicle information acquired by the various sensors installed in the own vehicle V. Thus, even when the position of the own vehicle V cannot be estimated by a GNSS (i.e., Global Navigation Satellite System) and/or wireless communication, the first embodiment apparatus can accurately determine whether the own vehicle V is turning left or right in the intersection on the basis of the own vehicle information.

In addition, the first embodiment apparatus calculates the effective left end length LLe, using a value based on a product of the remaining turn angle $\theta$re (=90°−$\theta$total) and the left end turn radius RL and the effective right end length LRe, using a value based on a product of the remaining turn angle $\theta$re and the right end turn radius RR. In other words, the effective left end length LLe is a length of an arc of the circle expressed by the predicted left end route expression fL corresponding to the remaining turn angle $\theta$re (=90°−$\theta$total) and the effective right end length LRe is a length of an arc of the circle expressed by the predicted right end route expression fR corresponding to the remaining turn angle $\theta$re.

In particular, according to the first embodiment apparatus, the effective left and right end lengths LLe and LRe are calculated on the basis of the total turn angle $\theta$total and the effective left and right end lengths LLe and LRe decreases as the total turn angle $\theta$total increases, that is, the left or right turning of the own vehicle V in the intersection, proceeds. Thus, the effective portions LLep and LRep of the predicted routes are unlikely to exceed a lane on which the own vehicle V is moving and reach a lane opposite to the lane on which the own vehicle V is moving or a curb along the lane opposite to the lane on which the own vehicle V is moving. Thereby, the unnecessary attention operation to the driver is unlikely to be performed and the attention operation to the driver is appropriately performed when the own vehicle V is in the left or right turn state in the intersection even though the position of the own vehicle V cannot be estimated by the GNSS and/or the wireless communication.

Especially, according to the first embodiment apparatus, the predicted left end route corresponding to the predicted route of the vehicle left end OL and the predicted right end route corresponding to the predicted route of the vehicle right end OR are estimated, respectively. The predicted left and right end routes define boundaries of area where a body of the own vehicle V is predicted to pass. Thus, the predicted route approximate to the actual moving route of the own vehicle V can be estimated, for example, compared with a case that a route which the vehicle base point O (i.e., the center of the own vehicle V in the vehicle width) is predicted to pass, is estimated as the predicted route. As a result, it can be accurately determined whether the attention operation to the driver should be performed. In addition, the left end turn radius RL is used as an estimated turn radius for calculating the effective left end length LLe of the predicted route and the right end turn radius RR is used as the estimated turn radius for calculating the effective right end length LRe of the predicted route. Thus, the effective left and right end lengths LLe and LRe can be appropriately calculated. With this configuration, it can be accurately determined whether the attention operation to the driver should be performed.

Further, when the driver starts to turn the own vehicle V left or right, the driver generally operates the blinker lever after the driver decelerates the own vehicle V such that the vehicle speed SPD decreases to a speed suitable to start to turn the own vehicle V left or right (i.e., a first vehicle speed SPD1≤SPD≤a second vehicle speed SPD2). Otherwise, when the driver starts to turn the own vehicle V left or right, the driver generally operates the blinker lever and then, decreases the vehicle speed SPD to the speed suitable to start to turn the own vehicle v left or right. Otherwise, when the driver starts to turn the own vehicle V left or right, the driver operates the blinker lever while decreasing the vehicle speed SPD to the speed suitable to start to turn the own vehicle V left or right. The first embodiment apparatus uses the left turn waiting conditions LW1 to LW3 or the right turn waiting conditions RW1 to RW3 for determining whether the own vehicle V is set to turn left or right. Thus, it can be appropriately determined whether the own vehicle V is set to turn left or right, that is, whether the driver intends to start to turn the own vehicle V left or right.

Further, when the first embodiment apparatus determines that the left turn start conditions LS1 to LS6 are first satisfied while the left direction blinkers are blinking after the own vehicle V is set to turn left, that is, the left turn waiting condition is satisfied, the first embodiment apparatus determines that the own vehicle V starts to turn left, that is, the left turn start condition is satisfied. Similarly, when the first embodiment apparatus determines that the right turn start conditions RS1 to RS6 are first satisfied while the right direction blinkers are blinking after the own vehicle V is set to turn right, that is, the right turn waiting condition is satisfied, the first embodiment apparatus determines that the own vehicle V starts to turn right, that is, the right turn start condition is satisfied. Therefore, it can be appropriately determined whether the own vehicle V starts to turn left or right when the first embodiment apparatus does not have self-position-estimation function, using the GNSS and/or the wireless communication or the first embodiment apparatus cannot use the self-position-estimation function even though the first embodiment apparatus has the self-position-estimation function.

Further, the first embodiment apparatus calculates the first time t1 only when the straight line expressed by the expression g (hereinafter, the straight line expressed by the expression g will be referred to as "the straight line gL") crosses any of the effective portions LLep and LRep of the predicted routes. Therefore, the first embodiment apparatus does not calculate the first time t1 when the straight line gL does not cross the effective portions LLep and LRep of the predicted routes. Thus, a processing time can be decreased. Further, when the first crossing points is two, the first embodiment apparatus calculates the first time t1 only for the first crossing point which the straight line gL first crosses any of the effective portions LLep and LRep of the predicted routes in the moving direction of the object. Thus, it can be early determined whether the object crosses any of the effective portions LLep and LRep of the predicted routes, compared with a case that the first embodiment apparatus calculates the first time t1 for the first crossing points which the straight line gL first crosses the effective portions LLep and LRep of the predicted routes, respectively in the moving direction of the object. Therefore, the attention operation to the driver can be appropriately performed.

Further, according to the first embodiment apparatus, the left end turn radius RL for the left turning is "R−W/2" and the right end turn radius RL for the right turning is "R+W/2". On the other hand, the right end turn radius RR for the left turning is "R+W/2" and the right end turn radius RR for the right turning is "R−W/2". Thus, the left and right end turn radii RL and RR can be appropriately calculated when the own vehicle V turns left as well as when the own vehicle V turns right.

Further, an angle defined between a vehicle axis of the own vehicle V (i.e., a center axis of the own vehicle V in a longitudinal direction of the own vehicle V) before the own vehicle V starts to turn left or right and the vehicle axis of the own vehicle V when the own vehicle V completes the left or right turning, is about 90° for the typical intersection. The first embodiment apparatus sets 90° as the turn end angle θend used for calculating the remaining turn angle θre. Thus, the effective left and right end lengths LLe and LRe are generally equal to the lengths of the predicted routes from the present position of the own vehicle V to a position where the own vehicle V completes the left or right turning. Therefore, the attention operation to the driver can be appropriately performed.

Further, the first embodiment apparatus initializes the total turn angle θtotal only when the first embodiment apparatus determines that the own vehicle V is set to turn left or right and thereafter, does not initialize the total turn angle θtotal until the own vehicle V completes the left or right turning. Thus, the total turn angle θtotal is not initialized while the own vehicle V is turning left or right in the intersection. Therefore, the total turn angle θtotal used for calculating the remaining turn angle θre can be appropriately calculated.

Modified Example

<Summary of Operation of Modified Apparatus>

Next, a driving assist apparatus of the vehicle according to a modified example of the first embodiment will be described. Hereinafter, the driving assist apparatus according to the modified example will be referred to as "the modified apparatus". When the smoothed yaw rate Ys(n) is larger than the straight moving threshold Y0 (=$10^{-6}$), the first embodiment apparatus calculates the predicted routes at the calculation cycle "n" on the basis of the turn radius R(n) calculated, using the smoothed yaw rate Ys(n) in accordance with the expression (11) (i.e., R(n)=SPD(n)/Ys(n)). Therefore, for example, if the smoothed yaw rate Ys is larger than the straight moving threshold Y0 when the own vehicle V is set to turn left, the first embodiment apparatus acquires the predicted routes on the basis of the turn radius R calculated, using the smoothed yaw rate Ys acquired when the own vehicle V is set to turn left.

In this regard, when the driver turns the own vehicle V left, in general, the driver first rotates the steering wheel 14a to increase the steering angle θsw. After the steering angle θsw reaches a maximum steering angle, the driver maintains the steering angle θsw at the maximum steering angle for a while. Then, the driver decreases the steering angle θsw. When the steering angle θsw becomes zero, the driver completes the left turning.

Therefore, a period of the left turning of the own vehicle V includes a steering angle increase period and a steering angle decrease period. The steering angle increase period corresponds to a period from a time when the driver starts to rotate the steering wheel 14a, that is, the own vehicle V starts to turn left to a time immediately before the steering angle θsw reaches the maximum steering angle. The steering angle decrease period corresponds to a period from a time when the steering angle θsw reaches the maximum steering angle to a time when the steering angle θsw becomes zero.

The smoothed yaw rate Ys acquired in the steering angle increase period is larger than the smoothed yaw rate Ys acquired when the steering angle θsw is the maximum steering angle. Therefore, when the turn radius R is calculated, using the smoothed yaw rate Ys in the steering angle increase period, the calculated turn radius R is larger than the turn radius R calculated, using the smoothed yaw rate Ys acquired when the steering angle θsw is the maximum steering angle. Thus, when the predicted routes are calculated, using the turn radius R calculated in the steering angle increase period, the predicted routes depart from the actual moving routes of the own vehicle V and therefore, the appropriate attention operation to the driver may not be performed.

The inventors of this application have studied aforementioned matters. As a result, the inventors have realized that the predicted route approximate to the actual moving route of the own vehicle V can be acquired in the steering angle increase period and an accuracy of the attention operation to the driver can be improved by calculating the turn radius R, using an estimated yaw rate Yest described below without using the present smoothed yaw rate Ys and acquiring the predicted route on the basis of the thus-calculated turn radius R.

In this regard, the inventors of this application define the steering angle increase period as a period until the total turn angle θtotal of the own vehicle V reaches the total turn angle θtotal corresponding to the maximum steering angle θsw. In the modified example, the total turn angle θtotal corresponding to the maximum steering angle θsw is 45°. Hereinafter, the total turn angle θtotal corresponding to the maximum steering angle θsw will be referred to as "the steering switch angle θth". In consideration of a result of an experiment, the steering switch angle θth may be set to an appropriate value larger than 0° and smaller than 90°.

<Steering Angle Increase Period>

When a change amount ΔYs of the smoothed yaw rate Ys is larger than zero (hereinafter, this case will be referred to as "the case A1"), the modified apparatus calculates an estimated yaw rate Yest as described below.

The modified apparatus presumes that the smoothed yaw rate Ys continues to increase by the present change amount ΔYs of the present smoothed yaw rate Ys. In particular, the present change amount ΔYs of the smoothed yaw rate Ys is a temporal differentiation value of the smoothed yaw rate Ys and hereinafter, will be referred to as "the smoothed yaw rate change amount ΔYs". The modified apparatus calculates, as a required time Treq, a time required for the own vehicle V to turn by a steering switch remaining angle Δθ obtained by subtracting the present turn angle θtotal from the steering switch angle θth (Δθ=θth−θtotal).

Then, the modified apparatus calculates the estimated yaw rate Yest by dividing the steering switch remaining angle Δθ by the required time Treq (Yest=Δθ/Treq). Therefore, the estimated yaw rate Yest is an average of the yaw rates Y acquired when the own vehicle V turns by steering switch remaining angle Δθ for the required time Treq. The modified apparatus sets the turn radius R to a first estimated turn radius Rest1 corresponding to the turn radius calculated, using the estimated yaw rate Yest. Further, the modified apparatus estimates the predicted routes on the basis of the thus-set turn radius R.

The estimated yaw rate Yest is calculated on the presumption that the smoothed yaw rate Ys continues to increase by the present smoothed yaw rate change amount ΔYs. Thus, the estimated yaw rate Yest is larger than the present smoothed yaw rate Ys. Therefore, the turn radius R calculated, using the estimated yaw rate Yest is smaller than the turn radius R calculated, using the present smoothed yaw rate Ys. As a result, the modified apparatus can acquire the predicted routes approximate to the actual moving route of the own vehicle V. Thus, the modified apparatus can appropriately perform the attention operation to the driver.

In this regard, as described later, when the estimated yaw rate Yest is smaller than or equal to the straight moving threshold Y0 (in the modified example, $10^{-6}$), the modified apparatus estimates the predicted routes, using the turn radius R set to the straight line equivalent value Rc (=12700 m) without using the turn radius R calculated, using the estimated yaw rate Yest.

<Case A2>

As described above, the modified apparatus presumes that the present smoothed yaw rate change amount ΔYs in the steering angle increase period is larger than zero. Therefore, when the present smoothed yaw rate ΔYs in the steering angle increase period is smaller than or equal to zero, that is, the present smoothed yaw rate Vs decreases or does not change, the estimated yaw rate Yest calculated by a calculation method described above for the case A1 is smaller than or equal to the present smoothed yaw rate Ys. Thus, the predicted routes acquired on the basis of the turn radius R calculated, using the estimated yaw rate Yest calculated by the calculation method described above for the case A1, departs from the actual moving route of the own vehicle V.

Accordingly, when the present smoothed yaw rate change amount ΔYs in the steering angle increase period is smaller than or equal to zero (hereinafter, this case will be referred to as "the case A2"), the modified apparatus calculates the estimated yaw rate Yest as described below.

When the present smoothed yaw rate change amount ΔYs in the steering angle increase period is smaller than or equal to zero and there is the smoothed yaw rate change amount ΔYs larger than zero before the present calculation cycle, the modified apparatus presumes that the smoothed yaw rate Ys continues to increase by the smoothed yaw rate change amount ΔYs which is larger than zero and is acquired at the last calculation cycle. Then, the modified apparatus calculates the estimated yaw rate Yest by the same calculation method as the calculation method described above for the case A1. Then, the modified apparatus sets the turn radius R to the first estimated turn radius Rest1. Then, the modified apparatus acquires the predicted routes on the basis of the thus-set turn radius R.

The thus-calculated estimated yaw rate Yest is larger than the present smoothed yaw rate Ys. Thus, the modified apparatus can acquire the predicted routes approximate to the actual moving route of the own vehicle V.

In this regard, as described later, when the estimated yaw rate Yest is smaller than or equal to the straight moving threshold Y0 (in the modified example, $10^{-6}$), the modified apparatus acquires the predicted routes, using the turn radius R set to the straight line equivalent value Rc (=12700 m) without using the turn radius R calculated, using the estimated yaw rate Yest.

<Case A3>

Further, when the present smoothed yaw rate change amount ΔYs in the steering angle increase period is smaller than or equal to zero, there is no smoothed yaw rate change amount ΔYs larger than zero before the present calculation cycle and the present smoothed yaw rate Ys is larger than the straight moving threshold Y0 (hereinafter, this case will be referred to as "the case A3"), the modified apparatus acquires the predicted routes on the basis of the turn radius R calculated, using the present smoothed yaw rate Ys.

<Case A4>

Further, when the present smoothed yaw rate change amount ΔYs in the steering angle increase period is smaller than or equal to zero, there is no smoothed yaw rate change amount ΔYs larger than zero before the present calculation cycle and the present smoothed yaw rate Ys is smaller than or equal to the straight moving threshold Y0 (hereinafter, this case will be referred to as "the case A4"), the modified apparatus acquires the predicted routes, using the turn radius R set to the straight line equivalent value Rc (=12700 m) without using the turn radius R calculated, using the present smoothed yaw rate Ys as described later.

<Steering Angle Decrease Period>

The steering angle θsw gradually decreases in the steering angle decrease period following the steering angle increase period, that is, in a period after the total turn angle θtotal of the own vehicle V becomes larger than or equal to the steering switch angle θth. Thus, the smoothed yaw rate Ys also gradually decreases. Therefore, when the predicted routes are acquired, using the turn radius R calculated, using the present smoothed yaw rate Ys, the thus-acquired predicted routes depart from the actual moving route of the own vehicle V.

The inventors of this application have studied aforementioned matters. As a result, the inventors have realized that the predicted route approximate to the actual moving route can be acquired in the steering angle decrease period by acquiring the predicted route on the basis of the turn radius of the own vehicle V (i.e., a second estimated turn radius Rest2 described below), presuming that the own vehicle V continues to turn at a rate of the estimated yaw rate Yest acquired immediately before the steering angle increase period ends.

In this regard, similar to the case A1, when the estimated yaw rate Yest is smaller than or equal to the straight moving threshold Y0, the modified apparatus acquires the predicted routes, using the turn radius R set to the straight line equivalent value Rc (=12700 m) without using the turn radius R calculated, using the estimated yaw rate Yest as described later.

It should be noted that when the calculation cycle immediately before the total turn angle θtotal reaches the steering switch angle θth is defined as the calculation cycle "m", the estimated yaw rate Yest immediately before the end of the steering angle increase period is the estimated yaw rate Yest(m) acquired at the calculation cycle "m".

As can be understood from the description for the case A3, when there is no smoothed yaw rate change amount ΔYs larger than zero in the steering angle increase period, the estimated yaw rate Yest is not calculated. In this case, the modified apparatus acquires the predicted routes on the basis of the turn radius R calculated, using the smoothed yaw rate Ys(m) acquired at the calculation cycle "m" in place of the estimated yaw rate Yest.

The steering angle θsw gradually decreases in the steering angle decrease period. Thus, the smoothed yaw rate Ys(m) acquired at the calculation cycle "m" is larger than the smoothed yaw rate Ys acquired in the steering angle decrease period. As described above, the modified apparatus acquires the predicted routes on the basis of the smoothed yaw rate Ys(m) acquired at the calculation cycle "m" in the steering angle decrease period. Therefore, the modified apparatus can acquire the predicted routes approximate to the actual moving route of the own vehicle V, compared with a case that the predicted routes are acquired on the basis of the present smoothed yaw rate Ys.

In this regard, as described later, when the smoothed yaw rate Ys(m) acquired at the calculation cycle "m" is smaller than or equal to the straight moving threshold Y0, the modified apparatus acquires the predicted routes, using the turn radius R set to the straight line equivalent value Rc without using the turn radius R calculated, using the smoothed yaw rate Ys(m).

Hereinafter, the turn radius R calculated in the steering angle decrease period will be referred to as "the second estimated turn radius Rest2".

The modified apparatus sets the turn radius R and acquires the predicted routes on the basis of the turn radius R by the same method as the method described for the cases A1 to A3 when the own vehicle V turns right.

Further, the modified apparatus sets the turn radius R and acquires the predicted routes on the basis of the turn radius R by the same method as the method described for the cases A1 to A3 when the own vehicle V turns left. In particular, once the left turn waiting condition is satisfied, the modified apparatus acquires the predicted routes as far as the left direction blinkers are in the blinking state or the total turn angle θtotal is smaller than or equal to the turn end angle θend (=90°). Thus, the modified apparatus does not determine whether the own vehicle V is in the left turn state, that is, the left turn start condition is satisfied. This is applied to the case that the own vehicle V turns right.

A summary of an operation of the modified apparatus has been described. Below, the operation of the modified apparatus, in particular, a difference between the operation of the modified apparatus and the operation of the first embodiment apparatus will be described in detail.

<Calculation of Smoothed Yaw Rate Change Amount ΔYs>

In the steering angle increase period, that is, a period which the total turn angle θtotal is smaller than the steering switch angle θth (=45°), the modified apparatus sets the smoothed yaw rate change amount ΔYs(0) corresponding to the calculation cycle "0" (n=0) as shown by an expression (24) described below for calculating any of the first estimated turn radius Rest1, the turn radius R and the second estimated turn radius Rest2 necessary to acquire the predicted routes approximate to the actual moving route of the own vehicle V.

$$\Delta Ys(0)=0 \quad (24)$$

Thereafter (n≥1), the modified apparatus calculates, as the smoothed yaw rate change amount ΔYs(n) after the calculation cycle "1", a change amount of the smoothed yaw rate Ys(n) acquired at the calculation cycle "n" with respect to the smoothed yaw rate Ys(n−1) acquired at the calculation cycle "n−1" in accordance with an expression (25) described below. In this regard, the predetermined calculation time Tcal is extremely small. Thus, the smoothed yaw rate change amount ΔYs(n) can be substantially the same as the temporal differentiation value dYs(n)/dt of the smoothed yaw rate Ys(n).

$$\Delta Ys(n)=Ys(n)-Ys(n-1) \quad (25)$$

On the other hand, in the steering angle decrease period, the modified apparatus does not calculate the smoothed yaw rate change amount ΔYs.

<Calculation of Converted Value ΔYsc of Smoothed Yaw Rate Change Amount ΔYs>

As described above, the modified apparatus uses the calculation method of the turn radius R, depending on the smoothed yaw rate change amount ΔYs. If describing the modified apparatus using the smoothed yaw rate change amount ΔYs, the description will be complicated. Accordingly, for simplifying the description, a converted value ΔYsc corresponding to a value obtained by converting the smoothed yaw rate change amount ΔYs, will be used. The converted value ΔYsc is calculated as described below.

When the smoothed yaw rate change amount ΔYs(n) is larger than zero, the modified apparatus sets the smoothed yaw rate change amount ΔYs(n) as the converted value ΔYsc(n) as shown by an expression (26) described below.

$$\Delta Ysc(n) = \Delta Ys(n) \tag{26}$$

Further, the last calculation cycle among the calculation cycles "i" at which the smoothed yaw rate change amount ΔYs larger than zero before the present calculation cycle "n", will be referred to as "the calculation cycle "c"". When the smoothed yaw rate change amount ΔYs(n) is smaller than or equal to zero and the smoothed yaw rate change amount(s) ΔYs larger than zero is/are acquired at the calculation cycle(s) "i" before the present calculation cycle "n", the modified apparatus sets the smoothed yaw rate change amount ΔYs(e) acquired at the calculation cycle "e" as the converted value ΔYsc(n) as shown by an expression (27) described below.

$$\Delta Ysc(n) = \Delta Ys(e) \tag{27}$$

On the other hand, when the smoothed yaw rate change amount ΔYs(n) is smaller than or equal to zero and the smoothed yaw rate change amount ΔYs larger than zero has not been acquired at the calculation cycle "i" before the present calculation cycle "n", the modified apparatus sets the converted value ΔYsc(n) to zero as shown by an expression (28) described below.

$$\Delta Ysc(n) = 0 \tag{28}$$

The modified apparatus calculates any of the first estimated turn radius Rest1, the turn radius R and the second estimated turn radius Rest2, depending on cases described below.

<Case that θtotal(n)<θth and ΔYsc(n)>0>
<Calculation of Required Time Treq>

When the total turn angle θtotal is smaller than the steering switch angle θth (=45°) and the present converted value ΔYsc(n) is larger than zero, that is, when the present converted value ΔYsc(n) is larger than zero in the steering angle increase period, the modified apparatus presumes that the smoothed yaw rate Ys continues to increase at a rate of the converted value ΔYsc(n). In this case, the modified apparatus calculates the required time Treq(n) required for the own vehicle V to turn by a steering switch remaining angle Δθ(n) (=45°−θtotal(n)) in accordance with an expression (32) described below.

The expression (32) is acquired as described below. When the total turn angle θtotal is smaller than the steering switch angle θth (=45°), the present converted value ΔYsc(n) is larger than zero and the smoothed yaw rate Ys continues to increase at a rate of the converted value ΔYsc(n), an expression (29) described below is established. Then, an expression (30) described below is acquired by changing the expression (29). Then, an expression (31) described below is acquired by changing the expression (30). Then, an expression (32) described below is acquired by solving the expression (31), regarding the required time Treq(n). The converted value ΔYsc(n) of the expression (29) is the converted value corresponding to the smoothed yaw rate change amount ΔYs(n), that is, the temporal differentiation value dYs(n)/dt.

$$\theta th = \theta total(n) + \int_0^{Treq(n)}(Ys(n) + \Delta Ysc(n) \times t)dt \tag{29}$$

$$\Delta Ysc(n) \times Treq(n)^2/2 + Ys(n) \times Treq(n) - (\theta th - \theta total(n)) = 0 \tag{30}$$

$$\Delta Ysc(n) \times Treq(n)^2 + 2 \times Ys(n) \times Treq(n) - 2 \times (\theta th - \theta total(n)) = 0 \tag{31}$$

$$Treq(n) = (-Ys(n) + \sqrt{(Ys(n)^2 + 2 \times \Delta Ysc(n) \times (\theta th - \theta total(n)))})/\Delta Ysc(n) \tag{32}$$

The modified apparatus assigns the steering switch angle θth (=45°), the total turn angle θtotal(n), the smoothed yaw rate Ys(n) and the converted value ΔYsc(n) to the expression (32) to calculate the required time Treq(n).

<Calculation of Estimated Yaw Rate Yest>

In addition, the modified apparatus calculates the steering switch remaining angle Δθ(n) (=θth−θtotal(n)). The modified apparatus assigns the thus-calculated steering switch remaining angle Δθ(n) and the required time Treq(n) to an expression (33) described below to calculate the estimated yaw rate Yest(n) while the total turn angle θtotal(n) is smaller than the steering switch angle θth. That is, the modified apparatus calculates, as the estimated yaw rate Yest(n), an average of the yaw rates Y acquired far the own vehicle V to turn by the steering switch remaining angle Δθ(n) for the required time Treq(n).

$$Yest(n) = \Delta\theta(n)/Treq(n) \tag{33}$$

<Calculation of First Estimated Turning Radius Rest1>

When the estimated yaw rate Yest(n) is larger than the straight moving threshold Y0, the modified apparatus calculates, as the first estimated turn radius Rest1(n), a value obtained by dividing the vehicle speed SPD(n) by the estimated yaw rate Yest(n) in place of the smoothed yaw rate Ys(n) as shown by an expression (34) described below. The modified apparatus sets the first estimated turn radius Rest1(n) as the turn radius R(n). The straight moving threshold Y0 is a threshold for avoiding that the first estimated turn radius Rest1(n) calculated by dividing the vehicle speed SPD(n) by the estimated yaw rate Yest(n) close to zero, is excessively large. In the modified example, the straight moving threshold Y0 is $10^{-6}$.

$$Rest1(n) = SPD(n)/Yest(n) \tag{34}$$

Further, for example, when the own vehicle V moves generally straight at the intersection, the smoothed yaw rate Ye and the converted value ΔYsc are considerably small. Therefore, the required time Treq calculated in accordance with the expression (32) is considerably large and as a result, the estimated yaw rate Yest calculated in accordance with the expression (33) is about zero. In this case, the first estimated turn radius Rest1(n) calculated in accordance with the expression (34) is excessively large and thus, the processing load of the CPU may be large.

Accordingly, when the estimated yaw rate Yest is smaller than or equal to the straight moving threshold Y0, the modified apparatus sets the first estimated turn radius Rest1(n) to the straight line equivalent value Rc (=12700 m) as shown by an expression (35) described below in place of the expression (34).

$$Rest1(n) = Rc = 12700 \text{ m} \tag{35}$$

<Case that θtotal<θth and ΔYsc(n)=0>
<Calculation of Turn Radius>

As shown by the expression (28), when all of the smoothed yaw rate change amounts ΔYs acquired before the present calculation cycle "n" are smaller than or equal to zero, and as a result, the present converted value ΔYsc(n) is zero and the smoothed yaw rate Ys(n) is larger than the straight moving threshold Y0, the modified apparatus sets a value calculated by dividing the vehicle speed SPD(n) by the smoothed yaw rate Ys(n) as the turn radius R(n) as shown by an expression (36) described below.

$$R(n)=SPD(n)/Ys(n) \qquad (36)$$

The inventors of this application have had a knowledge that the attention operation to the driver can be appropriately performed, using the generally straight lines as the predicted routes in the intersection when the smoothed yaw rate Ys(n) is smaller than or equal to the straight moving threshold Y0 ($=10^{-6}$).

Accordingly, when the present converted value ΔYsc(n) is zero and the smoothed yaw rate Ys(n) is smaller than or equal to the straight moving threshold Y0 in the steering angle increase period, the modified apparatus sets the straight line equivalent value Rc (=12700 m) as the turn radius R(n) as shown by an expression (37) described below. Thereby, the shapes of the predicted routes in the intersection become the generally straight lines, respectively.

$$R(n)=Rc=12700 \text{ m} \qquad (37)$$

It should be noted that the smoothed yaw rate Ys(n) is smaller than or equal to the straight moving threshold Y0 typically when the own vehicle V stops temporarily or when the own vehicle V moves straight or when the negative smoothed yaw rate Ys is calculated due to the turning of the own vehicle V in a direction opposite to an attempted left or right turning direction of the own vehicle V.

<Calculation of Second Estimated Turning Radius Rest2>

The modified apparatus calculates the second estimated turn radius Rest2 in the steering angle decrease period as described below.

In the steering angle decrease period after the total turn angle θtotal reaches the steering switch angle θth (=45°), the steering angle θsw gradually decreases. Thus, the smoothed yaw rate Ys decreases. Accordingly, in the steering angle decrease period, the modified apparatus presumes that the own vehicle V continues to turn at a rate of the estimated yaw rate Yest(m) calculated at the calculation cycle "m" immediately before the total turn angle θtotal reaches the steering switch angle θth.

In this regard, as described above, the modified apparatus calculates the estimated yaw rate Yest only when the converted value ΔYsc is larger than zero. Thus, when the converted value ΔYsc is zero, the modified apparatus presumes that the own vehicle V continues to turn at a rate of the smoothed yaw rate Ys(m) calculated at the calculation cycle "m" in place of the estimated yaw rate Yest(m) calculated at the calculation cycle "m".

That is, when the converted value ΔYsc(m) calculated at the calculation cycle "m" is larger than zero and the estimated yaw rate Yest(m) calculated at the calculation cycle "m" is larger than the straight moving threshold Y0 ($=10^{-6}$), the modified apparatus calculates the second estimated turn radius Rest2(n) by dividing the vehicle speed SPD(n) by the estimated yaw rate Yest(m) calculated at the calculation cycle "m" as shown by an expression (38) described below. Then, the modified apparatus sets the thus-calculated second estimated turn radius Rest2(n) as the turn radius R(n).

$$Rest2(n)=SPD(n)/Yest(m) \qquad (38)$$

Further, when the estimated yaw rate Yest(m) calculated at the calculation cycle "m" is smaller than or equal to the straight moving threshold Y0, the modified apparatus sets the straight line equivalent value Rc (=12700 m) as the second estimated turn radius Rest2(n) as shown by an expression (39) described below. Then, the modified apparatus sets the thus-set second estimated turn radius Rest2(n) as the turn radius R(n).

$$Rest2(n)=Rc=12700 \text{ m} \qquad (39)$$

Further, when the converted value ΔYsc(m) calculated at the calculation cycle "m" is zero, that is, all of the smoothed yaw rate change amounts ΔYs calculated in the steering angle decrease period are smaller than or equal to zero and the smoothed yaw rate Ys(m) calculated at the calculation cycle "m" is larger than the straight moving threshold Y0, the modified apparatus calculates the second estimated turn radius Rest2(n) by dividing the vehicle speed SPD(n) by the smoothed yaw rate Ys(m) calculated at the calculation cycle "m" as shown by an expression (40) described below. Then, the modified apparatus sets the thus-calculated second estimated turn radius Rest2(n) as the turn radius R(n).

$$Rest2(n)=SPD(n)/Ys(m) \qquad (40)$$

Further, when the converted value ΔYsc(m) calculated at the calculation cycle "m" is zero and the smoothed yaw rate Ys(m) calculated at the calculation cycle "m" is smaller than or equal to the straight moving threshold Y0, the modified apparatus sets the straight line equivalent value Rc (=12700 m) as the second estimated turn radius Rest2(n) as shown by an expression (41) described below. Then, the modified apparatus sets the thus-set second estimated turn radius Rest2(n) as the turn radius R(n).

$$Rest2(n)=Rc=12700 \text{ m} \qquad (41)$$

The modified apparatus calculates the predicted route expressions fL(n) and fR(n) on the basis of the thus-set turn radius R(n) by a method similar to a method of the first embodiment apparatus for calculating the predicted route expressions fL(n) and fR(n).

When the own vehicle V is set to turn right, the modified apparatus sets the turn radius R(n) similar to when the own vehicle V is set to turn left.

<Concrete Operation of Modified Apparatus>

Below, a concrete operation of the modified apparatus will be described. The CPU of the driving assist ECU 10 of the modified apparatus is configured or programmed to execute a routine shown by a flowchart in FIG. 13 each time the predetermined calculation time Tcal elapses. Therefore, at a predetermined timing, the CPU starts a process from a step 1300 of FIG. 13 and then, proceeds with the process to a step 1305 to acquire the own vehicle information.

Then, the CPU proceeds with the process to a step 1310 to determine whether the left turn waiting condition is satisfied on the basis of the own vehicle information. When the left turn waiting condition is satisfied, that is, the CPU determines that the own vehicle V is set to turn left, the CPU determines "Yes" at the step 1310 and then, sequentially executes processes of steps 1315 to 1335 described below. Thereafter, the CPU proceeds with the process to a step 1340.

Step 1315: The CPU sets the total turn angle θtotal to 0°, that is, initializes the total turn angle θtotal.

Step 1320: The CPU sets the value of the left turn flag XL to "1" and the value of the right turn flag XR to "0".

Step 1325: The CPU calculates the smoothed yaw rate Ys(n) in accordance with any of the expressions (1L), (2L), (3), (4), (5L) and (6L) when the value of the left turn flag XL is "1". On the other hand, the CPU calculates the smoothed yaw rate Ys(n) in accordance with any of the expressions (1R), (2R), (3), (4), (5R) and (6R) when the value of the right turn flag XR is "1".

Step 1330: The CPU calculates the instantaneous turn angle θ(n) in accordance with any of the expressions (7) and (8).

Step 1335: The CPU calculates the total turn angle θtotal(n) in accordance with any of the expressions (9) and (10).

On the other hand, when the left turn waiting condition is not satisfied at a time of the CPU executing a process of the step 1310, the CPU determines "No" at the step 1310 and then, proceeds with the process to a step 1360 to determine whether the left direction blinkers are blinking. It should be noted that it is determined "No" at the step 1310 when a determination process of the step 1310 is executed after it is first determined that the left turn waiting condition is satisfied after it is determined last time that the left or right turning is completed or when the left turn waiting condition has not been satisfied after it is determined last time that the left or right turning is completed.

When the CPU executes the determination process of the step 1310 after the CPU first determines that the left turn waiting condition is satisfied after the CPU determines last time that the left or right turning of the own vehicle V is completed, the CPU determines "No" at the step 1310. In this case, when the driver has an attempt to turn the own vehicle V left and thus, causes the left direction blinkers to blink, the CPU determines "Yes" at the step 1360 and then, sequentially executes the processes of the steps 1320 to 1335 described above. Thereafter, the CPU proceeds with the process to the step 1340.

When the left direction blinkers do not blink at a time of the CPU executing a process of the step 1360, the CPU determines "No" at the step 1360 and then, proceeds with the process to a step 1365 to determine whether the right turn waiting condition is satisfied on the basis of the own vehicle information.

When the right turn waiting condition is satisfied, that is, the CPU determines that the own vehicle V is set to turn right, the CPU determines "Yes" at the step 1365 and then, sequentially executes processes of steps 1370 and 1375 described below and the processes of the steps 1325 to 1335 described above. Thereafter, the CPU proceeds with the process to the step 1340.

Step 1370: The CPU sets the total turn angle θtotal to 0°, that is, initializes the total turn angle θtotal.

Step 1375: The CPU sets the value of the left turn flag XL to "0" and the value of the right turn flag XR to "1".

On the other hand, when the right turn waiting condition is not satisfied at a time of the CPU executing a process of the step 1365, the CPU determines "No" at the step 1365 and then, proceeds with the process to a step 1380 to determine whether the right direction blinkers are blinking. It should be noted that it is determined "No" at the step 1365 when a determination process of the step 1365 is executed after it is first determined that the right turn waiting condition is satisfied after it is determined last time that the left or right turning is completed or when the right turn waiting condition has not been satisfied after it is determined last time that the left or right turning is completed.

When the CPU executes the determination process of the step 1365 after the CPU first determines that the right turn waiting condition is satisfied after the CPU determines last time that the left or right turning of the own vehicle V is completed, the CPU determines "No" at the step 1365. In this case, when the driver has an attempt to turn the own vehicle V right and thus, causes the right direction blinkers to blink, the CPU determines "Yes" at the step 1380 and then, sequentially executes the processes of the steps 1375 and 1325 to 1335 described above. Thereafter, the CPU proceeds with the process to the step 1340.

When the right direction blinkers do not blink, that is, the right direction blinkers are in the non-blinking state, the CPU determines "No" at the step 1380 and then, proceeds with the process to a step 1395 to terminate this routine once.

When the CPU proceeds with the process to the step 1340, the CPU determines whether the total turn angle θtotal(n) is smaller than or equal to the turn end angle θend (=90°). When the total turn angle θtotal(n) is smaller than or equal to the turn end angle θend, the CPU determines "Yes" at the step 1340, that is, the CPU determines that the own vehicle V turns left, the CPU proceeds with the process to a step 1345 to determine whether the total turn angle θtotal(n) is smaller than the steering switch angle θth. When the total turn angle θtotal(n) is smaller than the steering switch angle θth, the CPU determines "Yes" at the step 1345 and then, proceeds with the process to a step 1350.

Figure 14:
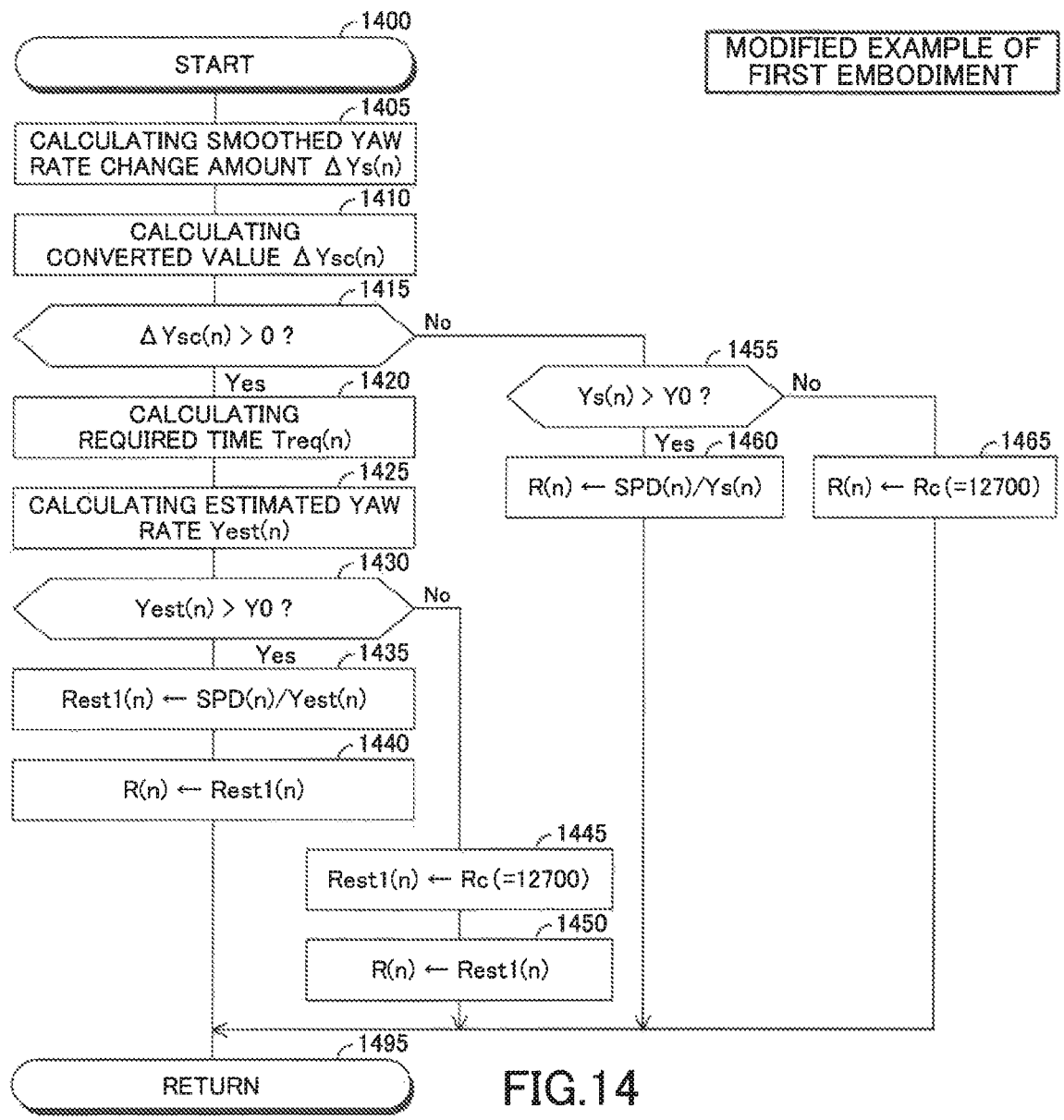
FIG. 14 is a view for showing a flowchart of a routine executed by the CPU of the modified apparatus.

When the CPU proceeds with the process to the step 1350, the CPU executes a routine shown by a flowchart in FIG. 14. Therefore, when the CPU proceeds with the process to the step 1350, the CPU starts a process from a step 1400 of FIG. 14 and then, sequentially executes processes of steps 1405 and 1410 described below. Thereafter, the CPU proceeds with the process to a step 1415.

Step 1405: The CPU calculates the smoothed yaw rate change amount ΔYs(n) in accordance with any of the expressions (24) and (25) described above and stores the thus-calculated smoothed yaw rate change amount ΔYs(n) in the RAM.

Step 1410: The CPU calculates the converted value ΔYsc(n) by converting the smoothed yaw rate change amount ΔYs(n) in accordance with any of the expressions (26) to (28) and stores the thus-calculated converted value ΔYsc(n) in the RAM.

When the CPU proceeds with the process to the step 1415, the CPU determines whether the converted value ΔYsc(n) is larger than zero. When the converted value ΔYsc(n) is larger than zero, the CPU determines "Yes" at the step 1415 and then, sequentially executes processes of steps 1420 and 1425 described below. Thereafter, the CPU proceeds with the process to a step 1430.

Step 1420: The CPU calculates the required time Treq(n) predictively required for the own vehicle V to turn by the steering switch remaining angle Δθ(n) (=θth−θtotal(n)) presuming that the smoothed yaw rate Ys(n) continues to increase at the rate of the converted value ΔYsc(n) in accordance with the expression (32) and stores the thus-calculated required time Treq(n) in the RAM.

Step 1425: The CPU calculates the estimated yaw rate Yest(n) by dividing the steering switch remaining angle Δθ(n) by the required time Treq(n) in accordance with the expression (33) and stores the thus-calculated estimated yaw rate Yest(n) in the RAM.

When the CPU proceeds with the process to the step 1430, the CPU determines whether the estimated yaw rate Yest(n) is larger than the straight moving threshold Y0 (=$10^{-6}$). When the estimated yaw rate Yest(n) is larger than the straight moving threshold Y0, the CPU determines "Yes" at the step 1430 and then, sequentially executes processes of steps 1435 and 1440 described below. Thereafter, the CPU proceeds with the process to the step 1395 of FIG. 13 via a step 1495 to terminate this routine once.

Step 1435: The CPU calculates the first estimated turn radius Rest1(n) by dividing the vehicle speed SPD(n) by the estimated yaw rate Yest(n) as shown by the expression (34) and stores the thus-calculated first estimated turn radius Rest1(n) in the RAM.

Step 1440: The CPU sets the first estimated turn radius Rest1(n) as the turn radius R(n) and stores the thus-set turn radius R(n) in the RAM.

On the other hand, when the estimated yaw rate Yest(n) is smaller than or equal to the straight moving threshold Y0, the CPU determines "No" at the step 1430 and then, sequentially executes processes of steps 1445 and 1450 described below. Thereafter, the CPU proceeds with the process to the step 1395 of FIG. 13 via the step 1495 to terminate this routine once.

Step 1445: The CPU sets the straight line equivalent value Rc (=12700 m) as the first estimated turn radius Rest1(n) as shown by the expression (35) and stores the thus-set first estimated turn radius Rest1(n) in the RAM.

Step 1450: The CPU sets the first estimated turn radius Rest1(n) as the turn radius R(n) and stores the thus-set turn radius R(n) in the RAM.

When the converted value ΔYsc(n) is zero at a time of the CPU executing a process of the step 1415, the CPU determines "No" at the step 1415 and then, proceeds with the process to a step 1455 to determine whether the smoothed yaw rate Ys(n) is larger than the straight moving threshold Y0. When the smoothed yaw rate Ys(n) is larger than the straight moving threshold Y0, the CPU determines "Yes" at the step 1455 and then, executes a process of a step 1460 described below. Thereafter, the CPU proceeds with the process to the step 1395 of FIG. 13 via the step 1495 to terminate this routine once.

Step 1460: The CPU sets a value calculated by dividing the vehicle speed SPD(n) by the smoothed yaw rate Ys(n) as the turn radius R(n) as shown by the expression (36) and stores the thus-set turn radius R(n) in the RAM.

On the other hand, when the smoothed yaw rate Ys(n) is smaller than or equal to the straight moving threshold Y0, the CPU determines "No" at the step 1455 and then, executes a process of a step 1465 described below. Thereafter, the CPU proceeds with the process to the step 1395 of FIG. 13 via the step 1495 to terminate this routine once.

Step 1465: The CPU sets the straight line equivalent value Rc (=12700 m) as the turn radius R(n) as shown by the expression (37) and stores the thus-set turn radius R(n) in the RAM.

Figure 13:
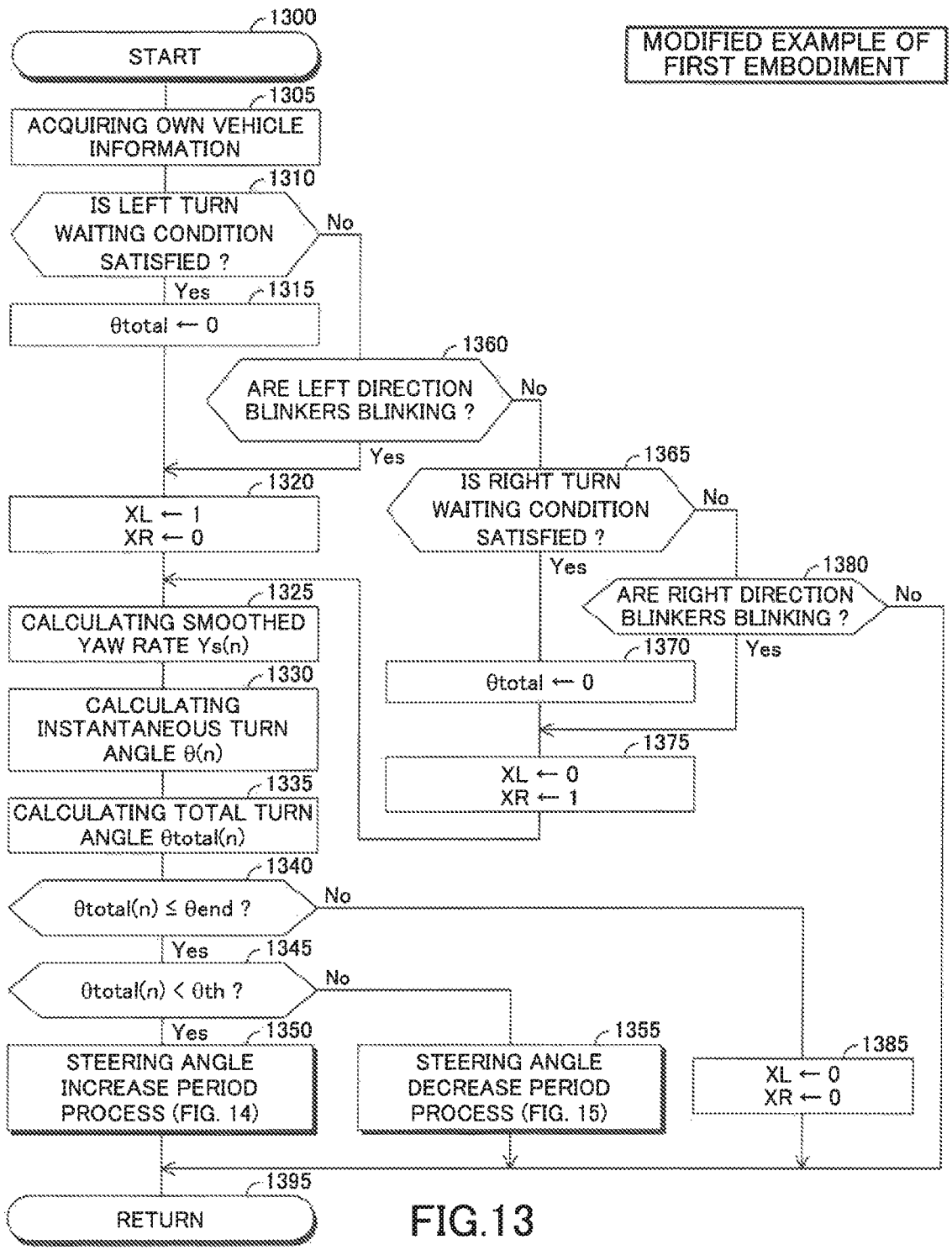
FIG. 13 is a view for showing a flowchart of a routine executed by a CPU of a driving assist ECU of a modified apparatus corresponding to a driving assist apparatus of the vehicle according to a modified embodiment of the first embodiment.

When the total turn angle θtotal(n) is larger than or equal to the steering switch angle θth at a time of the CPU executing a process of the step 1345 of FIG. 13, the CPU determines "No" at the step 1345 and then, proceeds with the process to a step 1355.

Figure 15:
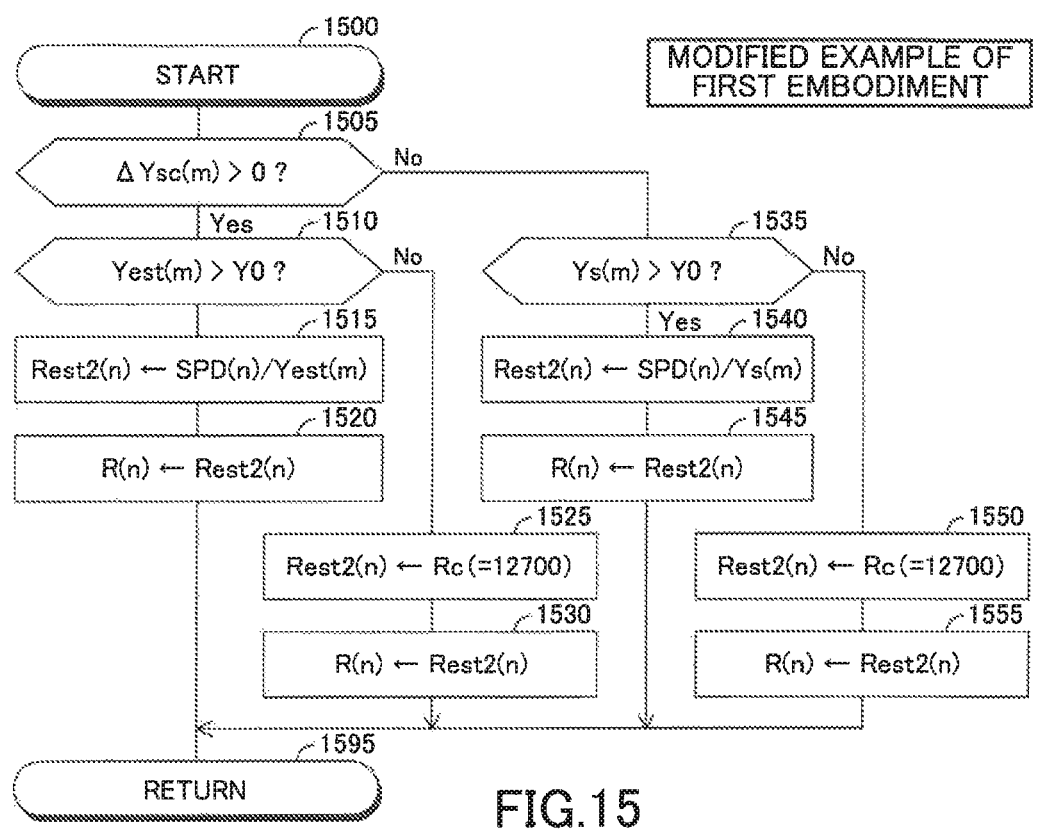
FIG. 15 is a view for showing a flowchart of a routine executed by the CPU of the modified apparatus.

When the CPU proceeds with the process to the step 1355, the CPU executes a routine shown by a flowchart in FIG. 15. Therefore, when the CPU proceeds with the process to the step 1355, the CPU starts a process from a step 1500 of FIG. 15 and then, proceeds with the process to a step 1505 to determine whether the last-calculated converted value ΔYsc(m) among the converted values ΔYsc stored in the RAM is larger than zero.

When the converted value ΔYsc(m) is larger than zero, the CPU determines "Yes" at the step 1505 and then, proceeds with the process to a step 1510 to determine whether the last-calculated estimated yaw rate Yest(m) among the estimated yaw rates Yest stored in the RAM is larger than the straight moving threshold Y0.

When the estimated yaw rate Yest(m) is larger than the straight moving threshold Y0, the CPU determines "Yes" at the step 1510 and then, sequentially executes processes of steps 1515 and 1520 described below. Thereafter, the CPU proceeds with the process to the step 1395 of FIG. 13 via a step 1595 to terminate this routine once.

Step 1515: The CPU calculates the second estimated turn radius Rest2(n) at the calculation cycle "n" by dividing the vehicle speed SPD(n) at the calculation cycle "n" by the estimated yaw rate Yest(m) at the calculation cycle "m" as shown by the expression (38) and stores the thus-calculated second estimated turn radius Rest2(n) in the RAM.

Step 1520: The CPU sets the second estimated turn radius Rest2(n) as the turn radius R(n) and stores the thus-set turn radius R(n) in the RAM.

On the other hand, when the estimated yaw rate Yest(m) at the calculation cycle "m" is smaller than or equal to the straight moving threshold Y0, the CPU determines "No" at the step 1510 and then, sequentially executes processes of steps 1525 and 1530 described below.

Step 1525: The CPU sets the straight line equivalent value Rc (=12700 m) as the second estimated turn radius Rest2(n) as shown by the expression (39) and stores the thus-set second estimated turn radius Rest2(n) in the RAM.

Step 1530: The CPU sets the second estimated turn radius Rest2(n) as the turn radius R(n) and stores the thus-set turn radius R(n) in the RAM.

When the converted value ΔYsc(m) at the calculation cycle "m" at a time of the CPU executing a process of the step 1505, the CPU determines "No" at the step 1505 and then, proceeds with the process to a step 1535 to determine whether the smoothed yaw rate Ys(m) at the calculation cycle "m" among the smoothed yaw rates Ys stored in the RAM is larger than the straight moving threshold Y0.

When the smoothed yaw rate Ys(m) at the calculation cycle "m" is larger than the straight moving threshold Y0, the CPU determines "Yes" at the step 1535 and then, sequentially executes processes of steps 1540 and 1545 described below. Thereafter, the CPU proceeds with the process to the step 1395 of FIG. 13 via the step 1595 to terminate this routine once.

Step 1540: The CPU calculates the second estimated turn radius Rest2(n) at the calculation cycle "n" by dividing the vehicle speed SPD(n) at the calculation cycle "n" by the smoothed yaw rate Ys(m) at the calculation cycle "m" as shown by the expression (40) and stores the thus-calculated second estimated turn radius Rest2(n) in the RAM.

Step 1545: The CPU sets the second estimated turn radius Rest2(n) as the turn radius R(n) and stores the thus-set turn radius R(n) in the RAM.

On the other hand, when the smoothed yaw rate Ys(m) at the calculation cycle "m" is smaller than or equal to the straight moving threshold Y0, the CPU determines "No" at the step 1535 and then, sequentially executes processes of steps 1550 and 1555 described below. Thereafter, the CPU proceeds with the process to the step 1395 of FIG. 13 via the step 1595 to terminate this routine once.

Step 1550 The CPU sets the straight line equivalent value Rc (=12700 m) as the second estimated turn radius Rest2(n) as shown by the expression (41) and stores the thus-set second estimated turn radius Rest2(n) in the RAM.

Step 1555: The CPU sets the second estimated turn radius Rest2(n) as the turn radius R(n) and stores the thus-set turn radius R(n) in the RAM.

When the total turn angle θtotal(n) is larger than the turn end angle θend (=90°) at a time of the CPU executing a process of the step 1340 of FIG. 13, the CPU determines "No" at the step 1340, that is, the CPU determines that the own vehicle V completes the left turning and then, executes a process of a step 1385 described below. Thereafter, the CPU proceeds with the process to the step 1395 to terminate this routine once.

Step 1385: The CPU sets the values of the left and right turn flags XL and XR to "0", respectively.

The concrete operation of the modified apparatus has been described. According to the modified apparatus, technical effects similar to technical effect obtained by the first embodiment apparatus, can be obtained. Further, the modified apparatus uses the calculation method for calculating the turn radius R, depending on the present total turn angle θtotal of the own vehicle V and the present converted value ΔYsc and determines whether the attention operation to the driver should be performed on the basis of the predicted routes acquired on the basis of the turn radius R. Thus, the predicted routes approximate to the actual moving route of the own vehicle V can be acquired, compared with a case that the predicted routes are acquired on the basis of the present smoothed yaw rate Ys. As a result, the attention operation to the driver can be appropriately performed.

Especially, when the total turn angle θtotal(n) is smaller than the steering switch angle θth (=45°) and the converted values ΔYsc(n) is larger than zero, the modified apparatus presumes that the yaw rate continues to increase at a rate of a constant change amount. Then, the modified apparatus calculates the required time Treq predictively required for the own vehicle V to turn by the steering switch remaining angle Δθ(=θth−θtotal). Then, the modified apparatus calculates the predicted routes on the basis of the estimated yaw rate Yest calculated, using the thus-calculated requested time Treq. This estimated yaw rate Yest is larger than the smoothed yaw rate Ys calculated in the steering angle increase period. Thus, the first estimated turn radius Rest1 calculated, using the estimated yaw rate Yest is smaller than the turn radius R calculated, using the smoothed estimated turn radius Ys. Therefore, each of the predicted routes calculated on the basis of the first estimated turn radius Rest1 is approximate to the actual moving route of the own vehicle V, compared with the predicted routes calculated on the basis of the turn radius R calculated, using the smoothed estimated turn radius Ys. Thus, the attention operation to the driver can be appropriately performed.

It should be noted that the process of the step 740 of FIG. 7 may be omitted. In this case, when the smoothed yaw rate Ys(n) is smaller than or equal to the straight moving threshold Y0 before the left turn start condition is satisfied after the left turn waiting condition is satisfied, that is, when it is determined "No" at the step 725 of FIG. 7, expressions of the straight lines each extending in the vehicle moving direction TD at the calculation cycle "n" may be calculated as the predicted route expressions fL(n) and fR(n), respectively at the step 1120 of FIG. 11.

Similarly, the process of the step 940 of FIG. 9 may be omitted. In this case, when the smoothed yaw rate Ys(n) is smaller than or equal to the straight moving threshold Y0 before the right turn start condition is satisfied after the right turn waiting condition is satisfied, that is, when it is determined "No" at the step 925 of FIG. 9, the expressions of the straight lines each extending in the vehicle moving direction at the calculation cycle "n" may be calculated as the predicted route expressions fL(n) and fR(n), respectively at the step 1120 of FIG. 11.

Further, the processes of the steps 1445, 1450 and 1465 of FIG. 14 may be omitted. In this case, when the estimated yaw rate Yest(n) or the smoothed yaw rate Ys(n) is smaller than or equal to the straight moving threshold Y0 in the steering angle increase period, that is, when it is determined "No" at the steps 1430 and 1455 of FIG. 14, the expressions of the straight lines each extending in the vehicle moving direction at the calculation cycle "n" may be calculated as the predicted route expressions fL(n) and fR(n), respectively at the step 1120 of FIG. 11.

Similarly, the processes of the steps 1525, 1530, 1550 and 1555 of FIG. 15 may be omitted. In this case, when the estimated yaw rate Yest(n) or the smoothed yaw rate Ys(n) is smaller than or equal to the straight moving threshold Y0 in the steering angle decrease period, that is, when it is determined "No" at the steps 1510 and 1535 of FIG. 15, the expressions of the straight lines each extending in the vehicle moving direction at the calculation cycle "n" may be calculated as the predicted route expressions fL(n) and fR(n), respectively at the step 1120 of FIG. 11.

Second Embodiment

Below, the driving assist apparatus of the vehicle according to a second embodiment (hereinafter, will be referred to as "the second embodiment apparatus") will be described. The second embodiment apparatus is the same as the first embodiment apparatus except that a method for determining whether there is an object to be alerted to the driver is different from a method of the first embodiment apparatus.

In particular, when the straight line gL(n) expressed by the predicted route expression g(n) of the object crosses the effective portion(s) LLep and/or LRep of the predicted route(s) of the own vehicle V at one point or two points which is/are the crossing point(s), the first embodiment apparatus specifies the crossing point(s) to be determined. When the time condition is satisfied for the crossing point(s), the first embodiment apparatus performs the attention operation to the driver.

On the other hand, in the second embodiment, the effective lengths LLe and LRe are not set. Therefore, each of the predicted routes of the own vehicle V is a circle. When the straight line gL(n) crosses the circular predicted routes of the own vehicle V at two or four points which are the crossing points, the second embodiment apparatus specifies the crossing point(s) to be determined among the two or four crossing points. When the time condition and a length condition are satisfied, regarding the crossing point(s), the second embodiment apparatus performs the attention operation to the driver.

Therefore, the second embodiment apparatus is the same as the first embodiment apparatus except that the second embodiment apparatus determines whether the straight line gL(n) crosses the circular predicted routes of the own vehicle V and determines whether the time condition as well as the length condition are satisfied. Accordingly, with reference to FIG. 16, an operation of the second embodiment apparatus different from the operation of the first embodiment apparatus will be mainly described.

<Acquisition of Object Information>

Similar to the first embodiment apparatus, the second embodiment apparatus acquires the object information on the object existing around the own vehicle V. In an example shown in FIG. 16, the second embodiment apparatus acquires the information on the object E to I existing around the own vehicle V as the object information at the calculation cycle "n".

<Calculation of Expression g of Object>

Similar to the first embodiment apparatus, the second embodiment apparatus calculates the predicted route expression g of the object. In the example shown in FIG. 16, the second embodiment apparatus calculates the expressions ge(n), gf(n), gg(n), gh(n) and gi(n) of the objects E to I, respectively.

<Second Crossing Condition>

Similar to the first embodiment apparatus or the modified apparatus, the second embodiment apparatus calculates the predicted left and right end route expressions fL(n) and fR(n). Further, in the second embodiment, a target area r(n) is defined between the predicted left and right end route expressions fL(n) and fR(n). The second embodiment apparatus determines whether a second crossing condition is satisfied. The second crossing condition is a condition that the straight line gL(n) expressed by the expression g(n) crosses at least one of a circular line expressed by the predicted left end route expression fL(n) and a circular line expressed by the predicted right end route expression fR(n).

Figure 16:
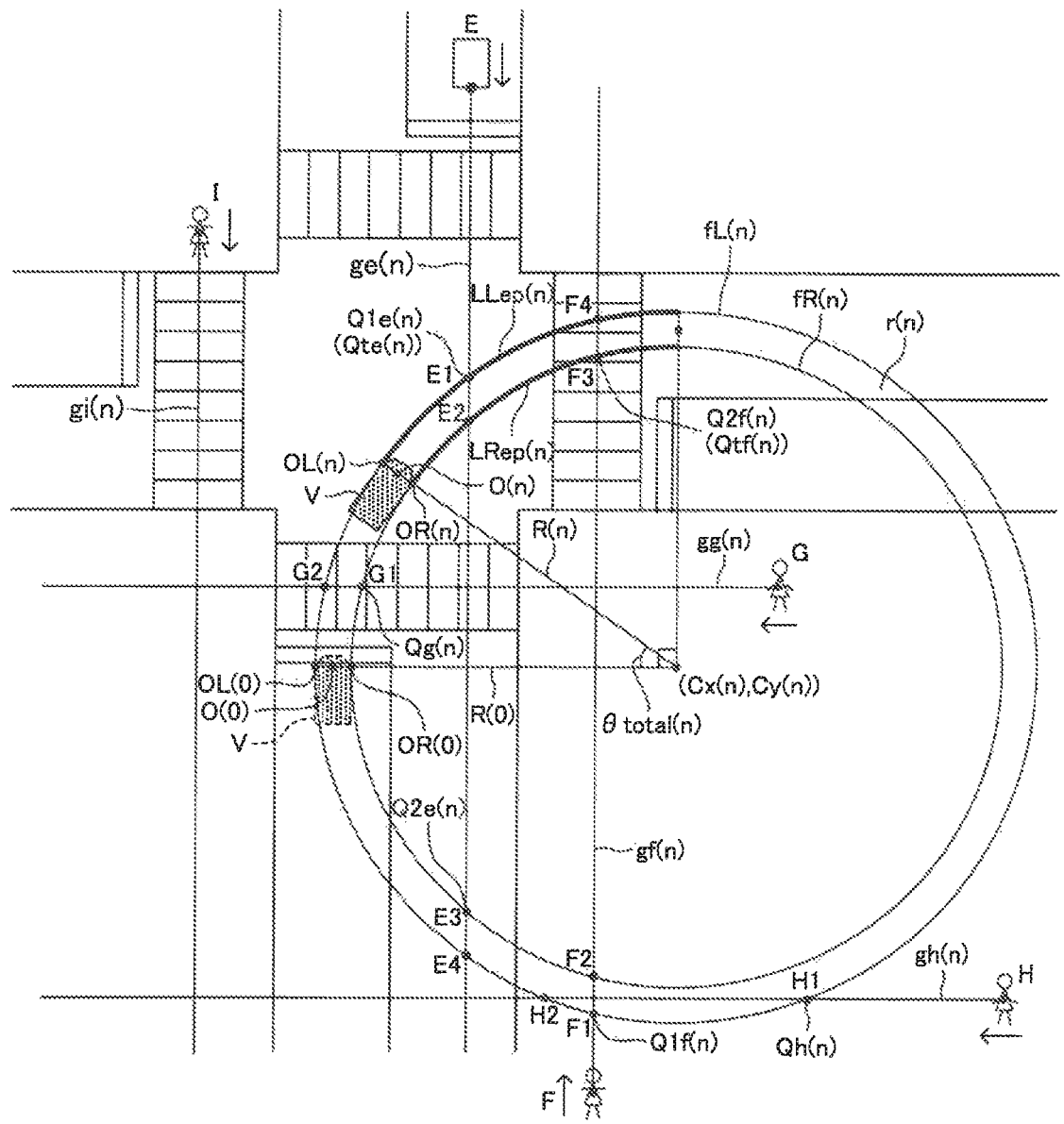
FIG. 16 is a view used for describing the attention operation to the driver performed by a second embodiment apparatus corresponding to a driving assist apparatus of the vehicle according to a second embodiment of the invention.

In the example shown in FIG. 16, the straight line geL(n) expressed by the expression ge(n) crosses the predicted left end route at points E1 and E4 and the predicted right end route at points E2 and E3. Thus, the expression ge(n) satisfies the second crossing condition.

The straight line gfL(n) expressed by the expression gf(n) crosses the predicted left end route at points F1 and F4 and the predicted right end route at points F2 and F3. Thus, the expression gf(n) satisfies the second crossing condition.

The straight line ggL(n) expressed by the expression gg(n) crosses the predicted left end route at a point G2 and the predicted right end route at a point G1. Thus, the expression gg(n) satisfies the second crossing condition.

The straight line ghL(n) expressed by the expression gh(n) crosses the predicted left end route at points H1 and H2. Thus, the expression gh(n) satisfies the second crossing condition.

On the other hand, the straight line giL(n) expressed by the expression gi(n) does not cross the predicted left and right end routes. Thus, the expression gi(n) does not satisfy the second crossing condition.

<Calculation of Coordinates of Crossing Point(s)>

When the expression g(n) satisfies the second crossing condition, the second embodiment apparatus calculates the number of the points where the straight line gL(n) expressed by the expression g(n) crosses the predicted left and/or right end route(s). Hereinafter, the point where the straight line gL(n) expressed by the expression g(n) crosses the predicted left or right end route will be referred to as "the second crossing point".

When the number of the second crossing points is four, the second embodiment apparatus calculates, as coordinates of crossing point Q1(n), coordinates of a point where the straight line gL(n) expressed by the expression g(n) enters from the outside of the target area r(n) into the target area r(n) in the moving direction of the object and the straight line gL(n) expressed by the expression g(n) crosses the predicted left or right end route. Further, the second embodiment apparatus calculates, as coordinates of crossing point Q2(n), coordinates of a point where the straight line gL(n) expressed by the expression g(n) enters from the outside of the target area r(n) into the target area r(n) in the moving direction of the object and the straight line gL(n) expressed by the expression g(n) crosses the predicted left or right end route. Therefore, the crossing point Q1(n) is the first crossing point in the moving direction of the object and the crossing point Q2(n) is the third crossing point in the moving direction of the object.

In the example shown in FIG. 16, regarding the expression ge(n), the second crossing points are points E1 to E4 and thus, the number of the second crossing points is four. Therefore, the second embodiment apparatus calculates coordinates of the point E1 as coordinates of crossing point Q1e(n) and coordinates of the point E3 as coordinates of crossing point Q2e(n). The point E1 is a point where the straight line geL(n) expressed by the expression ge(n) enters from the outside of the target area r(n) into the target area r(n) in the moving direction of the object E, that is, in a downward direction on a paper of FIG. 16 and the straight line geL(n) expressed by the expression ge(n) crosses the predicted left end route. The point E3 is a point where the straight line geL(n) expressed by the expression ge(n) enters from the outside of the target area r(n) into the target area r(n) in the moving direction of the object E, that is, in the downward direction on the paper of FIG. 16 and the straight line geL(n) expressed by the expression ge(n) crosses the predicted right end route.

Also, regarding the expression gf(n), the second crossing points are points F1 to F4 and thus, the number of the second crossing points is four. Therefore, the second embodiment apparatus calculates coordinates of the point F1 as coordinates of crossing point Q1f(n) and coordinates of the point F3 as coordinates of crossing point Q2f(n), The point F1 is a point where the straight line gfL(n) expressed by the expression gf(n) enters from the outside of the target area r(n) into the target area r(n) in the moving direction of the object F, that is, in an upward direction on the paper of FIG. 16 and the straight line gfL(n) expressed by the expression gf(n) crosses the predicted left end route. The point F3 is a point where the straight line gfL(n) expressed by the expression gf(n) enters from the outside of the target area r(n) into the target area r(n) in the moving direction of the object E, that is, in the upward direction on the paper of FIG. 16 and the straight line gfL(n) expressed by the expression gf(n) crosses the predicted right end route.

When the number of the second crossing points is two, the second embodiment apparatus calculates, as coordinates of crossing point Q(n), coordinates of a point where the straight line gL(n) expressed by the expression g(n) enters from the outside of the target area r(n) into the target area r(n) in the moving direction of the, object and the straight line gL(n) expressed by the expression g(n) crosses the predicted left or right end route. Therefore, the crossing point Q(n) is the first crossing point in the moving direction of the object.

In the example shown in FIG. 16, regarding the expression gg(n), the second crossing points are points G1 and G2 and thus, the number of the second crossing points is two. Therefore, the second embodiment apparatus calculates coordinates of the point G1 as coordinates of crossing point Qg(n). The point G1 is a point where the straight line ggL(n) expressed by the expression gg(n) enters from the outside of the target area r(n) into the target area r(n) in the moving direction of the object E, that is, in a leftward direction on the paper of FIG. 16 and the straight line ggL(n) expressed by the expression gg(n) crosses the predicted right end route.

Also, regarding the expression gh(n), the second crossing points are points H1 and H2 and thus, the number of the second crossing points is two. Therefore, the second embodiment apparatus calculates coordinates of the point H1 as coordinates of crossing point Qh(n). The point H1 is a point where the straight line ghL(n) expressed by the expression gh(n) enters from the outside of the target area r(n) into the target area r(n) in the moving direction of the object H, that is, in the leftward direction on the paper of FIG. 16 and the straight line ghL(n) expressed by the expression gh(n) crosses the predicted left end route.

When the crossing points Q1(n), Q2(n) and Q(n) are located on the predicted left end route, the lengths of the arc of the predicted left end route from the vehicle left end OL(n) to the crossing points Q1($n$), Q2($n$) and Q(n) in the turning direction of the own vehicle V will be referred to as "the lengths LL1($n$), LL2($n$) and LL(n)", respectively.

When the crossing points Q1($n$), Q2($n$) and Q(n) are located on the predicted right end route, the lengths of the arc of the predicted right end route from the vehicle right end OR(n) to the crossing points Q1($n$), Q2($n$) and O(n) in the turning direction of the own vehicle V will be referred to as "the lengths LR1($n$), LR2($n$) and LR(n)", respectively.

For example, the length LL1($n$) is calculated by multiplying the left end turn radius RL(n) by an angle defined by a vector directed from the turn center coordinates (Cx(n), Cy(n)) toward the crossing point Q1($n$) and a vector directed from the turn center coordinates (Cx(n), Cy(n)) toward the position O(n) of the own vehicle V. The remaining lengths LL2($n$), LL(n), LR1($n$), LR2($n$) and LR(n) are calculated by the similar method, <Setting of Target Crossing Point(s)>

When the number of the set second crossing points is two and thus, the second embodiment apparatus calculates the coordinates of the crossing point Q1($n$) and the coordinates of the crossing point Q2($n$), the second embodiment apparatus compares the length of the arc of the predicted right or left end route from the vehicle right or left end OR(n) or OL(n) to the crossing point Q1($n$) in the turning direction of the own vehicle V with the length of the arc of the predicted right or left end route from the vehicle right or left end OR(n) or OL(n) to the crossing point Q2($n$) in the turning direction of the own vehicle V. The second embodiment apparatus sets the crossing point corresponding to the shorter length as the target crossing point Qt(n). Below, this will be described in detail.

When the own vehicle V turns right, the crossing point Q1($n$) such as the crossing point Q1$e$(n) in FIG. 16 is located on the predicted left end route and the crossing point Q2($n$) such as the crossing point Q2$e$(n) in FIG. 16 is located on the predicted right end route. Therefore, the second embodiment apparatus calculates the length LL1($n$) of the arc of the predicted left end route from the vehicle left end OL(n) to the crossing point Q1($n$) such as the crossing point Q1$e$(n) in FIG. 16 in the turning direction of the own vehicle V and the length LR2($n$) of the arc of the predicted right end route from the vehicle right end OR(n) to the crossing point Q2($n$) such as the crossing point Q2$e$(n) in FIG. 16 in the turning direction of the own vehicle V. Then, the second embodiment apparatus compares the length LL1($n$) with the length LR2($n$). The second embodiment apparatus sets the crossing point such as the crossing point Q1$e$(n) in FIG. 16 corresponding to the shorter length as the target crossing point Qt(n).

Similarly, when the own vehicle V turns left, the crossing point Q1($n$) is located on the predicted right end route and the crossing point Q2($n$) is located on the predicted left end route. Therefore, the second embodiment apparatus calculates the length LR1($n$) of the arc of the predicted right end route from the vehicle right end OR(n) to the crossing point Q1($n$) in the turning direction of the own vehicle V and the length LL2($n$) of the arc of the predicted left end route from the vehicle left end OL(n) to the crossing point Q2($n$) in the turning direction of the own vehicle V. Then, the second embodiment apparatus compares the length LR1($n$) with the length LL2($n$). The second embodiment apparatus sets the crossing point corresponding to the shorter length as the target crossing point Qt(n).

In the example shown in FIG. 16, the own vehicle V turns right. Thus, regarding the expression g$e$(n), the crossing point Q1$e$(n) is located on the predicted left end route and the crossing point Q2$e$(n) is located on the predicted right end route. Therefore, the second embodiment apparatus calculates the length LL1$e$(n) of the arc of the predicted left end route from the vehicle left end OL(n) to the crossing point Q1$e$(n) in the turning direction of the own vehicle V and the length LR2$e$(n) of the arc of the predicted right end route from the vehicle right end OR(n) to the crossing point Q2$e$(n) in the turning direction of the own vehicle V. Then, the second embodiment apparatus compares the length LL1$e$(n) with the length LR2$e$(n). The length LL1$e$(n) is shorter than the length LR2$e$(n) and thus, the second embodiment apparatus sets the crossing point Q1$e$(n) as the target crossing point Qt(n).

Also, regarding the expression g$f$(n), the crossing point Q1$f$(n) is located on the predicted left end route and the crossing point Q2$f$(n) is located on the predicted right end route. Therefore, the second embodiment apparatus calculates the length LL1$f$(n) of the arc of the predicted left end route from the vehicle left end OL(n) to the crossing point Q1$f$(n) in the turning direction of the own vehicle V and the length LR2$f$(n) of the arc of the predicted right end route from the vehicle right end OR(n) to the crossing point Q2$f$(n) in the turning direction of the own vehicle V. Then, the second embodiment apparatus compares the length LL1$f$(n) with the length LR2$f$(n). The length LR2$f$(n) is shorter than the length LL1$f$(n) and thus, the second embodiment apparatus sets the crossing point Q2$f$(n) as the target crossing point Qt(n).

Hereinafter, when the target crossing point Qt(n) is located on the predicted left end route, the length of the arc of the predicted left end route from the vehicle left end OL(n) to the target crossing point Qt(n) in the turning direction of the own vehicle V will be referred to as "the length LLt(n)". When the target crossing point Qt(n) is located on the predicted right end route, the length of the arc of the predicted right end route from the vehicle right end OR(n) to the target crossing point Qt(n) in the turning direction of the own vehicle V will be referred to as "the length LRt(n)".

<Calculation of Second Time>

The second embodiment apparatus calculates a time predicted for the object to reach the predicted route as a second time t2 for determining whether the time condition is satisfied. In particular, when the straight line gL(n) expressed by the expression g(n) crosses the predicted left or right end route at the target crossing point Qt(n) or the crossing point Q(n), the second embodiment apparatus calculates the second time t2(n) predicted for the object corresponding to the straight line gL(n) expressed by the expression g(n) to reach the target crossing point Qt(n) or the crossing point Q(n). The second time t2(n) is calculated by dividing the length of the straight line from the position of the object to the target crossing point Qt(n) or the crossing point Q(n) by a moving speed v(n) of the object.

In the example shown in FIG. 16, the second embodiment apparatus calculates the second time t2$e$(n) predicted for the object E to reach the target crossing point Qt$e$(n), the second time t2$f$(n) predicted for the object F to reach the target crossing point Qt$f$(n), the second time t2$g$(n) predicted for the object G to reach the crossing point Q$g$(n) and the second time t2$h$(n) predicted for the object H to reach the crossing point Q$h$(n).

<Time Condition and Length Condition>

The second embodiment apparatus determines whether the time condition that the second time t2(n) is smaller than or equal to a predetermined second time t2th, is satisfied. In the second embodiment, the predetermined second time t2th is 4 seconds. When the time condition is satisfied, regarding any of the expressions g(n), the second embodiment apparatus determines that the object may cross the predicted route of the own vehicle V within the predetermined second time t2th.

When the second embodiment apparatus calculates the coordinates of the target crossing point Qt(n) located on the predicted left end route, the second embodiment apparatus determines whether a point where the object crosses the predicted route of the own vehicle V, is located in the portion of the predicted route corresponding to the effective length LLe(n) by determining whether a length condition shown by an inequality expression (42) described below is satisfied. When the second embodiment apparatus calculates the coordinates of the target crossing point Qt(n) located on the predicted right end route, the second embodiment apparatus determines whether the point where the object crosses the predicted route of the own vehicle V, is located in the portion of the predicted route corresponding to the effective length LRe(n) by determining whether a length condition shown by an inequality expression (43) described below is satisfied.

$$LLt(n) \leq LLe(n) \tag{42}$$

$$LRt(n) \leq LRe(n) \tag{43}$$

When the second embodiment apparatus calculates the coordinates of the crossing point Q(n) located on the predicted left end route, the second embodiment apparatus determines whether a point where the object crosses the predicted route of the own vehicle V, is located in the portion of the predicted route corresponding to the effective length LLe(n) by determining whether a length condition shown by an inequality expression (44) described below is satisfied. When the second embodiment apparatus calculates the coordinates of the crossing point Q(n) located on the predicted right end route, the second embodiment apparatus determines whether the point where the object crosses the predicted route of the own vehicle V, is located in the portion of the predicted route corresponding to the effective length LRe(n) by determining whether a length condition shown by an inequality expression (45) described below is satisfied.

$$LL(n) \leq LLe(n) \tag{44}$$

$$LR(n) \leq LRe(n) \tag{45}$$

When any of the length conditions is satisfied, regarding any of the expressions g(n), the second embodiment apparatus determines that the point where the object crosses the predicted route, is located in the portion of the predicted route corresponding to the effective length, that is, there is the target object. On the other hand, when the length conditions are not satisfied, regarding the expressions g(n), the second embodiment apparatus determines that the point where the object crosses the predicted route, is not located in the portion of the predicted route corresponding to the effective length, that is, there is no target object.

In the example shown in FIG. 16, assuming that the second time t2e(n) is 1 second, the second time t2f(n) is 4 seconds, the second time t2g(n) is 3 seconds and the second time t2h(n) is 2 seconds, the time condition is satisfied, regarding the expressions ge(n), gf(n), gg(n) and gh(n). Thus, the second embodiment apparatus determines whether the length condition is satisfied, regarding the expressions ge(n), gf(n), gg(n) and gh(n).

Regarding the expression ge(n), the target crossing point Qte(n) is calculated and this target crossing point Qte(n) is located on the predicted left end route. Thus, the second embodiment apparatus determines whether the length condition shown by the inequality expression (42) is satisfied. As apparent from the FIG. 16, the length LLte(n) is shorter than the effective left end length LLe(n) and thus, the length condition shown by the inequality expression (42) is satisfied.

Regarding the expression gf(n), the target crossing point Qtf(n) is calculated and this target crossing point Qtf(n) is located on the predicted right end route. Thus, the second embodiment apparatus determines whether the length condition shown by the inequality expression (43) is satisfied. As apparent from the FIG. 16, the length LRtf(n) is shorter than the effective right end length LRe(n) and thus, the length condition shown by the inequality expression (43) is satisfied.

Regarding the expression gg(n), the crossing point Qg(n) is calculated and this crossing point Qg(n) is located on the predicted right end route. Thus, the second embodiment apparatus determines whether the length condition shown by the inequality expression (45) is satisfied. As apparent from the FIG. 16, the length LRg(n) is longer than the effective right end length LRe(n) and thus, the length condition shown by the inequality expression (45) is not satisfied.

Regarding the expression gh(n), the crossing point Qh(n) is calculated and this crossing point Qh(n) is located on the predicted left end route. Thus, the second embodiment apparatus determines whether the length condition shown by the inequality expression (44) is satisfied. As apparent from the FIG. 16, the length LLh(n) is longer than the effective left end length LLe(n) and thus, the length condition shown by the inequality expression (44) is not satisfied.

As described above, the time condition and the length condition are satisfied, regarding the expressions ge(n) and gf(n). Thus, the second embodiment apparatus determines that there are the target objects such as the objects E and F.

In the example shown in FIG. 16, assuming that the second time t2e(n) is 5 seconds, the second time t2f(n) is 10 seconds, the second time t2g(n) is 3 seconds and the second time t2h(n) is 2 seconds, the time condition is satisfied, regarding the expressions gg(n) and gh(n). Thus, the second embodiment apparatus determines whether the length condition is satisfied, regarding the expressions gg(n) and gh(n). As described above, the length condition is not satisfied, regarding the expressions gg(n) and gh(n). Thus, the second embodiment apparatus determines that there is no target object.

<Attention Operation to Driver>

Similar to the first embodiment apparatus, the second embodiment apparatus performs the attention operation to the driver when the second embodiment apparatus determines that there is the target object. On the other hand, when the second embodiment apparatus determines that there is no target object, the second embodiment apparatus does not perform the attention operation to the driver.

<Concrete Operation of Second Embodiment Apparatus>

Figure 17:
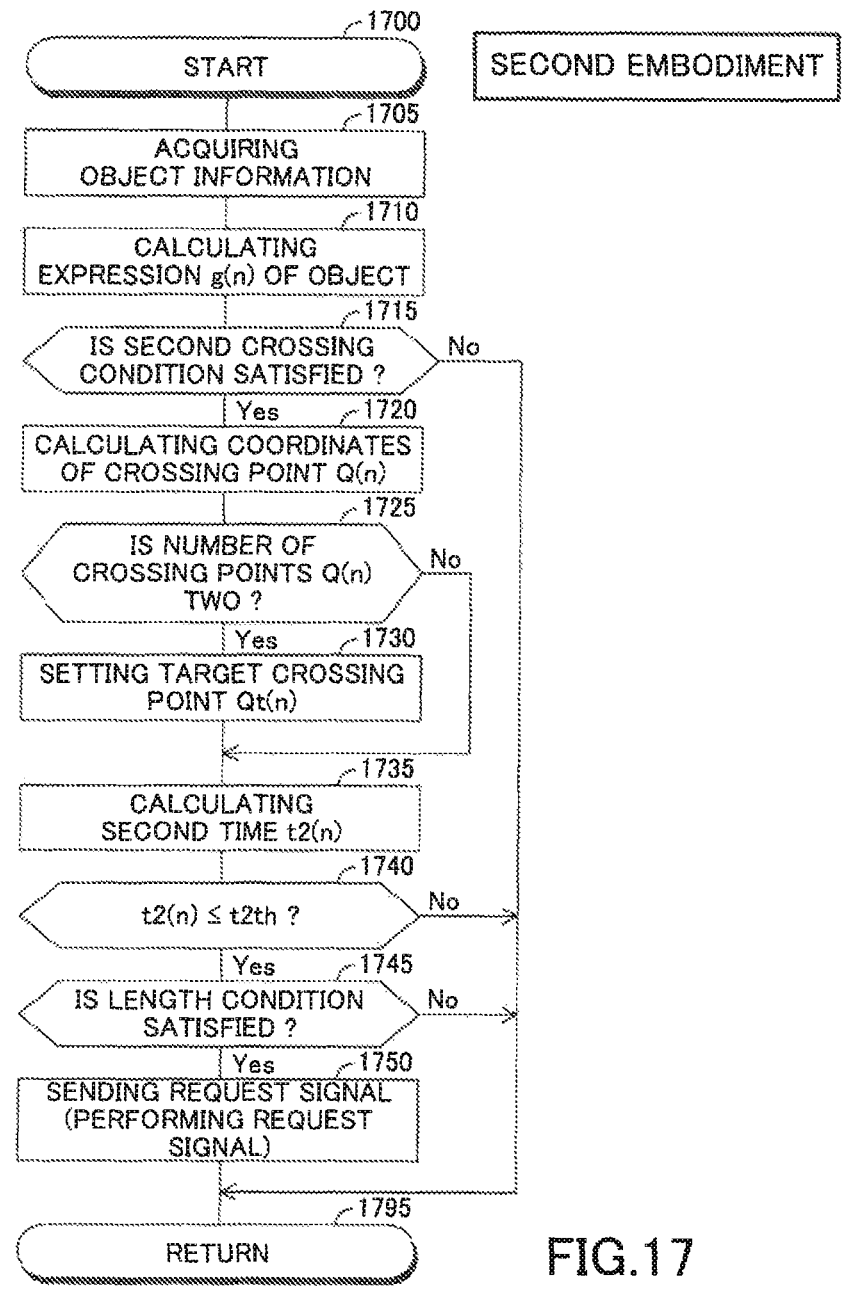
FIG. 17 is a view for showing a flowchart of a routine executed by a CPU of a driving assist ECU of the second embodiment apparatus.

Below, the concrete operation of the second embodiment apparatus will be described. The CPU of the driving assist ECU 10 of the second embodiment apparatus executes a routine shown by a flowchart in FIG. 17 when the CPU proceeds with the process to the step 1130 of FIG. 11. The routine shown in FIG. 17 will be described in case that the object information on one object is acquired. In this regard, in case that the object information on the objects is acquired, the routine shown in FIG. 17 is executed for the object information on each of the objects. When the CPU proceeds with the process to the step 1130 of FIG. 11, the CPU starts a process from a step 1700 of FIG. 17 and then, sequentially executes processes of steps 1705 and 1710 described below. Thereafter, the CPU proceeds with the process to a step 1715.

Step 1705: The CPU acquires information on the object existing around the own vehicle V as the object information at the calculation cycle "n" as described above and stores the thus-acquired object information in the RAM of the driving assist ECU 10.

Step 1710: The CPU calculates the predicted route expression g(n) of the object at the calculation cycle "n" on the basis of the object information and stores the thus-calculated predicted route expression g(n) in the RAM.

When the CPU proceeds with the process to the step 1715, the CPU determines whether the predicted route expression g(n) of the object satisfies the second crossing condition. When the predicted route expression g(n) of the object satisfies the second crossing condition, the CPU determines "Yes" at the step 1715 and then, executes a process of a step 1720 described below. Thereafter, the CPU proceeds with the process to a step 1725.

Step 1720: The CPU calculates the coordinates of the crossing point Q1(*n*) and the coordinates of the crossing point Q2(*n*) and stores the thus-calculated coordinates in the RAM as described above when the straight line gL(n) expressed by the expression g(n) crosses the predicted left and right end routes at the four crossing points. When the straight line gL(n) expressed by the expression g(n) crosses the predicted left end route and/or the predicted right end route at the two crossing points, the CPU calculates the coordinates of the crossing point Q(n) and stores the thus-calculated coordinates in the RAM.

When the CPU proceeds with the process to the step 1725, the CPU determines whether the number of the crossing points Q(n) is two. When the number of the crossing points Q(n) is two, that is, when the coordinates of the crossing points Q1(*n*) and Q2(*n*) are calculated, the CPU determines "Yes" at the step 1725 and then, sequentially executes processes of steps 1730 and 1735 described below. When the number of the crossing point Q(n) is one, that is, when the coordinates of the crossing point Q(n) are calculated, the CPU determines "No" at the step 1725 and then, executes the process of the step 1735.

Step 1730: The CPU sets any of the crossing points Q1(*n*) and Q2(*n*) as the target crossing point Qt(n) as described above. The CPU stores the coordinates of any of the crossing points Q1(*n*) and Q2(*n*) set as the target crossing point Qt(n) in the RAM.

Step 1735: The CPU calculates the second time t2(n) predicted for the object to reach the crossing point Qt(n) or Q(n) as described above and stores the thus-calculated second time t2(n) in the RAM.

Then, the CPU proceeds with the process to a step 1740. When the CPU proceeds with the process to the step 1740, the CPU determines whether the second time t2(n) satisfies the time condition (i.e., t2(n)≤t2th (=4 seconds)). When the second time t2(n) satisfies the time condition, the CPU determines "Yes" at the step 1740 and then, proceeds with the process to a step 1745.

When the CPU proceeds with the process to the step 1745, the CPU determines whether any of the length conditions shown by the inequality expressions (42) to (45) is satisfied. When any of the length conditions is satisfied, the CPU determines "Yes" at the step 1745, that is, there is the target object and then, executes a process of a step 1750. Thereafter, the CPU proceeds with the process to the step 1195 of FIG. 11 via a step 1795 to terminate this routine once.

Step 1750: The CPU sends a request signal for performing the attention operation to the driver to the CPUs of the display ECU 20 and the alert ECU 30. Thereby, the display device 21 and the buzzer 31 perform the attention operation.

On the other hand, when the predicted route expression g(n) of the object does not satisfy the second crossing condition at a time of the CPU executing a process of the step 1715, the CPU determines "No" at the step 1715, that is, there is no target object and then, proceeds with the process to the step 1195 of FIG. 11 via the step 1795 to terminate this routine once.

When the second time t2(n) does not satisfy the time condition at a time of the CPU executing a process of the step 1740, the CPU determines "No" at the step 1740, that is, there is no target object and then, proceeds with the process to the step 1195 of FIG. 11 via the step 1795 to terminate this routine once.

When the length condition is not satisfied at a time of the CPU executing a process of the step 1745, the CPU determines "No" at the step 1745, that is, there is no target object and then, proceeds with the process to the step 1195 of FIG. 11 via the 1795 to terminate this routine once.

The concrete operation of the second embodiment apparatus has been described. According to the second embodiment apparatus, the technical effects similar to the technical effects obtained by the first embodiment apparatus, can be obtained.

The second embodiment apparatus uses the same method for calculating the turn radius R as the method used by the first embodiment apparatus. In this regard, the second embodiment apparatus may use the same method for calculating the turn radius R as the method used by the modified apparatus.

The driving assist apparatuses according to the embodiments and the modified example of the invention have been described. It should be noted that the present invention is not limited to the aforementioned embodiments and various modifications can be employed within the scope of the invention.

For example, the first and second embodiment apparatuses and the modified apparatus (hereinafter, these apparatuses will be collectively referred to as "the first embodiment apparatus and the like") may be configured to estimate one predicted route or three or more predicted routes in place of acquiring two predicted routes such as the predicted left and right end routes. The predicted routes are not limited to the routes predicted for the vehicle left and right end OL and OR to pass, that is, the predicted left and right end routes. For example, the predicted route may be a route predicted for the vehicle base point O to pass. In this case, the vehicle base point O is not limited to a center point between the vehicle left and right ends OL and OR and may be a point at a center of the front end portion of the own vehicle V in the vehicle width direction.

Further, the first embodiment apparatus and the like may be configured to perform the attention operation to the driver when the own vehicle V turns left or right at an area where the own vehicle V can turn such as a parking of the building and a road next to an entrance of the parking in addition to when the own vehicle V turns left or right at the intersection.

Further, the first embodiment apparatus and the like may comprise a GNSS receiver and store a map information in the memory thereof. Further, the first embodiment apparatus and the like may be configured to determine whether the own vehicle V is in the area where the own vehicle V can turn (hereinafter, will be referred to as "the turning area") by the self-position estimation using the GNSS. When the first embodiment apparatus and the like determines that the own vehicle V is in the turning area, the first embodiment apparatus and the like may be configured to calculate the turn end angle bend for calculating the remaining turn angle θre for each turning area on the basis of the shape of the turning area described in the map information. In this case, the first embodiment apparatus and the like may be configured to determine whether the own vehicle V is in the turning area by the method described for the first embodiment apparatus and the like at an area where the self-position estimation using the GNSS cannot be performed and may be configured to set the turn end angle θend to 90°.

Further, the first embodiment apparatus and the like may comprise an in-vehicle device which can communicate with a roadside device installed in the turning area. In this case, the first embodiment apparatus and the like may be configured to determine whether the own vehicle V is in the turning area by the wireless communication with the roadside device. When the first embodiment apparatus and the like determines that the own vehicle V is in the turning area, the first embodiment apparatus and the like may be configured to calculate the turn end angle θend for calculating the remaining turn angle θre for each turning area. In this case, the first embodiment apparatus and the like may be configured to determine whether the own vehicle V is in the turning area by the method described for the first embodiment apparatus and the like at the area where the self-position estimation using the wireless communication cannot be performed and may be configured to set the turn end angle θend to 90°.

Further, the first embodiment apparatus and the like may be configured to determine that the left turn waiting condition is satisfied when the first embodiment apparatus and the like uses one of the conditions LW1 to LW3 as the condition for determining whether the left turn waiting condition is satisfied and the condition LW1 or LW2 or LW3 is satisfied or when the first embodiment apparatus and the like uses two of the conditions LW1 to LW3 as the condition for determining whether the left turn waiting condition is satisfied and the two of the conditions LW1 to LW3 are satisfied.

Further, the first embodiment apparatus and the like may be configured to determine that the right turn waiting condition is satisfied when the first embodiment apparatus and the like uses one of the conditions RW1 to RW3 as the condition for determining whether the right turn waiting condition is satisfied and the condition RW1 or RW2 or RW3 is satisfied or when the first embodiment apparatus and the like uses two of the conditions RW1 to RW3 as the condition for determining whether the right turn waiting condition is satisfied and the two of the conditions RW1 to RW3 are satisfied.

Further, the first embodiment apparatus and the like may be configured to determine that the left turn start condition is satisfied when the first embodiment apparatus and the like uses one of the conditions LS1 to LS6 as the condition for determining whether the left turn start condition is satisfied and the one of the condition LS1 to LS6 is satisfied or when the first embodiment apparatus and the like uses two to five of the conditions LS1 to LS6 as the condition for determining whether the left turn start condition is satisfied and the two to five of the conditions LS1 to LS6 are satisfied.

Further, the first embodiment apparatus and the like may be configured to determine that the right turn start condition is satisfied when the first embodiment apparatus and the like uses one of the conditions RS1 to RS6 as the condition for determining whether the right turn start condition is satisfied and the one of the condition RS1 to RS6 is satisfied or when the first embodiment apparatus and the like uses two to five of the conditions RS1 to RS6 as the condition for determining whether the right turn start condition is satisfied and the two to five of the conditions RS1 to RS6 are satisfied.

Further, the first embodiment apparatus and the like may be configured to use the yaw rate Y estimated from the lateral acceleration Gy and the vehicle speed SPD or the yaw rate Y estimated from the steering angle θsw and the vehicle speed SPD in place of the yaw rate Y detected by the yaw rate sensor 17.

Further, the first embodiment apparatus and the like may be configured to determine whether the own vehicle V completes the left or right turning only when the state of each of the left direction blinkers or the state of each of the right direction blinkers changes from the blinking state to the non-blinking state without determining whether the total turn angle θtotal is larger than the turn end angle θend for determining whether the own vehicle V completes the left or right turning.

Further, the first embodiment apparatus and the like may be configured to acquire the object information, using a camera or the roadside device in place of the front radar sensors 16L and 16R.

Further, the first embodiment apparatus and the like may be applied to the vehicle which moves on the left side of the road as well as the vehicle which moves on the right side of the road.

What is claimed is:

1. A driving assist apparatus of a vehicle driven by a driver, comprising:
    at least one sensor to detect a moving object existing around the vehicle; and
    an electronic control unit to perform an attention operation to the driver of the vehicle by being configured to:
        set two predicted moving routes for two end sides of the vehicle, the two predicted moving routes having different radii, each of the two predicted moving routes being set such that:
        when the driver turns the vehicle left:
            after the driver has started to turn the vehicle left:
                calculate a curvature radius of a first moving route of the vehicle based on an operation made by the driver to turn the vehicle left;
                calculate a change rate of a yaw rate of the vehicle based on yaw rate information detected by a yaw rate sensor of the vehicle;
                identify a specific point in the first moving route where the curvature radius of the first moving route is predicted to become smallest using the change rate of the yaw rate of the vehicle, based on a presumption that the curvature radius of the first moving route decreases when the yaw rate of the vehicle increases by the change rate of the yaw rate on a moment-to-moment basis while the vehicle turns left;
                set, as a predicted minimum left turn radius, the curvature radius at the identified specific point in the first moving route; and
                set a route curved along an arc having the predicted minimum left turn radius as the predicted moving route; and
        when the driver turns the vehicle right:
            after the driver has started to turn the vehicle right:
                calculate a curvature radius of a second moving route of the vehicle based on an operation made by the driver to turn the vehicle right;

calculate the change rate of the yaw rate of the vehicle;

identify a specific point in the second moving route where the curvature radius of the second moving route is predicted to become smallest using the change rate of the yaw rate of the vehicle, based on a presumption that the curvature radius of the second moving route decreases when the yaw rate of the vehicle increases by the change rate of the yaw rate on a moment-to-moment basis while the vehicle turns right;

set, as a predicted minimum right turn radius, the curvature radius at the identified specific point in the second moving route; and set a route curved along an arc having the predicted minimum right turn radius as the predicted moving route; and perform the attention operation when a time predicted for the vehicle to reach a point where the moving object crosses at least one of the two predicted moving routes is smaller than or equal to a threshold time.

2. The driving assist apparatus of the vehicle as set forth in claim 1, wherein:

the vehicle comprises at least one left direction blinker activated for indicating that the vehicle is to turn left and at least one right direction blinker activated for indicating that the vehicle is to turn right; and the electronic control unit is configured to:

predict that the vehicle turns left when a speed of the vehicle is within a predetermined speed range and the left direction blinker is activated; and predict that the vehicle turns right when the speed of the vehicle is within the predetermined speed range and the right direction blinker is activated.

3. The driving assist apparatus of the vehicle as set forth in claim 1, wherein:

the vehicle comprises at least one left direction blinker activated for indicating that the vehicle is to turn left and at least one right direction blinker activated for indicating that the vehicle is to turn right; and the electronic control unit is configured to determine whether the vehicle turns left or right based on a vehicle information including activation states of the left and right direction blinkers.

4. The driving assist apparatus of the vehicle as set forth in claim 3, wherein the vehicle information includes at least one of the yaw rate of the vehicle, a speed of the vehicle, a longitudinal acceleration of the vehicle, an operation amount of an acceleration pedal of the vehicle, a lateral acceleration of the vehicle and a steering angle of a steering wheel of the vehicle.

5. The driving assist apparatus of the vehicle as set forth in claim 1, wherein the electronic control unit is configured to:

calculate the curvature radius of the first moving route and the curvature radius of the second moving route, according to different preset ways based on a result of determination as to whether a smoothed yaw rate of the vehicle is larger than a preset threshold.

* * * * *